United States Patent
Spivack et al.

(10) Patent No.: US 8,438,124 B2
(45) Date of Patent: May 7, 2013

(54) SYSTEM AND METHOD OF A KNOWLEDGE MANAGEMENT AND NETWORKING ENVIRONMENT

(75) Inventors: Nova Spivack, Tarrytown, NY (US); Boris Aleksandrovksy, San Francisco, CA (US); Jonathan Qiang Li, San Francisco, CA (US); Chris Jones, Mill Valley, CA (US); Peter Royal, San Francisco, CA (US); Lew Tucker, San Francisco, CA (US); Scott White, Seattle, WA (US); Jim Wissner, San Francisco, CA (US)

(73) Assignee: Evri Inc., Seattle, WA (US)

( * ) Notice: Subject to any disclaimer, the term of this patent is extended or adjusted under 35 U.S.C. 154(b) by 1072 days.

(21) Appl. No.: 11/874,882

(22) Filed: Oct. 18, 2007

(65) Prior Publication Data
US 2009/0077124 A1 Mar. 19, 2009

Related U.S. Application Data

(60) Provisional application No. 60/972,815, filed on Sep. 16, 2007.

(51) Int. Cl.
*G06F 17/00* (2006.01)
*G06N 5/00* (2006.01)

(52) U.S. Cl.
USPC .......................................................... 706/45

(58) Field of Classification Search ............... 706/45
See application file for complete search history.

(56) References Cited

U.S. PATENT DOCUMENTS

| 5,408,567 A | 4/1995 | Hamilton |
| 5,408,657 A | 4/1995 | Bigelow et al. |

(Continued)

FOREIGN PATENT DOCUMENTS

| JP | 2007094592 A | 4/2007 |
| KR | 20010028737 | 4/2001 |

(Continued)

OTHER PUBLICATIONS

Y. Choi and S. Park, "Refinement Method of Post-processing and Training for Improvement of Automated Text Classification", Computational Science and Its Applications—ICCSA 2006: International Conference, Glasgow, UK, May 8-11, 2006, pp. 298-308.*

(Continued)

*Primary Examiner* — Kakali Chaki
*Assistant Examiner* — Vincent Gonzales
(74) *Attorney, Agent, or Firm* — Perkins Coie LLP

(57) ABSTRACT

Systems and methods of a knowledge management networking are disclosed here. In one aspect, embodiments of the present disclosure include a method, which may be implemented on a system, of hosting a web-space having a plurality of objects, the plurality of objects to include one or more of, representations of a set of users, a set of web-items, and a set of nets; wherein a net of the set of nets is a subset of the web-space comprising a sub-plurality of the plurality of objects. One embodiment can include, tracking an explicit relationship between a first set of at least two objects of the set of objects; the explicit relationship to be pre-determined by a user of the set of users, identifying an implicit relationship between a second set of at least two objects of the set of objects; the implicit relationship to be identified based on a semantic relationship between the at least two objects, and determining a default set of privacy rules governing access between the at least two objects based on one or more of the identified explicit relationship and the implicit relationship.

24 Claims, 56 Drawing Sheets

U.S. PATENT DOCUMENTS

| | | | |
|---|---|---|---|
| 5,515,532 | A | 5/1996 | Iijima et al. |
| 5,548,749 | A | 8/1996 | Kroenke et al. |
| 5,717,924 | A | 2/1998 | Kawai |
| 5,809,297 | A | 9/1998 | Kroenke et al. |
| 5,819,086 | A | 10/1998 | Kroenke |
| 5,905,498 | A | 5/1999 | Diament |
| 5,925,100 | A | 7/1999 | Drewry et al. |
| 5,966,686 | A | 10/1999 | Heidorn et al. |
| 6,173,287 | B1 | 1/2001 | Eberman et al. |
| 6,311,194 | B1 | 10/2001 | Sheth et al. |
| 6,363,377 | B1 | 3/2002 | Kravets et al. |
| 6,411,952 | B1 | 6/2002 | Bharat et al. |
| 6,499,021 | B1 | 12/2002 | Abu-Hakima et al. |
| 6,513,059 | B1 | 1/2003 | Gupta et al. |
| 6,516,315 | B1 | 2/2003 | Gupta |
| 6,530,083 | B1 | 3/2003 | Liebenow |
| 6,643,650 | B1 | 11/2003 | Slaughter et al. |
| 6,654,741 | B1 | 11/2003 | Cohen et al. |
| 6,704,729 | B1 | 3/2004 | Klein et al. |
| 6,711,585 | B1 | 3/2004 | Copperman et al. |
| 6,741,744 | B1 | 5/2004 | Hsu |
| 6,748,441 | B1 * | 6/2004 | Gemmell ................... 709/231 |
| 6,789,077 | B1 | 9/2004 | Slaughter et al. |
| 6,816,850 | B2 | 11/2004 | Culliss |
| 6,816,857 | B1 | 11/2004 | Weissman et al. |
| 6,839,701 | B1 | 1/2005 | Baer et al. |
| 6,847,974 | B2 | 1/2005 | Wachtel |
| 6,859,807 | B1 | 2/2005 | Knight et al. |
| 6,868,447 | B1 | 3/2005 | Slaughter et al. |
| 6,996,566 | B1 | 2/2006 | George et al. |
| 7,072,883 | B2 | 7/2006 | Potok et al. |
| 7,092,928 | B1 | 8/2006 | Elad et al. |
| 7,093,200 | B2 | 8/2006 | Schreiber et al. |
| 7,177,798 | B2 | 2/2007 | Hsu et al. |
| 7,185,075 | B1 | 2/2007 | Mishra et al. |
| 7,197,451 | B1 | 3/2007 | Carter et al. |
| 7,200,862 | B2 | 4/2007 | Murching et al. |
| 7,216,002 | B1 | 5/2007 | Anderson |
| 7,246,164 | B2 | 7/2007 | Lehmann et al. |
| 7,284,196 | B2 | 10/2007 | Skeen et al. |
| 7,398,261 | B2 | 7/2008 | Spivack et al. |
| 7,433,876 | B2 | 10/2008 | Spivack et al. |
| 7,516,401 | B2 | 4/2009 | Chen et al. |
| 7,536,323 | B2 | 5/2009 | Hsieh |
| 7,584,208 | B2 | 9/2009 | Spivack et al. |
| 7,640,267 | B2 | 12/2009 | Spivack et al. |
| 7,730,094 | B2 | 6/2010 | Kaler et al. |
| 7,739,121 | B2 | 6/2010 | Jain et al. |
| 7,774,380 | B2 | 8/2010 | Burke et al. |
| 7,793,209 | B2 | 9/2010 | Kikuchi |
| 7,814,111 | B2 | 10/2010 | Levin |
| 7,895,235 | B2 | 2/2011 | Baeza-Yates et al. |
| 7,933,914 | B2 | 4/2011 | Ramsey et al. |
| 7,966,564 | B1 | 6/2011 | Catlin et al. |
| 8,020,206 | B2 | 9/2011 | Hubbard et al. |
| 8,046,227 | B2 | 10/2011 | Starkie |
| 8,103,676 | B2 | 1/2012 | Bedrax-Weiss et al. |
| 8,135,831 | B2 | 3/2012 | Sinclair et al. |
| 8,150,859 | B2 | 4/2012 | Vadlamani et al. |
| 8,161,066 | B2 | 4/2012 | Spivack et al. |
| 8,166,010 | B2 | 4/2012 | Ives |
| 8,176,079 | B1 | 5/2012 | Spertus |
| 8,190,684 | B2 | 5/2012 | Spivack et al. |
| 8,200,617 | B2 | 6/2012 | Spivack et al. |
| 8,275,796 | B2 | 9/2012 | Spivack et al. |
| 2001/0049700 | A1 | 12/2001 | Ichikura |
| 2002/0023122 | A1 | 2/2002 | Polizzi et al. |
| 2002/0049689 | A1 | 4/2002 | Venkatram |
| 2002/0052894 | A1 | 5/2002 | Bourdoncle et al. |
| 2002/0055936 | A1 | 5/2002 | Cheng et al. |
| 2002/0059223 | A1 | 5/2002 | Nash et al. |
| 2002/0069100 | A1 | 6/2002 | Arberman |
| 2002/0082900 | A1 | 6/2002 | Johnson |
| 2002/0103777 | A1 | 8/2002 | Zhang |
| 2002/0103920 | A1 | 8/2002 | Berkun et al. |
| 2002/0147748 | A1 | 10/2002 | Huang et al. |
| 2002/0161626 | A1 | 10/2002 | Plante et al. |
| 2002/0184111 | A1 | 12/2002 | Swanson |
| 2002/0194154 | A1 | 12/2002 | Levy et al. |
| 2002/0194201 | A1 | 12/2002 | Wilbanks et al. |
| 2003/0028871 | A1 | 2/2003 | Wang et al. |
| 2003/0046344 | A1 | 3/2003 | Kumhyr et al. |
| 2003/0093551 | A1 | 5/2003 | Taylor et al. |
| 2003/0120730 | A1 | 6/2003 | Kuno et al. |
| 2003/0126136 | A1 | 7/2003 | Omoigui |
| 2003/0133556 | A1 | 7/2003 | Naik et al. |
| 2003/0144892 | A1 | 7/2003 | Cowan et al. |
| 2003/0144988 | A1 | 7/2003 | Nareddy et al. |
| 2003/0149934 | A1 | 8/2003 | Worden |
| 2003/0163513 | A1 | 8/2003 | Schaeck et al. |
| 2004/0012773 | A1 | 1/2004 | Puttkammer |
| 2004/0054671 | A1 | 3/2004 | Cohen et al. |
| 2004/0073430 | A1 | 4/2004 | Desai et al. |
| 2004/0083199 | A1 | 4/2004 | Govindugari et al. |
| 2004/0083211 | A1 | 4/2004 | Bradford |
| 2004/0088325 | A1 * | 5/2004 | Elder et al. ................ 707/104.1 |
| 2004/0111386 | A1 | 6/2004 | Goldberg et al. |
| 2004/0158455 | A1 | 8/2004 | Spivack et al. |
| 2004/0162773 | A1 | 8/2004 | Del Rey et al. |
| 2004/0181525 | A1 | 9/2004 | Itzhak et al. |
| 2004/0181604 | A1 | 9/2004 | Immonen |
| 2004/0210602 | A1 | 10/2004 | Hillis et al. |
| 2004/0220893 | A1 | 11/2004 | Spivack et al. |
| 2004/0230572 | A1 | 11/2004 | Omoigui |
| 2004/0230676 | A1 | 11/2004 | Spivack et al. |
| 2004/0249795 | A1 | 12/2004 | Brockway et al. |
| 2004/0260680 | A1 | 12/2004 | Best et al. |
| 2004/0260701 | A1 | 12/2004 | Lehikoinen et al. |
| 2005/0015357 | A1 | 1/2005 | Shahidi |
| 2005/0021862 | A1 | 1/2005 | Schroeder et al. |
| 2005/0027708 | A1 | 2/2005 | Mueller et al. |
| 2005/0055644 | A1 | 3/2005 | Stockton |
| 2005/0080775 | A1 | 4/2005 | Colledge et al. |
| 2005/0131778 | A1 | 6/2005 | Bennett et al. |
| 2005/0144158 | A1 | 6/2005 | Capper et al. |
| 2005/0144162 | A1 | 6/2005 | Liang |
| 2005/0149510 | A1 | 7/2005 | Shafrir |
| 2005/0160065 | A1 | 7/2005 | Seeman |
| 2005/0165743 | A1 | 7/2005 | Bharat et al. |
| 2005/0210000 | A1 | 9/2005 | Michard |
| 2005/0267872 | A1 | 12/2005 | Galai et al. |
| 2005/0278390 | A1 | 12/2005 | Kaler et al. |
| 2006/0004703 | A1 | 1/2006 | Spivack et al. |
| 2006/0004732 | A1 | 1/2006 | Odom |
| 2006/0004892 | A1 * | 1/2006 | Lunt et al. ................ 707/204 |
| 2006/0020596 | A1 | 1/2006 | Liu et al. |
| 2006/0026147 | A1 | 2/2006 | Cone et al. |
| 2006/0074726 | A1 | 4/2006 | Forbes et al. |
| 2006/0151507 | A1 | 7/2006 | Swartz et al. |
| 2006/0168510 | A1 | 7/2006 | Bryar et al. |
| 2006/0184617 | A1 * | 8/2006 | Nicholas et al. .............. 709/203 |
| 2006/0200434 | A1 * | 9/2006 | Flinn et al. ................ 706/12 |
| 2006/0213976 | A1 | 9/2006 | Inakoshi et al. |
| 2006/0235873 | A1 * | 10/2006 | Thomas ................ 707/102 |
| 2006/0242013 | A1 | 10/2006 | Agarwal et al. |
| 2006/0242574 | A1 | 10/2006 | Richardson et al. |
| 2006/0248045 | A1 | 11/2006 | Toledano et al. |
| 2006/0259357 | A1 | 11/2006 | Chiu |
| 2006/0287989 | A1 | 12/2006 | Glance |
| 2007/0016771 | A1 * | 1/2007 | Allison et al. ................ 713/165 |
| 2007/0027865 | A1 | 2/2007 | Bartz et al. |
| 2007/0038610 | A1 | 2/2007 | Omoigui |
| 2007/0038643 | A1 | 2/2007 | Epstein |
| 2007/0050338 | A1 | 3/2007 | Strohm et al. |
| 2007/0061198 | A1 | 3/2007 | Ramer et al. |
| 2007/0081197 | A1 | 4/2007 | Omoigui |
| 2007/0118802 | A1 | 5/2007 | Gerace et al. |
| 2007/0124202 | A1 | 5/2007 | Simons |
| 2007/0143502 | A1 | 6/2007 | Garcia-Martin |
| 2007/0174270 | A1 | 7/2007 | Goodwin et al. |
| 2007/0208703 | A1 | 9/2007 | Shi et al. |
| 2007/0220893 | A1 | 9/2007 | Woltmann et al. |
| 2007/0260598 | A1 | 11/2007 | Odom |
| 2008/0010291 | A1 | 1/2008 | Poola et al. |
| 2008/0010292 | A1 | 1/2008 | Poola |
| 2008/0021924 | A1 | 1/2008 | Hall et al. |
| 2008/0059519 | A1 | 3/2008 | Grifftih |

| | | | |
|---|---|---|---|
| 2008/0091656 | A1 | 4/2008 | Charnock et al. |
| 2008/0109212 | A1 | 5/2008 | Witbrock et al. |
| 2008/0148193 | A1 | 6/2008 | Moetteli |
| 2008/0189267 | A1 | 8/2008 | Spivack et al. |
| 2008/0235383 | A1 | 9/2008 | Schneider |
| 2008/0243838 | A1 | 10/2008 | Scott et al. |
| 2008/0262964 | A1 | 10/2008 | Bezos et al. |
| 2008/0270428 | A1 | 10/2008 | McNamara et al. |
| 2008/0306959 | A1 | 12/2008 | Spivack et al. |
| 2009/0030982 | A1 | 1/2009 | Spivack et al. |
| 2009/0076887 | A1 | 3/2009 | Spivack et al. |
| 2009/0077062 | A1 | 3/2009 | Spivack et al. |
| 2009/0077094 | A1 | 3/2009 | Bodain |
| 2009/0077531 | A1 | 3/2009 | Miloslavsky et al. |
| 2009/0089278 | A1 | 4/2009 | Poola et al. |
| 2009/0089286 | A1 | 4/2009 | Kumar et al. |
| 2009/0106307 | A1 | 4/2009 | Spivack |
| 2009/0144240 | A1 | 6/2009 | Singh et al. |
| 2009/0171984 | A1 | 7/2009 | Park et al. |
| 2009/0192972 | A1 | 7/2009 | Spivack et al. |
| 2009/0234711 | A1 | 9/2009 | Ramer et al. |
| 2009/0327304 | A1 | 12/2009 | Agarwal et al. |
| 2010/0004975 | A1 | 1/2010 | White et al. |
| 2010/0046842 | A1 | 2/2010 | Conwell |
| 2010/0057815 | A1 | 3/2010 | Spivack et al. |
| 2010/0100545 | A1 | 4/2010 | Jeavons |
| 2010/0153160 | A1 | 6/2010 | Bezemer et al. |
| 2010/0235918 | A1 | 9/2010 | Mizrahi et al. |
| 2010/0262592 | A1 | 10/2010 | Brawer et al. |
| 2010/0268596 | A1 | 10/2010 | Wissner et al. |
| 2010/0268700 | A1 | 10/2010 | Wissner et al. |
| 2010/0268702 | A1 | 10/2010 | Wissner et al. |
| 2010/0268720 | A1 | 10/2010 | Spivack et al. |
| 2012/0278163 | A1 | 11/2012 | Spivack et al. |

FOREIGN PATENT DOCUMENTS

| | | |
|---|---|---|
| KR | 1020040017824 | 2/2004 |
| KR | 20050023583 | 3/2005 |
| KR | 1020060046522 | 5/2006 |
| KR | 20060117707 | 11/2006 |
| KR | 1020070061116 | 6/2007 |
| KR | 1020060046522 | 7/2007 |

OTHER PUBLICATIONS

S. Decker and M. Frank, "The Social Semantic Desktop", DERI Technical Report May 2, 2004, May 2004, pp. 1-7.*
A. Hotho et al., "Information Retrieval in Folklsonomies: Search and Ranking", ESWC 2006, pp. 411-426.*
X. Shen, B. Tan, and X. Zhai, "Context-sensitive information retrieval using implicit feedback", Proc. SIGIR '05, pp. 43-50.*
W. Fang et al., "Toward a Semantic Search Engine Based on Ontologies", Proc. 4th Int'l Conf. on Mach. Learning and Cybernetics, Aug. 2005, pp. 1913-1918.*
International Search Report PCT/US2008/010337 dated Dec. 28, 2009; pp. 1-3.
International Search Report PCT/US2009/002867 dated Dec. 18, 2009; pp. 1-3.
Written Opinion PCT/US2008/010337 dated Dec. 28, 2009; pp. 1-3.
Written Opinion PCT/US2009/002867 dated Dec. 18, 2009; pp. 1-5.
International Search Report PCT/US2010/039381 dated Jan. 5, 2011 pp. 1-3.
Written Opinion PCT/US2010/039381 dated Jan. 5, 2011 pp. 1-4.
U.S. Appl. No. 60/546,794, filed Feb. 23, 2004.
U.S. Appl. No. 60/972,815, filed Sep. 16, 2007.
U.S. Appl. No. 60/981,104, filed Oct. 18, 2007.
U.S. Appl. No. 60/427,550, filed Nov. 20, 2002.
U.S. Appl. No. 60/821,891, filed Aug. 9, 2006.
U.S. Appl. No. 61/169,662, filed Apr. 15, 2009.
U.S. Appl. No. 61/169,669, filed Apr. 15, 2009.
U.S. Appl. No. 61/169,677, filed Apr. 15, 2009.
U.S. Appl. No. 61/218,709, filed Jun. 19, 2009.
European Supplementary Search Report EP 08 839486.1 Dated Dec. 27, 2010 pp. 1-8.
"SEAL—A framework for Developing SEmantic PortALs"—Nenad Stojanovic, Aleanander Maedche, Steffen Staab, Rudi Studer and York Sure, K=CAP'01', Oct. 22-23, 2001 ACM (pp. 155-162).

'A klog apart' [online]. Dijest.com, 2003, [retrieved on May 3, 2007]. Retrieved from the Internet: <URL:http://www.dijest.com/aka/2003/06/20.html>, 9 pages.
'Blogs as information spaces' [online]. Reflective Surface, 2003, [retrieved on May 3, 2007]. Retrieved from the internet: <URL: http://log.reflectivesurface.com/2003/12/>, 6 pages.
Cass, "A Fountain of Knowledge," IEEE Spectrum, Jan. 2004, pp. 68-75.
'Development Notebook' [online]. Dannyayers, 2003 [retrieved on May 4, 2007]. Retrieved from the Internet: URL: webarchive.org/web/20031012055838/http://dannyayers.com/ideagraph-blog/archives/cat_jemblog.html>, 6 pages.
'Organizing weblogs by topic' [online]. Read/Write Web, 2003, [retrieved on May 3, 2007]. Retrieved from the Internet: <URL:http://www.readwriteweb.com/archives/organizing.webl.php>, 3 pages.
'Semantic Email' [online]. University of Washington, [retrieved on May 3, 2007]. Retrieved from the Internet: <URL:http://www.cs.washington.edu/research/semweb/email.html>, 2 pages.
'Semantic link' [online]. Meta, 2005 [retrieved on May 3, 2007]. Retrieved on the Internet: <URL: http://meta.wikimedia.org/wiki/Semantic_link>, 1 page.
"Improved markup language for semantic Web using object oriented technology, 21-24"—Kangchan, et al., IEEE, vol. 1, Sep. 2003 (pp. 330-334).
"Re-integrating the research record"—Myers, et al., IEEE vol. 5, May-Jun. 2003 (pp. 44-50).
International Search Report PCT/US2007/75379; dated Aug. 5, 2008.
International Search Report PCT/US2008/010596 dated Mar. 24, 2009.
International Search Report PCT/US2008/011474 dated May 29, 2009.
"Ontology-Driven Peer Profiling in Peer-to-Peer Enabled Semantic Web"—Olena Parhomenko, Yugyung Lee, E.K. Park-CIKM'03 Information and Knowledge Management Nov. 2003. (pp. 564-567).
"Semantic-Based Approach to Component Retrieval"—Vijayan Sugumaran and Veda C. Storey—ACM SIGMIS Database vol. 24, Issue 3 Aug. 2003, (pp. 8-24).
Non-Final Office Action mailed May 22, 2006 for Issued Patent No. 7,640,267, U.S. Appl. No. 10/719,002, filed Nov. 11, 2003.
Non-Final Office Action mailed Nov. 16, 2006 for Issued Patent No. 7,640, 267, U.S. Appl. No. 10/719,002, filed Nov. 20, 2003.
Final Office Action mailed May 1, 2007 for Issued Patent No. 7,640,267, U.S. Appl. No. 10/719,002, filed Nov. 20, 2003.
Appeals Conference mailed Proceed to BPAI mailed Oct. 17, 2007 for Issued Patent No. 7,640,267, U.S. Appl. No. 10/719,002, filed Nov. 20, 2003.
Non-Final Office Action mailed Feb. 20, 2008 for Issued Patent No. 7,640,267, U.S. Appl. No. 10/719,002, filed Nov. 20, 2003.
Final Office Action mailed Aug. 5, 2008 for Issued Patent No. 7,640,267, U.S. Appl. No. 10/719,002, filed Nov. 20, 2003.
Advisory Action mailed Oct. 17, 2008 for Issued Patent No. 7,640,267, U.S. Appl. No. 10/719,002, filed Nov. 20, 2003.
Non-Final Office Action mailed Feb. 3, 2009 for Issued Patent No. 7,640,267, U.S. Appl. No. 10/719,002, filed Nov. 20, 2003.
Restriction Requirement mailed May 26, 2009 for Issued Patent No. 7,640,267, U.S. Appl. No. 10/719,002, filed Nov. 20, 2003.
Notice of Allowance mailed Sep. 16, 2009 for Issued patent No. 7,640,267, U.S. Appl. No. 10/719,002, filed Nov. 20, 2003.
Notice of Allowance mailed Nov. 4, 2009 for Issued Patent No. 7,640,267, U.S. Appl. No. 10/719,002, filed Nov. 20, 2003.
Non-Final Office Action mailed Feb. 7, 2007 for Issued Patent No. 7,398,261, U.S. Appl. No. 10/719,652, filed Nov. 20, 2003.
Non-Compliant or Non-Responsive Amendment mailed Nov. 20, 2007 for Issued Patent No. 7,398,261, U.S. Appl. No. 10/719,652, filed Nov. 20, 2003.
Notice of Allowance mailed Mar. 25, 2008 for Issued Patent No. 7,398,261, U.S. Appl. No. 10/719,652, filed Nov. 2003.
Non-Final Office Action mailed May 5, 2006 for Issued Patent No. 7,584,208, U.S. Appl. No. 10/720,031, filed Nov. 20, 2003.
Final Office Action mailed Oct. 20, 2006 for Issued Patent No. 7,584,208, U.S. Appl. No. 10/720,031, filed Nov. 20, 2003.

Non-Final Office Action mailed Aug. 9, 2007 for Issued Patent No. 7,584,208, U.S. Appl. No. 10/720,031, filed Nov. 20, 2003.
Final Office Action mailed Jan. 25, 2008 for Issued Patent No. 7,584,208, U.S. Appl. No. 10/720,031, filed Nov. 20, 2003.
Non-Final Office Action mailed May 23, 2008 for Issued Patent No. 7,584,208, U.S. Appl. No. 10/720,031, filed Nov. 20, 2003.
Non-Final Office Action mailed Nov. 21, 2008 for Issued Patent No. 7,584,208, U.S. Appl. No. 10/720,031, filed Nov. 20, 2003.
Notice of Allowance mailed May 13, 2009 for Issued Patent No. 7,584,208, U.S. Appl. No. 10/720,031, filed Nov. 20, 2003.
Non-Final Office Action mailed Apr. 14, 2010 in U.S. Appl. No. 12/359,230, filed Jan. 23, 2009.
Non-Final Office Action mailed Jun. 1, 2007 for Issued Patent No. 7,433,876, U.S. Appl. No. 11/062,125, filed Feb. 19, 2005.
Final Office Action mailed Nov. 9, 2009 for Issued Patent No. 7,433,876, U.S. Appl. No. 11/062,125, filed Feb. 19, 2005.
Advisory Action mailed Dec. 27, 2007 for Issued Patent No. 7,433,876, U.S. Appl. No. 11/062,125, filed Feb. 19, 2005.
Non-Final Office Action mailed Feb. 21, 2008 for Issued Patent No. 7,433,876, U.S. Appl. No. 11/062,125, filed Feb. 19, 2005.
Notice of Allowance mailed Jun. 26, 2008 for Issued Patent No. 7,433,876, U.S. Appl. No. 11/062,125, filed Feb. 19, 2005.
Non-Final Office Action mailed Feb. 3, 2010 in U.S. Appl. No. 12/104,366, filed Apr. 16, 2008.
Final Office Action mailed Jul. 16, 2010 in U.S. Appl. No. 12/104,366, filed Apr. 16, 2008.
Non-Final Office Action mailed Aug. 25, 2010 in U.S. Appl. No. 11/835,079, filed Aug. 7, 2007.
Non-Final Office Action mailed Sep. 16, 2010 in U.S. Appl. No. 11/873,388, filed Oct. 16, 2007.
Restriction Requirement mailed Jul. 23, 2010 in U.S. Appl. No. 11/874,881, filed Oct. 18, 2007.
Final Office Action mailed Sep. 29, 2010 in U.S. Appl. No. 12/359,230, filed Jan. 23, 2009.
Non-Final Office Action mailed Sep. 17, 2010 in U.S. Appl. No. 12/616,085, filed Nov. 10, 2009.
Milos Kudelka, et al., "Semantic Annotation of Web Pages Using Web Patterns", IEEE/WIC/ACM International Conference on Web Intelligence, Dec. 18, 2006, pp. 1-12.
Written Opinion PCT/US2007/75379 dated Aug. 5, 2008, pp. 1-7.
Written Opinion PCT/US208/010596 dated Mar. 24, 2009, pp. 1-5.
Written Opinion PCT/US2008/011474 dated May 29, 2009, pp. 1-5.
International Search Report PCT/US2010/031090 dated Nov. 2, 2010; pp. 1-3.
Written Opinion PCT/US2010/031090; dated Nov. 2, 2010; pp. 1-6.
U.S. Appl. No. 11/873,388, filed Oct. 16, 2007.
U.S. Appl. No. 11/874,881, filed Oct. 18, 2007.
U.S. Appl. No. 12/168,034, filed Jul. 3, 2008.
U.S. Appl. No. 12/244,740, filed Oct. 2, 2008.
U.S. Appl. No. 10/719,002, filed Nov. 20, 2003.
U.S. Appl. No. 12/616,085, filed Nov. 10, 2009.
U.S. Appl. No. 10/719,652, filed Nov. 20, 2003.
U.S. Appl. No. 10/720,031, filed Nov. 20, 2003.
U.S. Appl. No. 12/359,236, filed Jan. 23, 2009.
U.S. Appl. No. 12/359,230, filed Jan. 23, 2009.
U.S. Appl. No. 11/062,125, filed Feb. 19, 2005.
U.S. Appl. No. 12/197,207, filed Aug. 22, 2008.
U.S. Appl. No. 11/835,079, filed Aug. 7, 2007.
U.S. Appl. No. 12/104,366, filed Apr. 16, 2008.
U.S. Appl. No. 12/760,387, filed Apr. 14, 2010.
U.S. Appl. No. 12/760,411, filed Apr. 14, 2010.
U.S. Appl. No. 12/760,424, filed Apr. 14, 2010.
U.S. Appl. No. 12/489,352, filed Jun. 22, 2009.
U.S. Appl. No. 12/819,999, filed Jun. 21, 2010.
Non-Final Office Action mailed Nov. 29, 2010 in U.S. Appl. No. 11/874,881, filed Oct. 18, 2007.
International Search Report PCT/US2010/031096 dated Nov. 22, 2010; pp. 1-3.
Written Opinion PCT/US2010/031096 dated Nov. 22, 2010dated; pp. 1-4.
International Search Report PCT/US2010/031101dated Nov. 26, 2010; pp. 1-3.
Written Opinion PCT/US2010/031101 dated Nov. 26, 2010dated; pp. 1-4.
International Search Report PCT/US2010/031111 dated Nov. 26, 2010; pp. 1-3.
Written Opinion PCT/US2010/031111 dated Nov. 26, 2010dated; pp. 1-6.
Final Office Action mailed Apr. 25, 2011 for U.S. Appl. No. 12/616,085, filed Nov. 10, 2009, 32 pages.
Non Final Office Action mailed Aug. 17, 2011 for U.S. Appl. No. 12/197,207, filed Aug. 22, 2008, 41 pages.
Final Office Action mailed Aug. 17, 2011 for U.S. Appl. No. 12/616,085, filed Nov. 10, 2009, 23 pages.
Final Office Action mailed Feb. 14, 2011 in U.S. Appl. No. 11/835,079, filed Aug. 7, 2007, 63 pages.
Final Office Action mailed May 11, 2011 for U.S. Appl. No. 11/874,881, filed Oct. 18, 2007, 31 pages.
Final Office Action mailed May 26, 2011 in U.S. Appl. No. 11/873,388, filed Oct. 16, 2007, 28 pages.
Microsoft Computer Dictionary, p. 181, Microsoft Press, 5th ed., 2002.
Non Final Office Action mailed Jul. 27, 2011 for U.S. Appl. No. 12/489,352, filed Jun. 22, 2009, 28 pages.
Non-Final Office Action mailed Mar. 18, 2011 in U.S. Appl. No. 12/359,236, filed Jan. 23, 2009, 33 pages.
Restriction Requirement mailed Aug. 5, 2011 in U.S. Appl. No. 12/168,034, filed Jul. 3, 2008, 10 pages.
Restriction Requirement mailed Jul. 26, 2011 for U.S. Appl. No. 12/244,740, filed Oct. 2, 2008, 5 pages.
Kashyap et al., "Semantic and Schematic Similarities Between Database Objects: a Context-Based Approach," VLUB Journal, © Springer-Verlag 1996, pp. 1-29.
Lee et al., "Development of a Concurrent Mold Design System: a Knowledge-based Approach," Computer Integrated Manufacturing Systems, vol. 10, Issue 4, Oct. 1997, pp. 287-307.
Devedžić, "A Survey of Modern Knowledge Modeling Techniques," Expert Systems with Applications, vol. 17, Issue 4, Nov. 1999, pp. 275-294.
Non-Final Office Action for U.S. Appl. No. 13/450,416, filed Apr. 18, 2012, mailed Jan. 18, 2013.
Final Office Action for U.S. Appl. No. 12/760,411, filed Apr. 14, 2010, mailed Nov. 23, 2012.
Final Office Action for U.S. Appl. No. 12/760,424, filed Apr. 14, 2010, mailed Jan. 4, 2013.

* cited by examiner

As part of its preparatory research the team studied the Guggenheim's archives, including photographs taken during construction; written documentation of the building process; correspondence between Wright and the contractor; and original architectural and shop drawings.

The building was then stripped of as many as 11 layers of paint, and experts conducted a 17-month survey of thousands of cracks of varying magnitude in the façade. Using impact-echo technology, in which sound waves are sent into the concrete and the rebound is measured, the engineers located voids within the walls.

To map the geometry of the museum and determine its load-bearing capacity, the engineers relied on laser measuring, a fairly tricky matter given the building's spiral and its sloping walls. "We think it's the largest laser model ever constructed," Mr. Silman said. "It took up the whole memory on the computer."

They also submitted their findings to two peer review panels of experts in architectural restoration, materials conservation, structural engineering as well as an environmental envelope specialist.

"We all believe, when we finish, this building will be better than new," said Marc H. Steglitz, the museum's chief operating officer. "And we'll get another 50 years out of it."

Next Article in Arts (12 of 18) >>

Need to know more? 50% off home delivery of The Times.

what's this?

Add to Twine

Type of Item
[ Page ▼ ]

Thumbnail

<< [img] >>

Add To
[ My net ▼ ]

Title
[ Guggenheim Restor... ]

Summary
[ Restoration work do... ]

Tags
[ Architecture, Gugge... ]

Comment
[          ]

☐ Go to This Net on Twine ( Save )

---

Ads by Google

Blue Brook Architecture
Environmentally responsible architecture. Seattle
www.bluebrookarch.com Restoration Services
Evaluation, Corrosion & CP Experts Corrosion Prevention & Restoration
www.matcoinc.com Museum of Fine Arts
A must-see destination for art in Boston.
www.mfa.org

---

INSIDE NYTIMES.COM                                    ▶

TimesSelect     EDUCATION >>    WORLD >>    BOOKS >>    ARTS >>

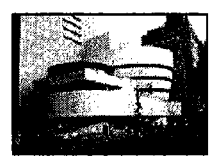

Sidebar: Openness at a Secret Court?

An Eye on the Long Run
The school system of Washington is broken, and Mayor Adrian Fenty has staked his political career on promises to fix it.

Costumes Malfunction, but Never the Guitars

When Bad Things Happen

Guggenheim Restorers' Art of the Invisible

FIG. 7B

| Explicit Relations (User-triggered) |
|---|
| Object with a user-specified tag that links to another object |
| Mutually agreed connection between two users |
| User adds contact information of another user |
| User invites another user to connect as family member, friend, and/or colleague, etc. |
| User adds an object to the knowledge networking environment |
| User adds an object to a net |
| User creates a net |
| User joins a net |
| User invites other users to join a net |
| User browses through objects |
| User browses through user profiles |
| User browses through nets |

860

| Implicit Relations (System-determined) |
|---|
| An object with identified tags having semantic and/or keyword relationships with tags of other objects |
| An object with identified tags having semantic and/or keyword relationships with tags of the user profile of a user |
| Users having at least two degrees of social separation |
| Users that are semantically socially linked |
| A user with a user profile having identified tags with semantic and/or keyword relationships with tags of other objects |
| A user with a user profile having identified tags with semantic and/or keyword relationships with the user profile of another user |
| Recommended objects to users and/or nets |
| Recommended nets to users |
| Fuzzy sharing |

FIG. 12A twine

Home | My Twines | My Connections | Explore    Start a Twine

CWJones | Logout | Account | Help | Feedback | (3)

Search

Welcome Bob Hope

Bob Hope    More info
Working in: San Francisco, CA
Located in: Mill Valley, CA

- Start a Twine — 1204
- Get the Bookmarklet — 1206
- Import Contacts/Bookmarks — 1208
- Post to Twine by Email — 1210
- Find a Twine to Join
- Connect with People

Recently Viewed Twines — 1202

CWJones' Twine
This is CWJones' general Twine where he collects various articles of interest...

Web 3.0 – Semantic Web
Web 3.0 – Semantic Web

Nova Spivack's Twine
Nova Spivack's personal Twine.

San Francisco Food and Drink
This is a place to suggest your top picks for food and drinks in San Francisco.

Twine FAQ's
This is a twine with answers to frequently-asked questions about Twine.com for...

Recently Viewed Items tom
willimina
TheatreWorks in Mountain View in CWJones' Twine
Yoshi's SF in CWJones' Twine
Palo Alto Players Theatre... in CWJones' Twine
josh k
huxley

---

Shortcuts (1212)
- Items I've Added
- Items Shared with Me

Notifications (5)
- John Smith has accepted your invitation to the Nano Tech Forum
- Kyle Miller is requesting to become a member of the Mill Valley Bike Club
- Sue Jones has declined your invitation to the Nano Tech Forum

Today
- Nova added 3 items to the Radar Product Net
- Twitter Dev group accepted your request to join
- You and Dave are now connected as co-works and father and son Movie Reviews
Choose from over 10,000 DVD titles. Join Now, Free Shipping!
www.Columbiahouse.com
Ads by Google

People (1214)
- Alan Dedicoat
- Bruno Tonioli
- Carrie Ann Inaba
- Drew Lachey
- Frank van Harmelen
- Godel
- H. Peter Alesso
- Harold Wheeler
- Lisa Canning
- Mario Lopez
- Mark Cuban
- Nova Spivack
- Rudi Studer
- Samantha Harris
- Tim Berners-Lee
- Tom Bergeron

August 5th, 2007
- You bookmarked 1 web page to the Red Campaign
- Josh commented on the image Vacation in London
- Twine was unable to send an invitation to sue@gmail.com
- Ron posted a video to the Happier Cat Club Great Savings at Target
Find new products and styles online. Shop and save at Target.com today.
www.Target.com
Ads by Google

Places

Events (1216)

Organizations

General

Types of Items

August 1st, 2007
- You bookmarked 1 web page to the Red Campaign
- Josh commented on the image Vacation in London
- Twine was unable to send an invitation to sue@gmail.com
- Ron posted a video to the Happier Cat Club

1220

```
                                          CWJones | Logout | Account | Help | Feedback |   (3)
  twine    Home  | My Twines | My Connections | Explore  Start a Twine  [        ] [Search]
```

▼ Add Something

[ Summary ][ Items ][ Manage ]

Filter Items          [View All] [↕] | [Most Recent] [↕] [Pivot▼]            [1] of 5  ◀ | ▶

[food]                    TheatreWorks in Mountain View
☒ Boston                  Bookmark added by Me to My Twine on Nov 06, 2007
☒ Software
                                        Twelfth night showing end of Nov !!

▼ Tags

API
  Best Play
  Bohr                    Yoshi's SF
  Bohr Hydrogen Model     Bookmark added by Me to My Twine on Nov 06, 2007
  Copenhagen
  Copenhagen                            New, opening of Yoshi's in SF
  cuban
  Gonzalo Rubalcaba
  Heisenberg
  Herbie Hancock
  jazz
  Latin
  Latin jazz              Palo Alto Players Theatre Season Shows
  Margrethe               Bookmark added by John to My Twine on Nov 06, 2007
  Masonic Center
  Niels Bohr                            For the nerds and nerdettes, lights, camera, action! It's Heisenberg's
  Nobel                                 Uncertainty Principle and the Bohr Hydinen Mode live and in Palo Also
  Nov
  Palo Alto
  piano
  Radar Networks
  San Francisco           SF Jazz Festival – Herbie Hancock
  Saturday                Bookmark added by John to My Twine on Nov 06, 2007
  Semantic Web
  Tony Award                            The Herbie Hancock quartet is playing at the Masonic Center this
  Twelfth Night                         Saturday! They will be featuring Cuban pianist Gonzalo Rubalcaba
  Twine                                 brining in a Latin Jazz feel to the performance. This is an intriguing
  Wener Heisenberg                      combination and I hope to get some tickets!!
  Yoshi ▶ Type Note
Bookmark ☑ Subscribe | 📖 Bookmark                              [1] of 5  ◀ | ▶

Twine

CWJones | Logout | Account | Help | Feedback | (3)

Home | My Twines | My Connections | Explore | Start a Twine    [       ] Search

Explore Twines

Filter Twines

[Recently Updated ▼]    ◄--- [1] of 10 ---►

Tags
Add
celebrities
competition
cuisine
Dancing With the Stars
dataweb
dining
drink
drinking
ethics
FAQ
food
food and drink
human rights
internet
music industry internet
delivery distribution mp3
piracy RIAA label record
Nova Spivack
Radar Networks
Sand Francisco
san francisco
show
Stars
Technology
television
TV
web
Web 2.0
Web 3.0

Y's Twine
Last updated: Nov 06, 2007 Items: 5 Connections: 1 Private Owner: fyy
This is Yenyun's general Twine where she collects various articles of interest to her. Thoughts and comments are most certainly welcome ( Join )

San Francisco Food and Drink
Last updated: Nov 04, 2007 Items: 5 Members: 2 Public Owner: bhope
This is a place to suggest your top picks for food and drinks in San Francisco.

( Request Membership )

Future Of Music
Last updated: Nov 01, 2007 Items: 3 Members: 3 Public Owner: joshk
A collection of links and discussions about the state of the music industry, now and in the near future.

( Invite Members ) ( Manage )

Twine FAQ's
Last updated: Nov 01, 2007 Items: 32 Members: 27 Public Owner: smy
This is a twine with answers to frequently-=asked questions about Twine.com, for users of the Twine.

( Invite Members )

Human Rights
Last updated: Oct 06, 2007 Items: 0 Connections: 7 Public Owner: tcc
Human Rights ( Join )

Dancing With the Stars
Last updated: Oct 16, 2007 Items: 16 Members: 7 Public Owner: tcc
Dancing With the Stars ( Join )

Web 3.0 – Semantic Web
Last updated: Nov 06, 2007 Items: 38 Members: 29 Public Owner: nova
Web 3.0 – Semantic Web ( Join )

FIG. 13A twine

Home | My Twines | My Connections | Explore   Start a Twine

CW.Jones | Logout | Account | Help | Feedback | (3)
Search

Y's Twine

[ Summary ] [ Items ] [ Members ] [ Manage ] [ Add Item ]

This is yy's general Twine where she collects various articles of interest to her. Thoughts and comments are most certainly welcome.

Updates
Nova has joined this net
Josh has commented on the image Vacation in London

Recent Items View All Items

TheatreWorks in Mountain View
Bookmark added by Me to My Twine on Nov 06, 2007
Twelfth night showing end of Nov !!

Yoshi's SF
Bookmark added by Me to My Twine on Nov 06, 2007
New opening of Yoshi's in SF Palo Alto Players Theatre Season Shows
Bookmark added by John to My Twine on Nov 06, 2007
For the nerds and nerdettes, lights, camera, action! It's Heisenberg's Uncertainty Principle and the Bohr Hydinen Moda live and in Palo Also

Active Members View All

Bob Hope  Connection
Joined on Jul 4, 2007
Nets: 15 | Items: 2042

Bucky Fuller  Connection
Joined on Jul 4, 2007
Nets: 15 | Items: 2042

Bucky Fuller  Connection
Joined on Jul 4, 2007
Nets: 15 | Items: 2042

About this Twine  — 1304
Founded:  1/1/2004
Members:  23,332
  Invite Members
  Leave
Items:    1,212
Members:  23,332
Policies: Open Membership
          Comments Enabled
Post by Email:
yy@post.twine.com ▼ People — 1306
Gonzalo Rubalcaba
Margrethe
Werner Heisenberg
▲ Places
▲ Organizations
▲ Other Tags
▲ Types of Items 1308
1302

FIG. 13C

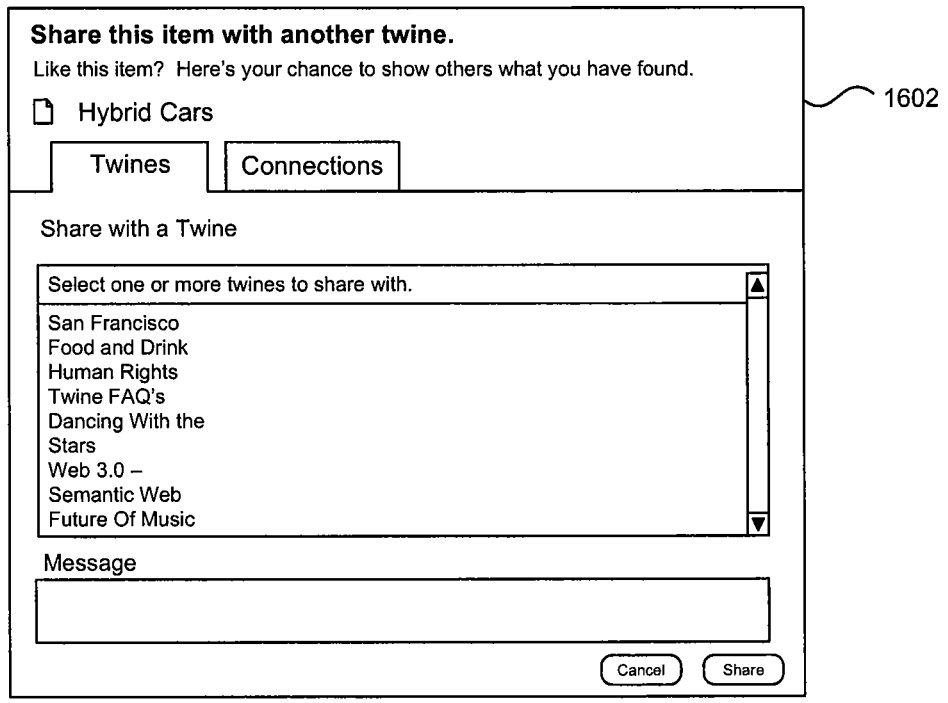
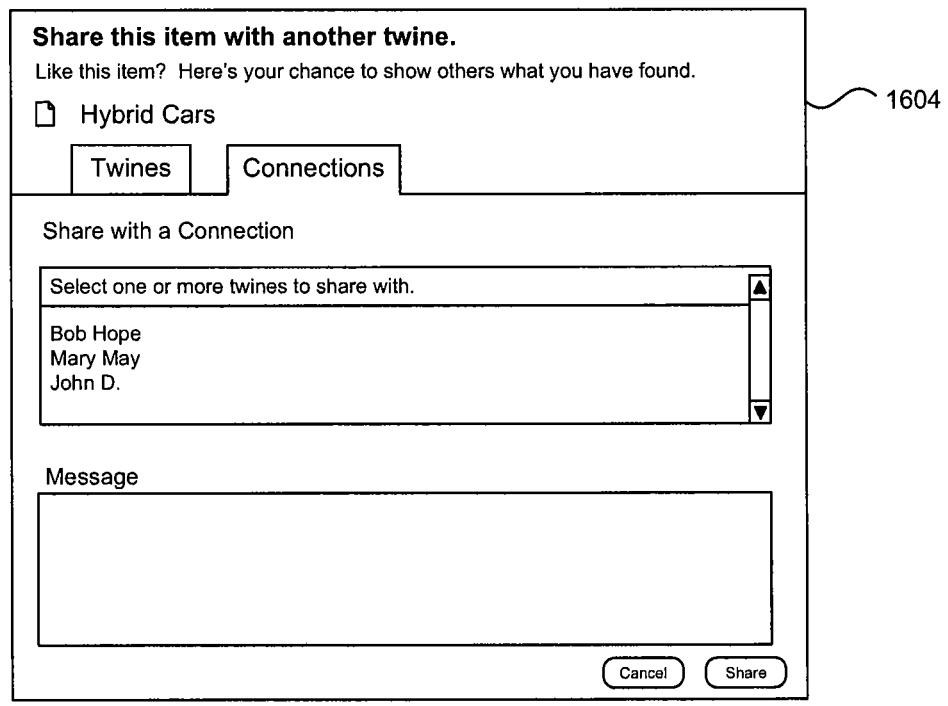
*FIG. 16A*

My Net/Import Bookmarks twine  My Net    Browse    Start a Net

My Net
Views | Items | Contacts | Manage | About

Import Bookmarks

Twine can import your bookmarks from Internet Explorer, Firefox, and Safari

On Windows                                On Macintosh                              1702

Internet Explorer                         Safari

Your bookmarks file's default location    Your bookmarks file's default location
is C:/yourname/ie/bookmarks.xml       is ~/Library/Safari/bookmarks.xml
Browse for it and submit it.              Browse for it and submit it.

Firefox                                   Firefox

Your bookmarks file's default location    Your bookmarks file's default location
is C:/yourname/ff/bookmarks.xml       is ~/Library/Firefox/bookmarks.xml
Browse for it and submit it.              Browse for it and submit it.

Submit your bookmark file

[                          ]  ( Browse )

( Submit )  ( Cancel )

My Net/Items twine  My Net    Browse    Start a Net

My Net                                                                          1704
Views | Items | Contacts | Manage | About

My Items

( Add Item )  ( Import ▼ )  ( Track ▼ )

*FIG. 17A*

My Net/Import Bookmarks

| twine | My Net | Browse | Start a Net |

My Net
Views | Items | Contacts | Manage | About

Import Bookmarks

Please choose and verify the Bookmarks you would like to import.                                                                1706

| | Bookmark Name | Description | URL/Path | Tags | Type |
|---|---|---|---|---|---|
| ☒ | Bookmark Name | "A nice site" | http://www.url.com/ | work, play, art | web page |
| ☒ | Bookmark Name | "A nice site" | http://www.url.com/ | work, play, art | web page |
| ☒ | Bookmark Name | "A nice site" | http://www.url.com/ | work, play, art | picture |
| ☒ | Bookmark Name | "A nice site" | http://www.url.com/ | work, play, art | web page |
| ☒ | Bookmark Name | "A nice site" | http://www.url.com/ | work, play, art | web page |
| ☒ | Folder Name ▼ | | | | |
| ☒ | Bookmark Name | "A nice site" | http://www.url.com/ | sports | web page |
| ☒ | Bookmark Name | "A nice site" | http://www.url.com/ | sports | video |
| ☒ | Bookmark Name | "A nice site" | http://www.url.com/ | sports | web page |
| ☐ | Bookmark Name | "A nice site" | http://www.url.com/ | sports | INVALID URL |
| ☒ | Bookmark Name | "A nice site" | http://www.url.com/ | work, play, art | web page |
| ☒ | Bookmark Name | "A nice site" | http://www.url.com/ | work, play, art | audio |
| ☒ | Bookmark Name | "A nice site" | http://www.url.com/ | work, play, art | web page |
| ☒ | Bookmark Name | "A nice site" | http://www.url.com/ | work, play, art | web page |
| ☒ | Bookmark Name | "A nice site" | http://www.url.com/ | work, play, art | MS Word |
| ☒ | Bookmark Name | "A nice site" | http://www.url.com/ | work, play, art | Flash |
| ☐ | Bookmark Name | "A nice site" | http://www.url.com/ | work, play, art | DUPLICATE |
| ☒ | Bookmark Name | "A nice site" | http://www.url.com/ | work, play, art | web page |
| ☒ | Bookmark Name | "A nice site" | http://www.url.com/ | work, play, art | web page |

( Import )  ( Cancel )

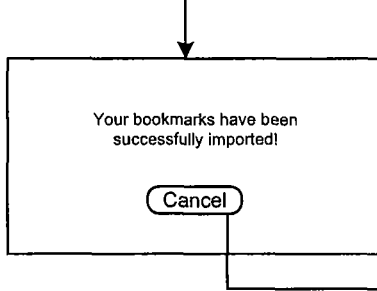

Your bookmarks have been successfully imported!

( Cancel )

Send them to My Net/Items to see the import populate their items.

*FIG. 17B*

My Net/Import Contacts twine  My Net   Browse   Start a Net

My Net
Views | Items | Contacts | Manage | About

Import Contacts

Twine can import your contacts from MS Outlook or other application via a CSV-formatted file.

Submit your Contact list in CSV format.

[            ] ( Browse )

( Submit ) ( Cancel )

~ 1712

My Net/Contacts twine  My Net   Browse   Start a Net

My Net
Views | Items | Contacts | Manage | About

My Contacts

( Add Contacts ) ( Import Contacts ) ( Track ▼ )

~ 1714A

Import button reveals dropdown menu.

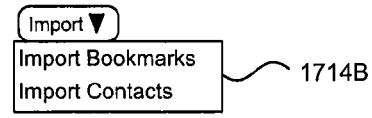

SYSTEM AND METHOD OF A KNOWLEDGE MANAGEMENT AND NETWORKING ENVIRONMENT

CLAIM OF PRIORITY

This application claims priority to U.S. Patent Application No. 60/972,815 entitled "System and Method of Collecting Market-related Data Via A Web-Based Networking Environment", which was filed on Sep. 16, 2007, the contents of which are expressly incorporated by reference herein.

TECHNICAL FIELD

The present disclosure relates generally to knowledge networking, and in particular to semantics enabled knowledge networking.

BACKGROUND

Human intelligence and knowledge is becoming increasingly digitized. Not only is information and data generated and created digitized form, frequently, knowledge, information, and other forms of intellectual content are increasingly distributed, disseminated, collected, shared, and/or edited in digitized form.

Traditional formats of knowledge dissemination via books and magazines continue albeit various efforts exist to create digital formats of existing books and magazines that are accessible via the Internet through channels such as online libraries with public or restricted (e.g., subscription-based access). Furthermore, scientific publications and research journals are becoming predominantly accessed by scholars and researchers via online channels since they are typically available sooner than their hardcopy counterparts. Online dictionaries, encyclopedias, wikis (e.g., Wikipedia), have become an integral source of many formal and informal education processes.

In addition, due to ease of digital communication and dialogue to facilitate information exchange, intellectual content is being created in forms logged in formats such as through email text, instant messaging, RSS, portable devices (e.g., SMS and email), digital images, videos, and/or web-based social networks, etc. The wide-array of formats in which intellect is being distributed among has made knowledge management and collection a daunting task in the digital age.

For example, with the vast-array of digitized intellectual content distributed among various sources and formats, searching for the relevant information has become difficult. Web-based search engines that focus on keyword matches for various document fields such as author, abstract, key-topics, full-text sometimes do not yield the most relevant search results to the user. In other situations, a keyword which is relevant to content of a specific topic, simply is not explicitly documented in an article.

Further, managing ones knowledge collection via creating files and folders in ones desktop operating system no longer suffices the need to efficiently manage ones collection of content and for the user to effectively identify/locate the content of relevancy.

SUMMARY OF THE DESCRIPTION

A variety of systems, methods, techniques and strategies related to knowledge management and sharing via a web-based networking environment to leverage collective intelligence are described here. Some embodiments of the present disclosure are summarized in this section.

In one aspect, embodiments of the present disclosure include a method, which may be implemented on a system, of identifying a set of tags in a plurality of objects in a webspace. The method includes detecting a parts-of-speech portion of the set of tags that are parts-of-speech via natural language processing and expression analysis. The parts-of-speech, in some embodiments, include at least one of a noun, a verb, a noun phrase, and/or a proper noun. The method can, in some embodiments, further include detecting an entity portion of the set of tags that are entities via one or more entity detection mechanisms. The entities can include at least one of a person, place, organization, product, event. A metadata portion of the set of tags can be identified based on metadata of the plurality of objects. In addition, a portion of the set of tags can be identified via detecting one or more of the portion of the set of tags in a pre-determined knowledge database. In some embodiments, the set of tags are represented as one or more of strings, and semantic objects.

In one embodiment, the one or more entity detection mechanisms comprise linguistic rules, semantic rules, and/or statistical properties of terms in an object of the content collection. Further the pre-determined knowledge database can include one or more of a set of ontologies, a set of taxonomies, a set of folksonomies, a set of known entities, and/or a set of known topics. In addition, one or more concepts that one or more objects of the plurality of objects encompasses can be identified via Bayesian classification. One embodiment includes tracking tags that are edited by users. The editing of a tag can include one or more of, adding a tag, editing metadata of a tag, and/or removing a tag.

One embodiment further includes converting a given tag of the set of tags into semantic objects. For example, a first tag of the set of tags can be converted into a semantic object in response to, receiving an edit request from a user to edit the first tag of the set of tags and/or receiving a comparison request to compare the first tag of the set of tags to a structured knowledge database. The structured knowledge database can include one or more of taxonomy and ontology. In addition, a prefix of the first tag can be represented as a semantic object, wherein the prefix of the first tag provides an indication of a category of the first tag.

In one aspect, embodiments of the present disclosure include a method, which may be implemented on a system, of identifying subject matter embodied in a piece of intellectual content. One embodiment includes analyzing classified content spreading a plurality of subject matter categories in a knowledge database with a pre-determined structure. The pre-determined structure can provide structured information regarding the plurality of subject matter categories and one or more sub-categories of the subject matter categories. In addition, the knowledge database may include a plurality of intellectual content comprising one or more of articles, documents, and/or data categorized as at least one of a subject matter category of the plurality of subject matter categories and one subcategory of the one or more sub-categories. The embodiment further includes determining a set of statistical classification rules for identifying intellectual content having an indication of embodying a particular subject matter of the plurality of subject matter categories.

In one embodiment, the piece of intellectual content is analyzed via a Bayesian classification process and estimating a probability that the piece of intellectual content embodies one or more subject matters of the plurality of subject matter categories. In addition, the Bayesian classification process is performed in a hierarchical fashion. According to embodiments of the present disclosure, the hierarchical fashion is carried out via determining whether the piece of intellectual content embodies a sub-category of a particular subject matter category of the plurality of subject matter categories, when the piece of intellectual content is determined to embody the particular subject matter. One embodiment further includes identifying one or more subject category tags in the piece of intellectual content based on the embodied subject matter.

In another aspect, embodiments of the present disclosure include a method, which may be implemented on a system, of responding to a search query. One embodiment includes receiving a request to generate a set of search results based on a search query provided by a user and identifying the set of search results comprising a set of objects, the set of objects to be identified from a least a portion of a plurality of objects in a web-space, a specific object of the set of objects to have at least one semantic relationship with the search query. The specific object of the set of objects can be within a predetermined degree of separation from the user. One embodiment includes determining a degree of separation between the user and one or more objects of the set of objects and/or providing the set of search results comprising the set of objects to the user, the providing of the one or more objects of the set of objects to include an indication of the degree of separation between the user and the one or more objects of the set of objects.

One embodiment further includes ranking one or more of the set of objects based on the degree of separation between the one or more of the set of objects and the user. The web-space, in some embodiments, includes one or more web-based networking environments and an object may be, for example, one or more of a given user, a net, and an item in the web-space. One embodiment of the present disclosure includes tracking relational attributes between objects. In some embodiments, the net includes a subset of objects in the web-space, wherein each object of the subset of objects has an explicit relational attribute with at least one other object in the subset of objects. The explicit relational attribute can, in most instances, include one or more of an item added by a specific user, a given user who is a contact of another user, and a specific item that is associated with a specific net.

One embodiment further includes, identifying at least a subset of the plurality of search results based on a textual relevance with one or more of the search query and/or identifying metadata of the plurality of objects; wherein the metadata of the plurality of objects is identifiable via meta-tags provided by one or more users. In one embodiment, the metadata of the item includes information associated with one or more of a type, property, intellectual content, a set of keywords, a set of tags, attributes, timing data, version data, and/or access rights of the item. In one embodiment, the metadata of the plurality of objects provides data associated with multimedia composition of the web content, wherein the multimedia composition comprises one or more of textual, graphics, video, interactive, and animation content.

The present disclosure includes systems which perform these methods, including processing systems which perform these methods, and computer readable media which when executed on processing systems cause the systems to perform these methods.

Other features of the present disclosure will be apparent from the accompanying drawings and from the detailed description which follows.

BRIEF DESCRIPTION OF THE DRAWINGS

FIG. 6C illustrates an example screenshot of a graphical user interface for sharing the web content shown in FIG. 6B with another user net, according to one embodiment.

FIG. 6D illustrates an example screenshot of a graphical user interface for sharing the web content shown in FIG. 6B with another user, according to one embodiment.

FIG. 7B illustrates an example screenshot of an applet for adding web content to the knowledge management and networking environment from the original web page hosting the web content, according to one embodiment.

FIG. 8E depicts tables illustrating example lists of the types of explicit relationships and implicit relationships that can exist among objects in the knowledge networking environment, according to one embodiment.

FIGS. 10A-10B illustrate an example user interface for signing up for the knowledge networking environment and an example user interface for viewing and/or editing the user's profile, according to one embodiment.

FIGS. 11D-11E illustrate an example user interface showing a list of contacts, according to one embodiment.

FIG. 12A illustrates an example user interface showing a user welcome screen, according to one embodiment.

FIGS. 12B-12C illustrate an example user interface showing a view of objects (items) in a net and an example user interface for exploring/browsing nets, according to one embodiment.

FIGS. 13A-13B illustrate an example user interface showing the home page of a net, according to one embodiment.

FIG. 13C illustrates an example user interface showing an object (item) posted to a net via email, according to one embodiment.

FIG. 16A illustrates screenshots of example user interfaces for sharing objects (items) with nets and connections, according to one embodiment.

FIGS. 17A-17B illustrate example user interfaces for importing bookmarks, according to one embodiment.

FIGS. 17C-17D illustrate example user interfaces for importing contacts, according to one embodiment.

DETAILED DESCRIPTION

Figure 1:
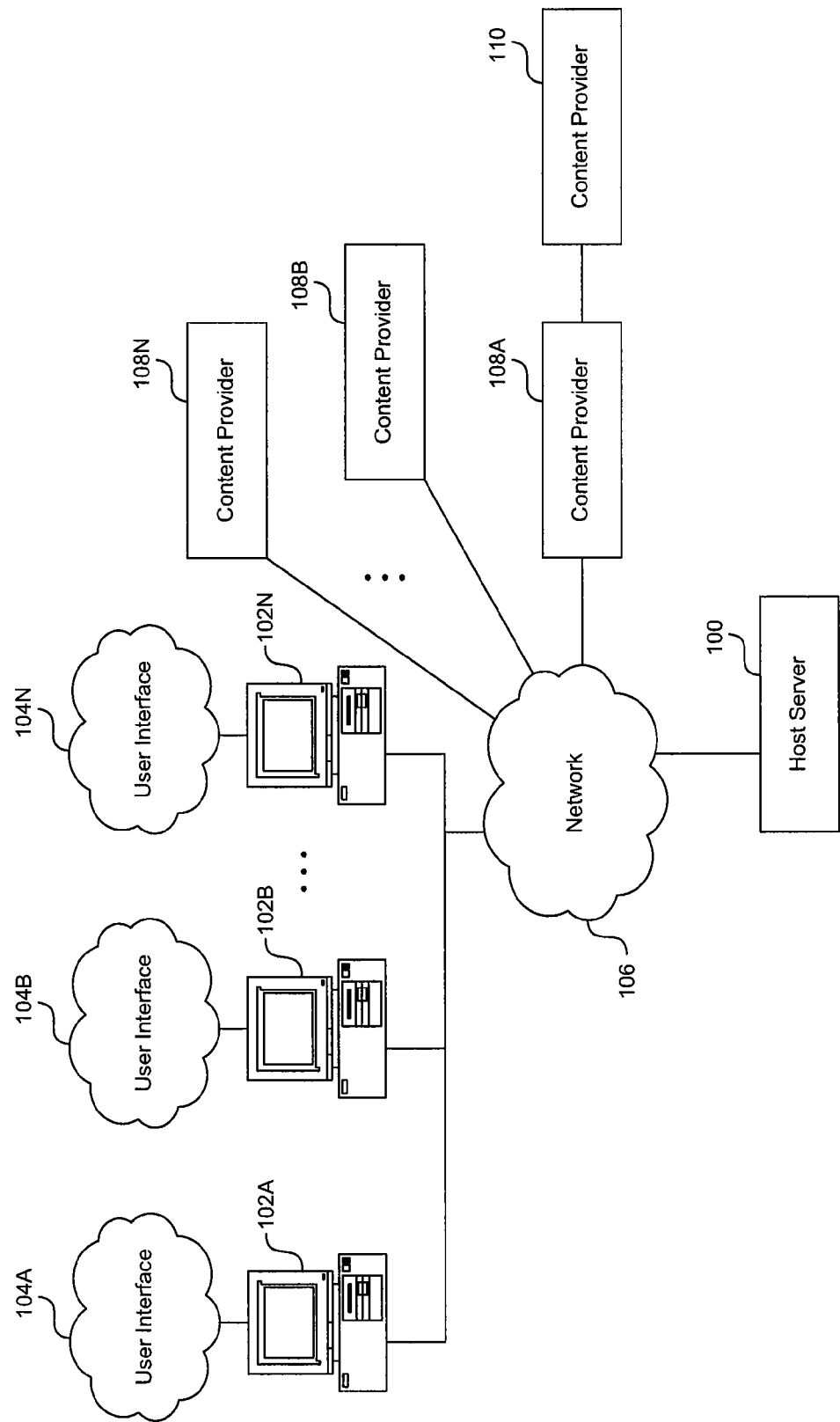
FIG. 1 illustrates a block diagram of a plurality of client devices able to communicate with a plurality of content providers and a server hosting a knowledge management and networking environment through a network, according to one embodiment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods of knowledge management and networking environment, for example, through profiling collective data and/or profiling users. Some embodiments of the present disclosure further include semantically identifying relationships between data profiles and user profiles to facilitate the management of information, and in some instances, the identification of information to potential interest to users.

In one aspect, the present disclosure relates to management of a collection of knowledge and intellectual content in various digital forms provided by users.

Users can contribute to the collection of intellectual content in the knowledge networking environment by adding a variety of web-items to the networking environment. Web-items can include content of various digital formats. The users can further provide user profile information to the knowledge networking environment. For example, a user wishing to have their collection of information automatically managed in an intelligent format can add this collection to the knowledge networking system. Therefore, through the system, the user thus has a centralized knowledge database through which to access their collective knowledge that is managed and organized based on intellectual content.

In addition, users typically have the option of providing information about themselves, for example, through a user profile interface provided by the networking platform. The networking environment can utilize such information to deliver personalized services such as providing more relevant search results and identifying the presence of information in the network and/or database of potential interest to a user but does not currently exist in the user's knowledge network.

Typically, the user is additionally able to specify the privacy and access attributes of content added to the knowledge networking platform. The knowledge networking environment enforces these rules when facilitating the knowledge management and information sharing among the network of users in the networking environment.

Additionally, the networking platform identifies metadata associated with added content and user information and further determines tags (e.g., keywords or semantic tags) associated with user profiles and content in the networking environment. Identification of metadata provides an avenue through which the networking environment can manage knowledge for a user and to facilitate efficacious information sharing and distribution among the network of users.

In one aspect, the networking platform provides a mechanism for users to create nets, or a subset of web-content of the collective knowledge and information in the networking platform.

The user can create a net via an interface provided by the networking environment. The user can specify a name for the net. In addition, in most instances, the net creator can determine the content and the types of content that can be added to the net. Further, the net creator typically sets membership criteria specifying who can join the net and have access to one or more specified sets of content in the net. In addition, rights to edit content can also be specified by the net creator. Other users/members with administrative rights including those to determine access rights and membership criteria can be designated as well The net, is typically intended as a channel through which to facilitate efficacious sharing and distribution of information by grouping a sub-set of information under one net. Although there is no limitation or specification on the type of knowledge/information that can be added to a net, the net can be used as a user group where a specific cause or idea is promoted. The net can be focused on collecting content related to a particular topic and to gather collective user input on the topic. In most instances, the net has varying levels of access attributes associated with the contents residing within. For example, the creator can designate a set of contents to be private and is thus only visible to the creator and, in some instances, a specific set of members. In addition, a shared access level can be specified for a set of content that is accessible by all members of the net. Similarly, a public access level may be granted to some content that can be accessible by the public, for example, users who are not members of the net, and/or users that are visitors of the networking environment.

Similarly, those with administrative rights in the net, such as but not limited to the creator user, typically specifies rights to add and edit items in the net. For example, members of the net, including the net creator, can contribute to the net by adding knowledge and content, when authorized. The networking environment can distribute and share this added information with other members and in some instances, visitor members of the net, based on user specification and rules applicable to the particular net. In one aspect, the present disclosure further relates to identification of tag that are strings and/or semantic in web-based objects.

The web-based objects can be, by way of example, but not limitation, an email message, a text message forwarded as an email, an RSS feed, a document/article, a note, user profile accessible by the networking platform. Tags can be detected via an automatic process and/or via a manual process facilitated by a user. For example, tags are typically automatically detected as parts-of-speech detection by natural language process and/or via entity detection. In addition, tags are, in some embodiments, automatically detected from metadata associated with the web-based objects. Other methods of tagging include using identified subject matter of a web-based object to assist and facilitate the tagging process.

In some situations, tags can be used to track interests and hobbies of a user. For example, the number of times the same tag is detected in a user's knowledge collection provides an indication of the level of interest the user has in a particular topic. Similarly the number of different web-objects that the same tag appears in may also be an indication of interest level in a particular topic. By comparing tags against a knowledge database (e.g., ontologies, taxonomies, folksonomies, facts, statistics, Q & As, FAQs, etc.), various pieces of intellectual content in the knowledge networking environment can be semantically linked. The linkage provides a pathway for distributing and offering information/knowledge to other users intelligently and efficaciously.

In one aspect, the present disclosure relates to enabling a user to search for objects in the networking environment associated with other users that have specific types of relationships with the user. In one aspect, the present disclosure relates to providing recommendations of objects to users having a potential interest in the objects.

For example, a user may wish to search for objects related to vacation pictures, but only among family members of the user. In addition, the user may wish to search to search for documents related to patent law, but only among the user's colleagues. Other types of objects can be searched for. In a further example, a user may wish to search for the contact information of a business contact who is connected with friends and/or other contacts of the user that are within three degrees of separation from the user.

In some instances, if a connected or unconnected users has, in their database, such as an article that the knowledge environment determines may be of interest to a user, the system may provide the recommendation to the user indicating that another user has an article of potential interest. Depending on the privacy preferences and setting of the connected or unconnected user, the article can automatically be made available to the user. If the user providing the article does not allow their objects to be automatically made available, a request may be relayed to the provider and access can be granted upon approval of the provider.

A user can opt in to receive recommendations (e.g., push-model based sharing) because users may not always know the search query terms to use to pull up relevant search results. Further, new objects are typically continuously being added by existing users and/or new users of the networking platform and opting in to receive targeted/focused intelligent recommendations can be an efficient way of keeping track of new objects that may be of potential interest.

In one aspect, the present disclosure relates to semantically socially linking users in the knowledge network and knowledge/intellectual content contributed to the network.

The semantic social link can be provided between multiple users, between users and content, and/or between content and content. For example, two users can be semantically socially linked when aspects of their user profiles have semantic relations. In addition, two users can be semantically socially linked when their respective knowledge collections (e.g., web-content, contacts, emails, notes) have semantic relations.

In one aspect, the present disclosure relates to providing search results to a user that includes an indication of the social distance between the search results and the user in the networking platform.

The social distance between a search result and a search user is proportional to the degree of social separation between the search user and the user associated with the search result. For example, if the search query results in two documents, the first document was added by a first degree contact whereas the second document was added by a third degree contact, the first document may be ranked higher than the second document, given the same keyword and/or semantic relevance. For example, if a user wishes to search for scientific publications within a particular research field, the user may trust and therefore prefer to see publications provided by researchers at the same resident research institute rather than a neighboring institute.

In one aspect, the present disclosure relates to facilitating sharing and distribution of intellectual content among users (e.g., visitors and/or service subscribers) of the networking environment.

Users can add items to the networking environment from a number of external or third party sources. In addition, items can be created by the user. For example, the user (e.g., a visitor and/or service subscriber) can have one or more nets with differing themes where each net has a collection of web content related to the particular theme of the net. Items may include, by way of example but not limitation, third-party web content, web content developed by the user, emails, photography, contacts, notes, links, events, tags, and/or any other textual, image, video, animated data.

The user (e.g., a visitor and/or service subscriber) may be, in some embodiments, an individual, an institution, business entity, non-profit organization, or any other entity wishing to promote an idea, service, and/or product through for example, increased publicity, product placement, publication, announcement, broadcast, commercial, endorsement, sponsorship, and/or sales promotion. For example, the user (e.g., a visitor and/or service subscriber) can be, but is not limited to, a political party, a political candidate, a lobbying group, an interest group, a religious organization, a company, a university, an online retailer, an online wholesaler. Thus, promotional content can be supplied to the networking environment to increase public exposure for access and/or distribution purposes, in the push model and/or the pull model-based promotional content distribution.

Since the networking environment hosts a number of users (e.g., a visitor and/or service subscriber), and in many instances, the systems and methods have access to and manage information of the services subscribers, focused and targeted distribution of promotional content to those likely to have an interest can be achieved. In addition, promotional content is further propagated through the connections of a user to other users. For example, connected first and second users can have access to each other's items.

Users can actively send web content (e.g., promotional content) to other users to whom the content may be of interest. Services subscribers (e.g., users) can create groups or join groups having a common theme or interest (e.g., public or private nets). Promotional content relevant to the theme or interest can be automatically posted or shared with group members. Other methods through which promotional content can be distributed through a networking environment are contemplated and do not deviate from the novel art of this disclosure.

In one aspect, the present disclosure relates to determining statistical attributes associated with the popularity (e.g., sharing and/or distribution) of promotional content on the networking environment.

Raw data related sharing and distribution of objects including promotional content on the networking environment can be collected and stored, to gauge interest in the promoted content. In addition, the sharing and distribution of promotional content can be measured relative to users and/or user data. In one embodiment, statistical attributes of data related to object distribution and sharing that can be determined, include, but is not limited to, the number of visitors and/or service subscribers that collected the object, the number of visitors who collected and/or shared the object, average number of sharing actions per visitor/service subscriber, speed of spread of object, acceleration of spread of object, the volume of object collecting per unit time, and/or the demographic, geographic, and/or psychographic distributions of the statistical attributes.

Further, in addition to statistical analysis, additional analyses can be performed on recorded data regarding sharing and distribution of promotional content. For example, curve fitting, principle component analysis, data mining, or discarding and retaining subsets of data according to certain criteria, can be performed and do not deviate from the novel art of this disclosure. In addition to sharing and distribution, metrics related to the performance level of promotional content can be measured and quantified. For example, performance metrics can include, number of views of the object, number of visits to a third party site to obtain more information on the promoted content, number of searches performed on the networking environment to obtain more information on the promoted content, number of purchases that resulted from the objected placed on the networking environment, etc.

In some embodiment, raw data and/or results of data analysis can be provided to the content providers upon request or automatically such that the content providers can deduce market related information regarding the promotional content. Furthermore, performance metrics (qualitative and quantitative) of the promotional content, can be provided to the content providers. The content providers may use the performance metrics, e.g., to determine the effectiveness of various marketing channels or various formats/digital content of the objects.

In one aspect, the present disclosure relates to a tiered fee structure to provide varying levels of marketing-related services to suit the varying business needs of clients (e.g., sponsors and/or promotional content providers).

Since the networking environment has access to user data (e.g., subscription information, user declared hobbies/interests, implicit interests identified from: objects collected, types of objects collected, content of objects collected, etc.), targeted and contextual advertising can be provided to the content provider. The content provider can identify service subscribers having particular hobbies/interests, subscribers that belong to certain interest groups/nets/discussion groups, and/or forums, for targeting distribution of the promotional content.

In addition, historical trends including raw data and/or the analyzed data of a similar product/service previously promoted through the networking environment provide additional insight to a content provider, such as identifying specific demographics that have demonstrated interest in the product/services. Such options and access to historical data can be provided to content providers, free of charge, or on a fee basis such that the content providers and/or sponsors can better position their promotional content.

In one embodiment, semantic matching and placement can be offered to promotional content providers and/or sponsors, for example, free of charge, on a fee basis, or through any suitable scheme. For example, through semantics, a particular product/service can be linked to another relevant product/service such that placement and distribution on the networking environment can expand further to users not identified on keyword matching alone. In one aspect, the present disclosure relates to providing marketing-related services based on semantic matching. Objects with promotional content can be tagged, automatically or manually, with semantic meta-tags. In addition, user metadata can include semantic metadata, thus enabling the networking system to perform semantic matches, among objects (e.g., items including promotional content), between objects and users, and among users.

In most instances, privacy attributes (inherent to the system, specified by the content providers and/or the users) govern the interactions occurring in the networking system. The privacy attributes typically include a set of rules governing the connecting, sharing, distribution, and/or access rights of objects by services subscribers and content providers. The rules are tracked and enforced in the transactions and interactions between items, users and items, users and users, etc. In some embodiments, interactive marketing, mobile marketing, and/or social marketing are facilitated in the networking environment through utilizing intelligent knowledge of promotional material and user information.

FIG. 1 illustrates a block diagram of a plurality of client devices 104A-N able to communicate with a plurality of content providers 108A-N, 110 and a server 100 hosting a knowledge networking environment through a network, according to one embodiment.

The plurality of client devices 104A-N and content providers 108A-N, 110 can be any system and/or device, and/or any combination of devices/systems that is able to establish a connection with another device, a server and/or other systems. The client devices 104A-N and content providers 108A-N, 110 typically include display or other output functionalities to present data exchanged between the devices to a user. For example, the client devices and content providers can be, but are not limited to, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. In one embodiment, the client devices 104A-N and content providers 108A-N, 110 are coupled to a network 106. In some embodiments, the modules may be directly connected to one another.

The network 106, over which the client devices 104A-N and content providers 108A-N, 110 communicate, may be a telephonic network, an open network, such as the Internet, or a private network, such as an intranet and/or the extranet. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices, host server, and/or the content providers 108A-N, 110 and may appear as one or more networks to the serviced systems and devices. In one embodiment, communications to and from the client devices 104A-N and content providers 108A-N, 110 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

Figure 2:
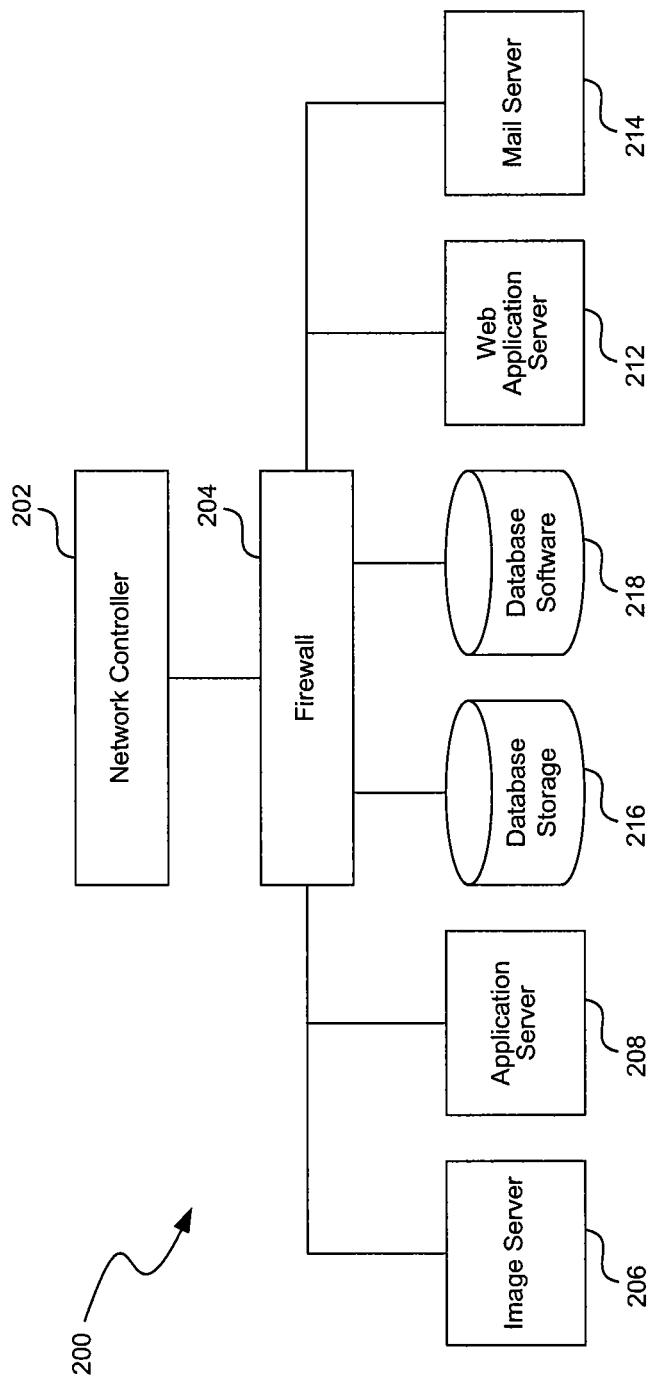
FIG. 2 depicts a block diagram of the components of a host server for a knowledge management and networking environment, according to one embodiment.

FIG. 2 illustrates a block diagram of the components of a host server 200 for knowledge networking, according to one embodiment.

In the example of FIG. 2, the host server 200 includes a network controller 202, a firewall 204, an image server 206, an application server 208, a web application server 212, a mail server 214, and a database including a database storage 216 and database software 218.

In the example of FIG. 2, the network controller 202 can be a networking device that enables the host server 200 to mediate data in a network with an entity that is external to the host server, through any known and/or convenient communications protocol supported by the host and the external entity.

The network controller 202 can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The firewall 204, can, in some embodiments, govern and/or manage permission to access/proxy data in a computer network, and track varying levels of trust between different machines and/or applications. The firewall 204 can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall 204 may additionally manage and/or have access to an access control list which details permissions including for example, the access and operation rights of an object by an individual, a machine, and/or an application, and the circumstances under which the permission rights stand.

Other network security functions can be performed or included in the functions of the firewall 204, can be, for example, but are not limited to, intrusion-prevention, intrusion detection, next-generation firewall, personal firewall, etc. without deviating from the novel art of this disclosure. In some embodiments, the functionalities of the network controller 202 and the firewall 204 are partially or wholly combined and the functions of which can be implemented in any combination of software and/or hardware, in part or in whole.

In the example of FIG. 2, the host server 200 includes the image server 206 or a combination of image servers to manage images, photographs, animation, and/or other types of image data. The image server 206 is any web server software suitable for delivering messages to facilitate efficacious retrieval of image data in web servers to be provided to other components and/or systems of the host server 200, for example when rendering a web page with images. In addition, the image server 206 can facilitate streaming data such as streaming images and/or video. The image server 206 can be configured separately or together with the web application server 212, depending on a desired scalability of the host server 200. Examples of graphics file formats that can be managed by the image server 206 include but are not limited to, ADRG, ADRI, AI, GIF, IMA, GS, JPG, JP2, PNG, PSD, PSP, TIFF, and/or BMP, etc.

The application server 208 can be any combination of software agents and/or hardware modules for providing software applications to end users, external systems and/or devices. The application server 208 can facilitate interaction and communication with the web application server 212, or with other related applications and/or systems. The application server 208 can in some instances, be wholly or partially functionally integrated with the web application server 212. The web application server 212 is any combination of software agents and/or hardware modules for accepting Hypertext Transfer Protocol (HTTP) requests from end users, external systems, and/or external client devices and responding to the request by providing the requestors with web pages, such as HTML documents and objects that can include static and/or dynamic content (e.g., via one or more supported interfaces, such as the Common Gateway Interface (CGI), Simple CGI (SCGI), PHP, JavaServer Pages (JSP), Active Server Pages (ASP), ASP.NET, etc.).

In addition, a secure connection, SSL and/or TLS can be established by the web application server 212. In some embodiments, the web application server 212 renders the web pages having graphic user interfaces of the networking environment as shown in the example screenshots of FIGS. 4-7. The web pages provided by the web application server 212 to client users/end devices enable user interface screens 104A-104N for example, to be displayed on client devices 102A-104N. In some embodiments, the web application server 212 also performs an authentication process before responding to requests for resource access and data retrieval.

In one embodiment, the host server 200 includes a mail server 214 including software agents and/or hardware modules for managing and transferring emails from one system to another, such as but is not limited to Sendmail, Postfix, Microsoft Exchange Server, Eudora, Novell NetMail, and/or IMail, etc. The mail server 214 can also store email messages received from the network. In one embodiment, the mail server 214 includes a storage component, a set of access rules which may be specified by users, a list of users and contact information of the users' contacts, and/or communication modules able to communicate over a network with a predetermined set of communication protocols.

The databases 216, 218 can store software, descriptive data, images, system information, drivers, and/or any other data item utilized by other components of the host server for operation. The databases 216, 218 may be managed by a database management system (DBMS), for example but not limited to, Oracle, DB2, Microsoft Access, Microsoft SQL Server, PostgreSQL, MySQL, FileMaker, etc. The databases 216, 218 can be implemented via object-oriented technology and/or via text files, and can be managed by a distributed database management system, an object-oriented database management system (OODBMS) (e.g., ConceptBase, FastDB Main Memory Database Management System, JDO-Instruments, ObjectDB, etc.), an object-relational database management system (ORDBMS) (e.g., Informix, OpenLink Virtuoso, VMDS, etc.), a file system, and/or any other convenient or known database management package.

In the example of FIG. 2, the host server 200 includes components (e.g., a network controller, a firewall, a storage server, an application server, a web application server, a mail server, and/or a database including a database storage and database software, etc.) coupled to one another and each component is illustrated as being individual and distinct. However, in some embodiments, some or all of the components, and/or the functions represented by each of the components can be combined in any convenient or known manner. Furthermore, the functions represented by the devices can be implemented individually or in any combination thereof, in hardware, software, or a combination of hardware and software.

Figure 3A:
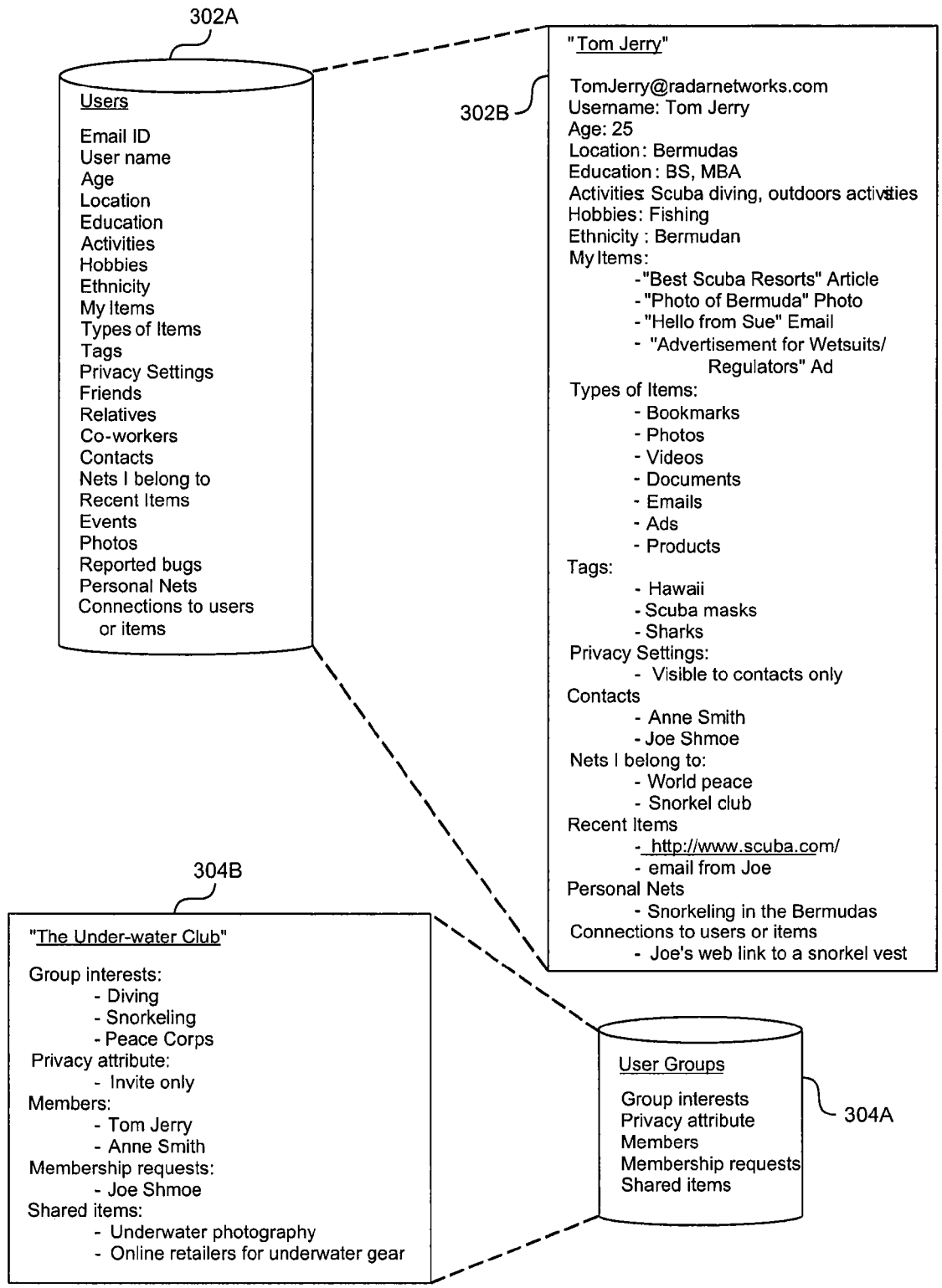
FIG. 3A depicts a block diagram illustrating a database for storing user information of users (visitors and/or service subscribers) and a database for storing user group information, according to one embodiment.

FIG. 3A depicts a block diagram illustrating a database for storing user information of users (visitors and/or service subscribers) 302 and a database for storing user group information 304, according to one embodiment.

In the example of FIG. 3A, the database 302A can store information about users, including visitors and/or service subscribers. For example, the user information stored can include descriptive data of personal information such as, but is not limited to, a first name and last name of the user, a valid email ID, a unique user name, age, marital status, occupation, location, education, home town, schools attended, number of siblings, heritage, ethnicity, race, etc. The user information further includes interest information, which may include, but is not limited to, activities, hobbies, professional information, photos, etc.

The database also stores web content (e.g., third-party) provided by the user, for example, the web content themselves can be stored, the types of web contents (e.g., email, vcf card, calendar events, web content, web links, etc.), tags in the web content, nets that the user belongs to, information of contacts, connections to other users and/or items, etc. In one embodiment, a user creates one or more nets with varying themes to which objects (e.g., web content) can be added. The user can also join nets created by other users and access items in the nets of the other users, while conforming to the access rights specified by the other users and specific for the nets. Further, in addition to storing information of contacts in the database, the user is able to connect to other users (e.g., visitors and/or service subscribers) and specify a designated relationship to the other users. The user's connections and the relationships of the connections (e.g., friends, relatives, and co-workers) are, in some embodiments, stored in the database.

In one embodiment, user information stored in the database is explicitly specified by the user. For example, when the user (e.g., visitor/service subscriber) signs up for access to the networking environment, a set of information may be required, such as a valid email address, a username, and/or age. A user information form can include optional entries, by way of example but not limitation, location, activity, hobbies, ethnicity, photos, etc. In one embodiment, user information is identified from web content the user added to the networking environment. For example, the networking environment can automatically determine user interests and/or hobbies based on the identified intellectual content of the web objects provided by the user. Hobbies and interest can also be determined by, for example, but are not limited to, the events that a user attends and/or common interests of a user's contacts.

Each entry or a category of entries (e.g., subscription information, personal information, interest information, etc.) related to user information in the database 302A can have permission settings regarding visibility and accessibility to other users. The privacy settings may, in some embodiments, vary between registered and non-registered users (visitors), contacts with different relationships with the user (e.g., a friend, colleague, family, etc.). In addition, the privacy settings may be different and individually specifiable for each contact of a user.

An example of the user information for the user "Tom Jerry" that is stored in database 302A is shown in 302B. The user "Tom Jerry" has an email address of "TomJerry@radarnetworks.com", an age of "25", is located in "Bermudas" and is "Bermudan" by ethnicity. The user "Tom Jerry" is recorded to have an education level of "BS, MBA", and likes to engage in activities related to "Scuba Diving, outdoors activities". Specifically, "Tom Jerry" is also interested in "Fishing". The items that "Tom Jerry" has provided include web content, photographs, and emails.

The database 302A also records information about the content of the items, for example, the items provided by "Tom Jerry" includes "blogs on fishing" and "advertisements for wetsuits/regulators", and "websites of online retailers selling scuba diving gear"; recent content includes http://www.scuba.com and "emails from Joe"; personal nets include "Snorkeling in the Bermudas". The tags of Tom Jerry's web content include "Hawaii", "Scuba masks", and "Sharks". "Tom Jerry" has also specified the privacy settings such that the contents of Tom Jerry's web objects and/or user information are "visible to contacts only". Tom Jerry's contacts include "Anne Smith" and "Joe Shmoe"; he belongs to the nets "World Peace" and "Snorkel Club"; he is also connected to another user's item, for example "Joe's web link to a snorkel vest".

With further reference to FIG. 3A, database 304A includes data related to information of user groups formed in the networking environment. A user can form a group, where invitees are invited to join the group. Alternatively, one or more users can create a group, for example, based on a common theme or interest. In other examples, groups may be formed as a channel for sharing information with a focused group of users within the networking environment, with or without a common interest. Group data in the database 304A, includes, for example, shared interests represented by the group. The database, in addition, stores information about the privacy attributes of the group, which can indicate group membership criteria, access to information posted in the group between group members and visitors, for example. Certain content and/or information may only be visible and/or accessible to a subset of members of the group. In addition, items posted on the group net may not be visible to users that are not members of the group. The database further stores membership information regarding the members of the group, membership requests, and/or items that are shared between group members.

An example of group information stored in the database 304A is shown in 304B for "the Under-water Club". The group interests include "diving", "snorkeling", and the "Peace Corps". The privacy attributes of "The Under-water Club" are "invite only", which indicates that a user can only join the group when a membership request is approved. Current members of "The Under-water club" include "Tom Jerry" and "Anne Smith"; a membership request is currently active for user "Joe Shmoe". The shared items between the members of "The Under-water Club" include "Underwater Photography" and "Online retailers for underwater gear".

Figure 3B:
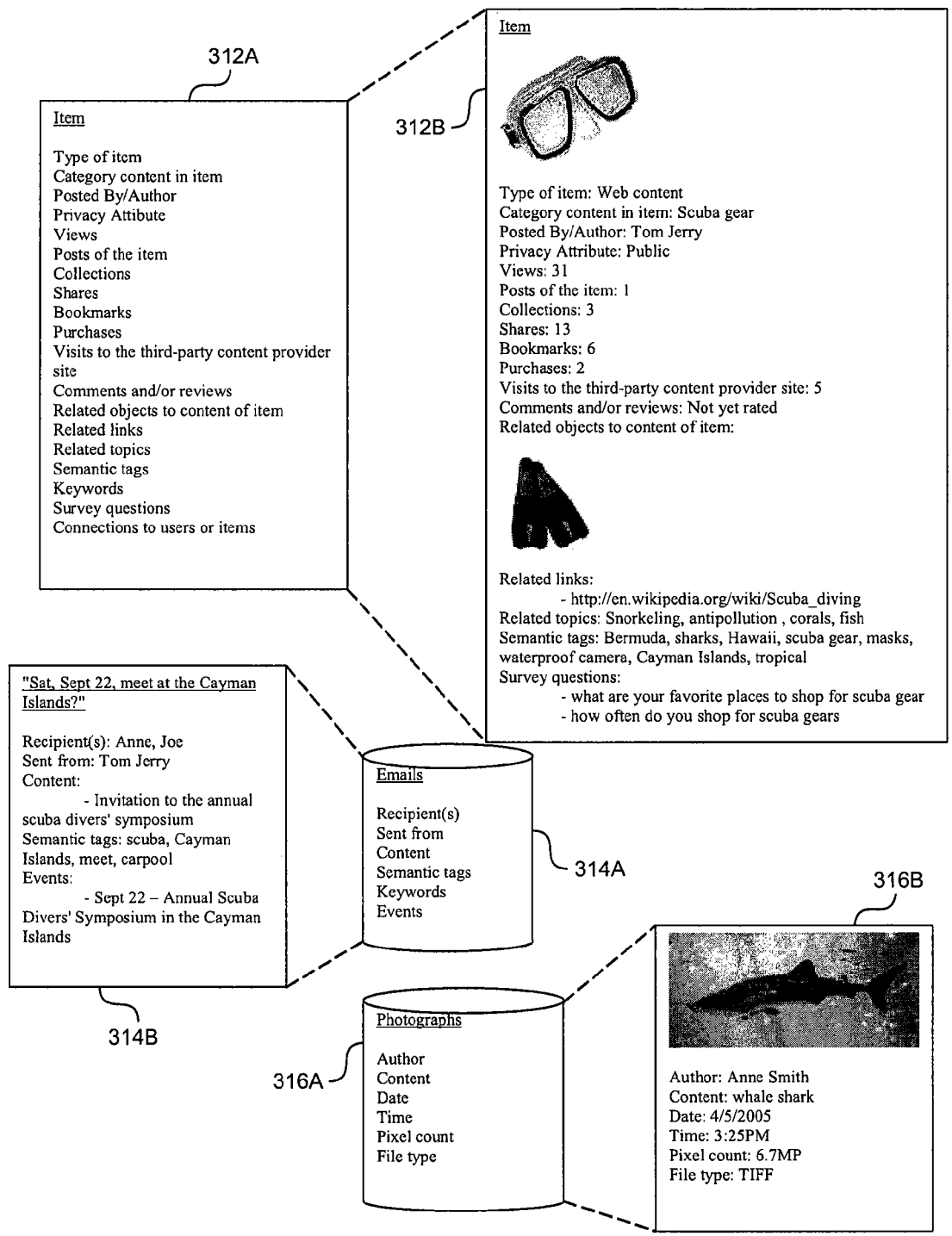
FIG. 3B depicts a block diagram of a database for storing items, a database for storing emails, and a database for storing photographs, according to one embodiment.

FIG. 3B depicts a block diagram of a database for storing items 312A, a database for storing emails 314A, and a database for storing photographs 316A, according to one embodiment.

The database 312A can store data regarding information of items (referred to herein after as "item data") provided by users. The items are, in some instances, web objects, such as, web content, emails, photography, emails, calendar events, contact information, etc. Item data stored in the database can also include information about the item type, the subject matter of the content provided in the item (e.g., whether the web content contains information regarding fishing, the presidential election, etc.), and/or who added the item to the networking environment (e.g., the user that posted the item, or the user that authored the item). Item data can also include information regarding the privacy attributes associated with the item. For example, if the item can be viewed publicly, if the item can only be viewed by registered users, if the item is blocked from particular users, if the item is public to users that belong to certain user groups, if the item is available upon request on an individual or subgroup basis, etc.

Item data may further include the number of views of the item. For example, the number of views can be stored as the total number of views since the item has been posted, the number of views for a predetermined amount of time (e.g., a day, an hour, last 12 hours, etc.), the total number of views from users that belong to a particular user group, from users having a particular interest, are some ways that popularity of an item can be determined. In some embodiments, the same item may be posted on the networking environment by different users, thus, the database can include item data to indicate how many users have posted the same item.

In addition, item data regarding the number of collections of an item can be stored in the database 312A. For example, once an item has been visited, a user may wish to add an item of interest to a net in the networking platform for future access. Similarly, a user may bookmark (e.g., add the link to the item as a bookmark in the web browser) an item for future access as an alternative to collecting the item. A user may also wish to share an item (e.g., that either the user posted on the networking environment or collected from another user) with a third user. In one embodiment, item data indicative of item popularity, including but not limited to, collection data, bookmarking data, and sharing data, data indicating shares with other nets, is stored in the database 312A.

Additional item data that may be indicative of item popularity include data of visits to the third-party web site hosting the web content provided by the item, transactions (e.g., purchases, sales, rents, leases, bids, etc.) that occurred due to viewing of the object via the networking environment, comments and/or reviews related to the web content provided by the object, for example. In one embodiment, item data stored in the database 312A include keywords identified from the content of the web object.

In some embodiments, item data include semantic tags identified from the web content, tagged by the system, tagged by the user that provided the web content, tagged by the third party content provider and/or tagged by the sponsor. Thus, in addition, content/items related to the web content, web links containing information related to the contents of the object, additional content including topics similar to content provided by the object can also be identified (e.g., based on a keyword match and/or a semantic match) and stored in the database 312A.

In one embodiment, survey questions can be presented to a user that demonstrated interest in the item. For example, interest can be indicated when the user clicks on a link to the item, when the user submits the item to the networking environment, when a user bookmarks the item, when a user shares the item, when a user collects the item, etc. The survey questions may be a predetermined default set of questions or the survey questions may be provided by the third-party that provided the web content. Thus, the survey questions associated with an item are stored in the database 312A, in one embodiment. The database 312A can further store data indicating the triggers that cause a particular survey question to be presented to a user. For example, a first set of questions can be presented to a user when the user adds the item to the networking environment, whereas a second set of questions are presented to a user when the user shares an item with another user on the networking environment.

An example of item data stored in the database 312A is shown in 312B. The type of the item is "web content" and content of the item belongs to the category of "Scuba gear". The item is posted by/authored by "Tom Jerry" and its privacy attribute is "Public". The item has had "31" views, "1" post, "3" collections, "13" shares, "6" bookmarks, and "2" purchases via the networking environment. The number of visits to the third-party content provider site from a viewing of the item on the networking environment is "5". The item status for comments and/or review is "Not yet rated".

An object that is related to the content of the item is stored on the database as an image of a pair of flippers. A related link to the content of the item is http://en.wikipedia.org/wiki/Scuba_diving. The related topics to item content include "Snorkeling", "antipollution", "corals", and "fish". The semantic tags related to the item include, "Bermuda", "sharks", "Hawaii", "scuba gear", "masks", "waterproof camera", "Cayman Islands", and "tropical". The survey questions associated with the item are "what are your favorite places to shop for scuba gear?" and "how often do you shop for scuba gear?"

The database 314A in the example of FIG. 3B stores the emails and data/ information associated with the emails (referred to herein after as 'email data') added by the users to the networking environment. Examples of email data that are stored include but are not limited to the recipient(s) of the email, whom the email is sent from, the content of the email, the semantic tags associated with the email, the keywords identified from the text body of the email, and/or scheduled events identifiable via the body of the email.

An example of email data stored in the database 314A is shown in 314B. The title of subject line of the email is "Sat. Sept 22, meet at the Cayman Islands?" The recipients of the email are "Anne" and "Joe", the email is sent from "Tom Jerry. The identified content of the email is an "Invitation to the annual scuba divers' symposium". The semantic tags identified from the email, either tagged by a user, specified by the content provider, or automatically identified by the networking environment, are "scuba", "Cayman Islands", "meet", and "carpool". The identified event to be scheduled in this email is "Sept. 22—Annual Scuba Divers' Symposium in the Cayman Islands".

The database 316A in the example of FIG. 3B stores the photographs and data/ information associated with the photographs (referred to herein after as 'photograph data') provided by the users to the networking environment. Examples of photograph data that are stored include but are not limited to the author of the photograph, the content of the photograph, the day/time the photograph was taken, saved, edited, and/or otherwise modified. The pixel count and file type of the photograph. An example of photograph data stored in the database 316A is shown in 316B. The author of the photograph is "Anne Smith", and the contents of the photograph include the "whale shark". The photograph was taken at "3:25 PM on 4/5/2005"; the pixel count of the photograph is "6.7 MP" and the file type is ".TIFF".

Figure 3C:
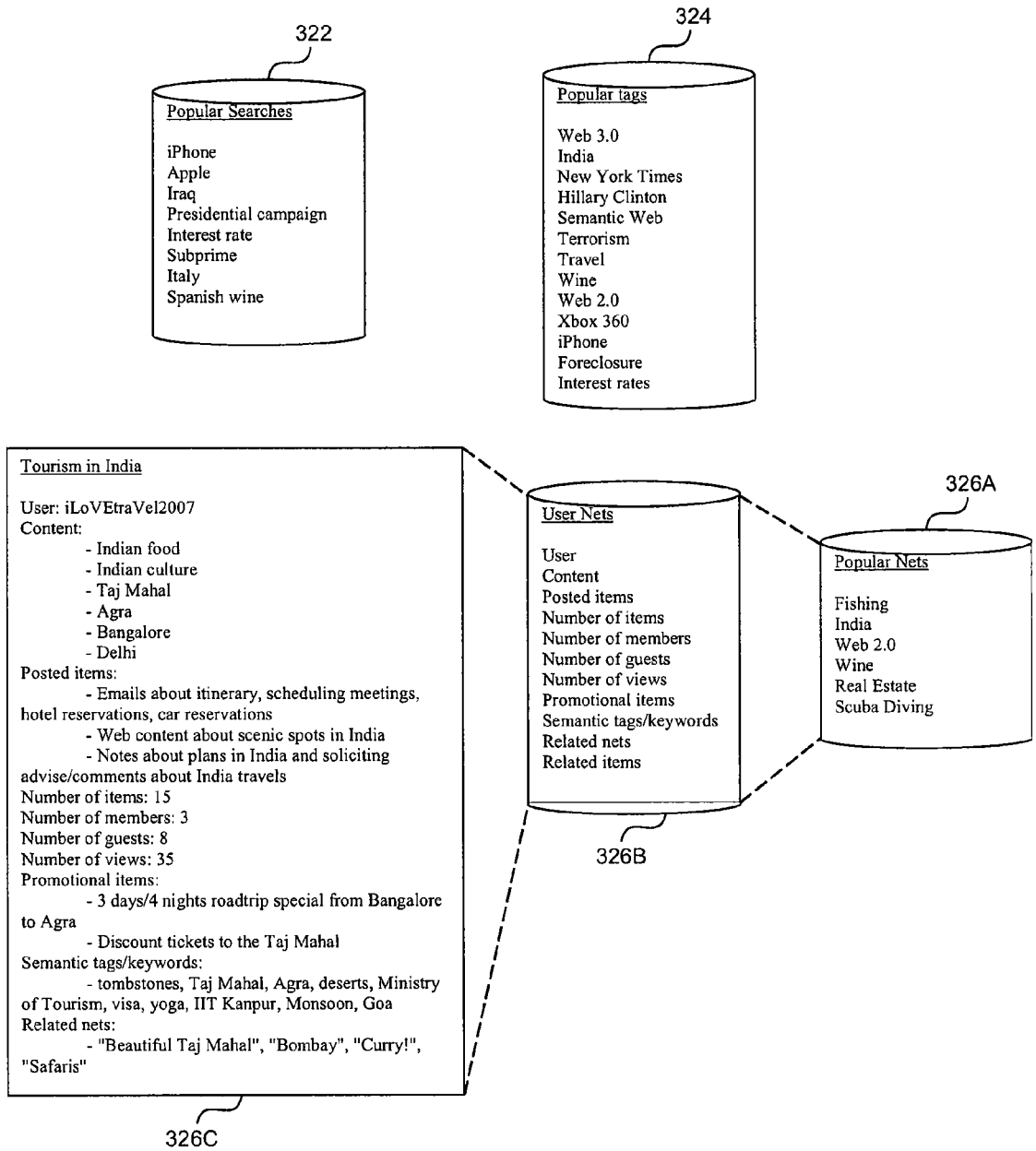
FIG. 3C depicts a block diagram of a database for storing popular searches, a database for storing popular tags, a database for storing popular nets, and a database for storing user nets, according to one embodiment.

FIG. 3C depicts a block diagram of a database for storing popular searches 322, a database for storing popular tags 324, a database for storing popular nets 326A, and a database for storing user nets 326B, according to one embodiment.

The database 322 stores a list of popular searches that occurred on the networking environment. The popular searches can be determined based on the total number of searches that occurred for the keyword over a predetermined amount of time. Similarly, the popular searches can be determined based on the rate of increase in the number of searches for a particular keyword over a predetermined amount of time. In some embodiments, the searches for the same keyword that originate from the same user, IP address, or machine ID, for example, are factored in and not counted towards the tally towards determining popularity of a search term. In the example database 322 of FIG. 3C, the identified popular searches include the keywords "iPhone", "Apple", "Iraq", "Presidential campaign", "Interest rate", "Subprime", "Italy", and "Spanish Wine".

The database 324 stores a list of popular tags on the networking environment. The tags can, in some embodiments, be identified from items (e.g., web content, email, web objects, photographs, contacts, calendar events, etc.) provided by users in the networking environment. For example, an item can be tagged with keywords added by a user to the networking environment and/or be tagged automatically by the system based on a set of metadata/meta-tags associated with the item. In addition, the item may be tagged by the third-party provider of the item. In some embodiments, the meta-tags include semantic tags. Thus, items having topically similar and/or related content can be identified in the networking environment items database and counted towards identifying the popular tags.

Additionally, tags indicating similar and/or related keywords and tags can be identified in user information databases in determining the popular tags on the networking environment. Additional methods and/or algorithms for identifying popular tags are contemplated and expected and do not deviate from the novel art of this disclosure. In the example database 324 of FIG. 3C, the identified popular tags include "Web 3.0", "India", "New York Times", "Hillary Clinton", "Semantic Web", "Terrorism", "Travel", "Wine", "Web 2.0", "Xbox 360", "iPhone", "Foreclosure", and "Interest rates".

The database 326A stores a list of popular nets on the networking environment. In the example database 326A of FIG. 3C, the identified popular nets stored in database 326A include "Fishing", "India", "Web 2.0", "Wine", "Real Estate", and "Scuba Diving". In one embodiment, each net that is identified as popular in the database 326A is an individual net and determined as 'popular' based on the number of members in the net. Alternatively, the popularity can be determined by the total number of views of the net over a predetermined amount of time, regardless of whether the net was viewed by a registered user or a visitor. The popularity can also be determined by the rate of increase of views over a predetermined amount of time. In some embodiments, the popularity is determined by the total number of views of the net generated by users who are not members of the net.

In some embodiments, the views generated by the same user in a net do not count towards the number of views that determine popularity of a net. In one embodiment, each identified popular net includes a plurality of nets that relate to a similar topic. For example, the popular net "India" may include the nets having topics similar to but is not limited to the "Taj Mahal", "tombstones", "Bangalore", "Bombay", "authentic curry", etc. Since in some embodiments, the contents of the nets have semantic meta-tags, other related content (e.g., similar and/or related content on other nets) shared on the networking environment are identified and a set of popular nets having similar and/or related content can be determined.

The database 326B stores the user nets and data/information associated with the user nets (hereinafter referred to as 'user net data'). The user net data stored in the database 326B can include, for example, but is not limited to, the user(s) who created the net, the contents of the net, items posted in the net, the number of items posted in the net, the number of members in the net, the number of guest visitors in the net, the number of views, promotional items, semantic tags and/or keywords, related nets, and/or related items.

One or more users can create a net, for example, to facilitate information/knowledge sharing and/or to provide centralized access to a set of data/information. In addition, since in some embodiments, semantic meta-data tagging enables similar and/or related data/information to be identified on the networking environment, nets can be created by a user to add information and to identify additional related information provided by other users through items added by the other users and/or the nets created by the other users. The additional items and nets of other users can be stored in the database 326B such that when the net is accessed by a user, the user is apprised of related or similar items and nets that may be of interest to the user. The items in a net may or may not have a common theme or topic of interest. Thus, the identified contents of the net, either based on keyword matches, semantic matches, as identified automatically, by the user, and/or by the third party content provider, can be stored in the database 326B. In one embodiment, a list of promotion items provided in the net is stored in the database 326B. A promotional item can be a third party advertisement or other types of endorsements for a product and/or service added to the net by a user or members of the net.

An example of user net data stored in the database 326B is shown in 326C. The user that created the net "Tourism in India" has a user name of "iLoVEtraVel2007", and the contents of the net include "Indian food", "Indian culture", "Taj Mahal", "Agra", "Bangalore", and "Delhi". The items posted on the net include "Emails about itinerary", "scheduled meetings", "hotel reservations", and "car reservations", "web content about scenic spots in India", and "Notes about plans in India and soliciting advise/comments about India Travels".

The number of items posted in the net is '15', the number of members of the net is '3', the number of guests to the net is '8', and the number of views of the net is '35'. The promotional items in the net include "3 days/4 nights road trip special from Bangalore to Agra", and "Discount tickets to the Taj Mahal". The semantic tags/keywords determined in the items included in the net include "tombstones", "Taj Mahal", "Agra", "deserts", Ministry of Tourism", "visa", "yoga", "IIT Kanpur", "Monsoon", and "Goa". Nets related to "Tourism in India" include "Beautiful Taj Mahal", "Bombay", "Curry!", and "Safaris".

Figure 3D:
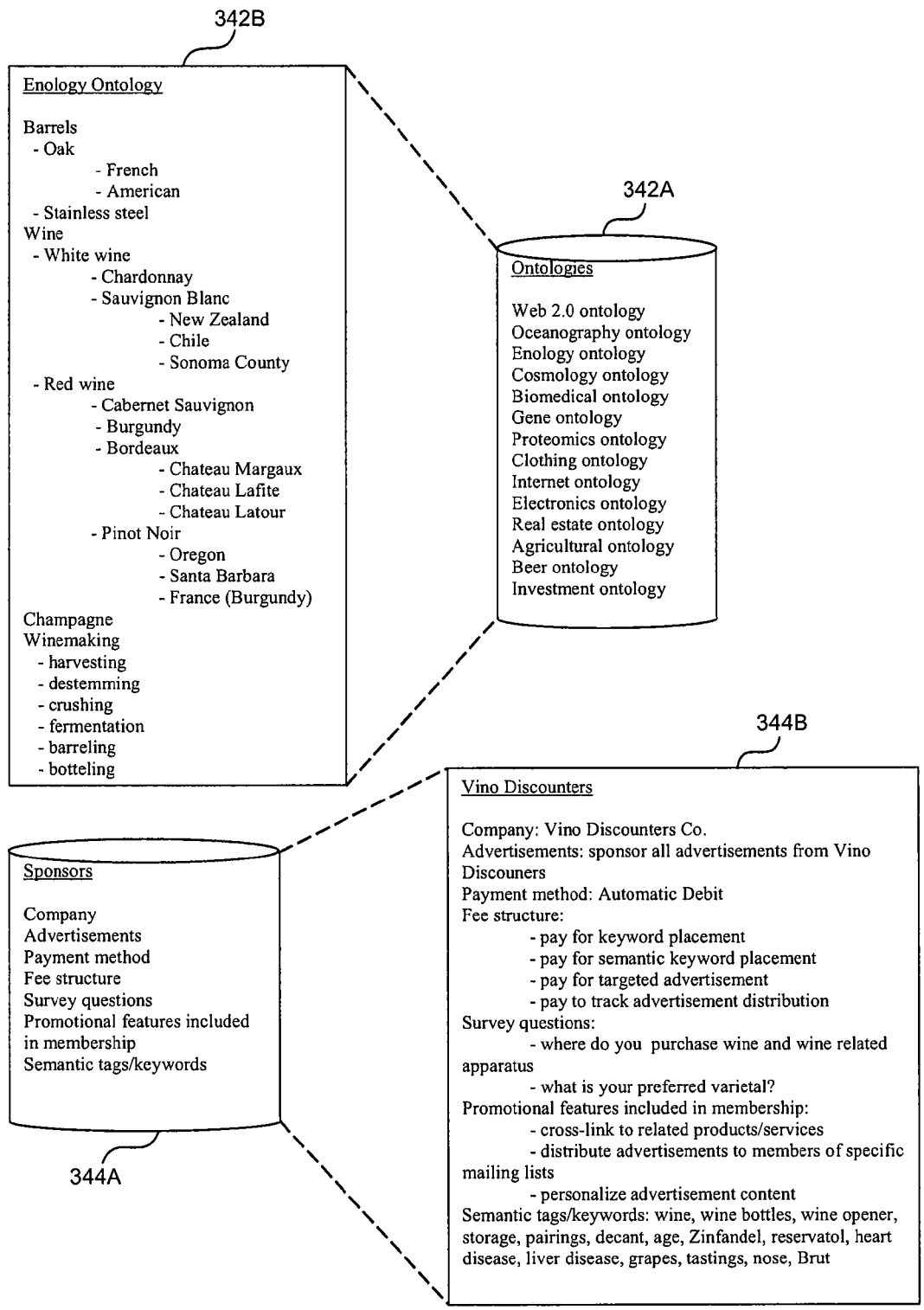
FIG. 3D depicts a block diagram of a database for storing ontologies and a database for storing promotional content sponsorship information, according to one embodiment.

FIG. 3D depicts a block diagram of a database for storing ontologies 342A and a database for storing promotional content sponsorship information 344A, according to one embodiment.

The database 342A stores the ontologies available in the networking environment. The ontologies can be provided and integrated by administrators of the networking environment. In addition, ontologies can be requested by a user to be added into the platform, or added to the platform by a user. In the example database 342A of FIG. 3D, the currently available ontologies include the ontologies for "Web 2.0", "Oceanography", "Enology", "cosmology", "Biomedical Ontology", "Proteomics", "Clothing", "Internet", "Electronics", "Real estate", "Agricultural", "Beer", and "Investment". An example of a portion of the enology ontology stored in the database 342A is shown in 342B. The enology ontology includes a list of the different types of barrels ("Oak" (e.g., French oak and American oak), "Stainless Steel", different types of wines ("White wine (e.g., Chardonnay and Sauvignon Blanc), "Red wine" (e.g., Cabernet Sauvignon, Burgundy, Bordeaux, and Pinot Noir), "Champagne"), and the different steps involved in wine making ("harvesting", "destemming", "crushing", "fermentation", "barreling", and "bottling").

The database 344A stores a list of sponsors and data/information associated with the sponsors (referred to hereinafter as 'sponsor data'). As discussed, the web content added by users to the networking environment can sometimes include promotional content that promotes one or more of an idea, product, and/or service. Similarly, the content provider can be a service subscriber of the networking environment services and shares items having promotional content on the network to increase exposure and access of the promotional content to users of the networking environment.

In some embodiments, the content provider can become a sponsor, such that when web content provided by the content provider is added to the networking environment (e.g., either by the third-party content provider and/or another user), the content provider can have access to additional services, in particular, marketing services and access to market-related data relevant to the ideal/product/service the content provider wishes to promote. In some instances, the sponsor is not necessarily the content provider of the web content but merely an entity with vested interest in the promotional material in the web content. In some embodiments, membership fees are assessed in association with sponsorship of promotional content in the networking environment. The assessment of membership fees and the additional functions/services provided in association with promotional content are described in more detail in the description of FIG. 9.

The sponsor data stored in the database can include but is not limited to, the company making the sponsorship, the advertisements that are being sponsored by the company, the payment method, the fee structure adopted by the sponsor, the survey questions the sponsor wishes to be presented to users, the promotional features included in the membership, and the semantic tags/keywords related to the sponsorship, business, trade, service and/or product.

An example of a portion of the sponsorship data stored in the database 344A is shown in 344B. The sponsor "Vino Discounters" sponsors "all advertisements from Vino Discounters" on behalf of the company "Vino Discounters Co.". The sponsor has signed up for the additional services to "pay for keyword placement", "pay for semantic keyword placement", "pay for targeted advertisement", and "pay for track advertisement distribution" and the payments are to be remitted via "Automatic debit".

The survey questions to be presented to a user whom has indicated interest in a sponsored advertisement include "where do you purchase wine and wine related apparatus". The promotional features included in the sponsorship of "Vino Discounters" include "cross-link to related products/services", "distribute advertisements to members of specific mailing lists", and "personalize advertisement content". The semantic tags/keywords associated with content provided by the sponsor include "wine", "wine bottles", "wine opener", "storage", "pairings", "decant", "age", "Zinfandel", "reservatol", "heart disease", "liver disease", "grapes", "tastings", "nose", and "Brut".

More or less databases may be included. The databases can store other types of information, including but not limited to, information, data, services pertaining to knowledge/information sharing, and user friendliness, and/or additional information related to tracking and monitoring propagation of web content and information among the users in the networking environment. Additional data types that can be stored in databases, such as data related to delivering the services, functions, and features of a web-based networking environment to providing advanced services to entities utilizing the knowledge networking environment to intelligently share and search for knowledge and intellectual content, among participating users, are contemplated and expected, and do not deviate from the novel art of this disclosure.

In some embodiments, one or more databases can be implemented as one database and different types of information can be stored in combination rather than in separation as shown in the example databases of FIGS. 3A-3D.

Figure 4A:
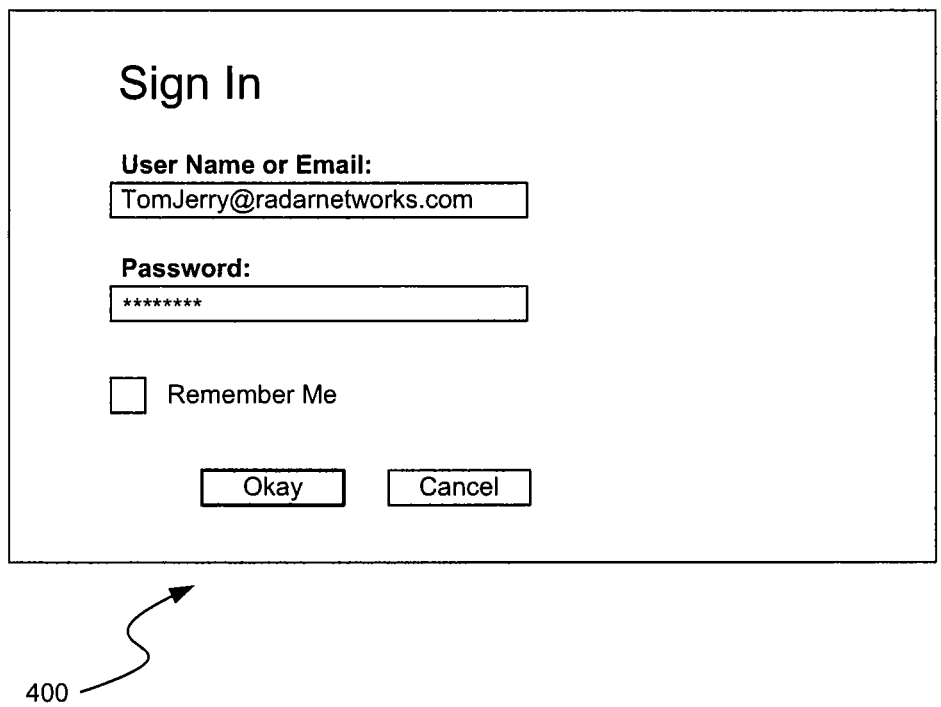
FIG. 4A illustrates a screenshot of a login screen to access the knowledge management and networking environment, according to one embodiment.

FIG. 4A illustrates a screenshot 400 of a login screen to access the knowledge networking environment, according to one embodiment.

In the example of FIG. 4A, the platform utilizes a username/email and password identification method for authorizing access. The screen in the example screenshot collects data to determine if the user is authorized to access the system and if so, securely logs the user into the system. In other embodiments, other forms of identity authentication, include but is not limited to, security cards, digital certificates, biometric identifiers (e.g., fingerprints, retinal scans, facial scans, DNA, etc.) can be utilized and are contemplated and in accordance with this disclosure. A user may be able to specify and/or obtain a logon ID after subscribing or registering.

The user may be able to obtain a trial account, for a period of time during which the user can access the networking environment (with full or limited services) to determine if the user wishes to obtain a full account. In addition, the user may be invited by a registered user, for example, to join a common interest group (e.g., net), and/or to access an object shared on the networking environment, for example. A user with a guest account may have access to limited features and services relative to a full account. A subscription fee may be charged to service subscribers/registrants on a one-time basis, a monthly basis, a yearly basis, a usage basis, and/or other fee structures. In some embodiments, visitors may be charged a fee for temporary access to the features, services, and access to data shared on the networking environment.

Figure 4B:
FIG. 4B illustrates an example screenshot of a graphical user interface for user information and subscription management, according to one embodiment.

FIG. 4B illustrates an example screenshot 410 of a graphical user interface for information and subscription management of a user net.

The user interface for managing/updating information and subscription management for a user net is shown in the example screenshot 410 of FIG. 4B. The screen 410 allows the user to access various functions and services related to user net management provided by the networking environment. The screen in the example includes an "About Me" section where the first ("John") and last name ("Doe") of the user that is logged on is shown. The "About Me" section of the screen also includes a list of the user's contacts on the networking environment. In one embodiment, the screen 410 includes a listing of the groups to which the user belongs to (e.g., "Photography", "Knowledge Base", and "Alpha Tester Information").

In one embodiment, items (e.g., web content, web objects) can be added to the net by sending an email having the items to a predetermined email address. For example, the email can include an attachment of a photograph to be added to the net. In addition, the email can include, but is not limited to, a note, a calendar event, a link, and/or any other web content to be added to the net, uniquely identified by the email address to which the email is sent to. In the example shown, content can be added to the user's (John Doe's) net via sending an email to "john@users.add.com". Therefore, the user ("John Doe") can provide this email to friends, other service subscribers, non service subscribers such that they can add items to the user's net. In some embodiments, an authentication and validation procedure is performed by the sender to verify whether the user has authorized the email sender to add items to the user net. For example, the user can have a list of valid sender email addresses from which to accept items. In other embodiments, no verification is performed, so long as a valid email recipient address is indicated, or some other suitable condition is met.

The example user interface 410 for managing/updating information and subscription management for a user net includes a frame 402 that identifies and lists (e.g., in a word cloud) the top types of web content in the user net, in this example, the net managed by John Doe. The top types of web content in this example are indicated to be notes, people, and web pages. The top types of web content can be determined based on the number of items the user has in each category. In some embodiments, the top types of web content can be determined based on the number of views that each category of web content has generated. In addition, the top types of web content can depend on the number of users that have bookmarked, shared, collected, or otherwise shown interest in the items belonging to different categories. Other methods and/or algorithms of determining the top types of web content in a net are contemplated and do not deviate from the novel art of this disclosure.

In one embodiment, the user interface 410 for managing/updating information and subscription management for the user net includes a frame 404 that depicts (e.g., in a word cloud) the top tags of the net. The tags can be identified from the web content in the net, provided by the creator of the net and/or other users. The other users may or may not be registrants of the web-based networking services. The tags can be keyword tags, semantic tags or semantic links. The tags can be identified from web content through one or more of many methods, some of which are described herein as follows. Keyword tags can be manually added by users that added the web content to the network. For example, the user can highlight the text of the item, via one or more of any known or convenient method to indicate the keywords to be tagged.

The user can also type the keywords into a keyword field that receives keywords associated with the web content that are to be tagged. In addition to manual tags by users, the web content may have associated with it, metadata that indicates keywords and/or semantic tags and/or semantic links related to the item. The metadata associated with the web content can be provided by the content provider of the web content or any other entity. In one embodiment, the networking environment performs automatic tagging of keywords and/or semantic tags/links of items added to the platform. The automatic tagging can be performed in addition to or in lieu of manual tagging or through the metadata associated with the item. Tagging functions are further discussed as it relates to the tagging module in the description of FIG. 8.

Note that one or more icons shown in the example screenshots 400 and 410, and the screenshots illustrated in other figures in this application, can and are expected to be linked to one or more web pages with different screen layouts, depending on the services selected. Additional screens with different screen layouts are contemplated and considered to be in accordance with the techniques and embodiments disclosed herein to provide the general functionality and services related to knowledge networking and collecting market-related data via knowledge networking.

Figure 5:
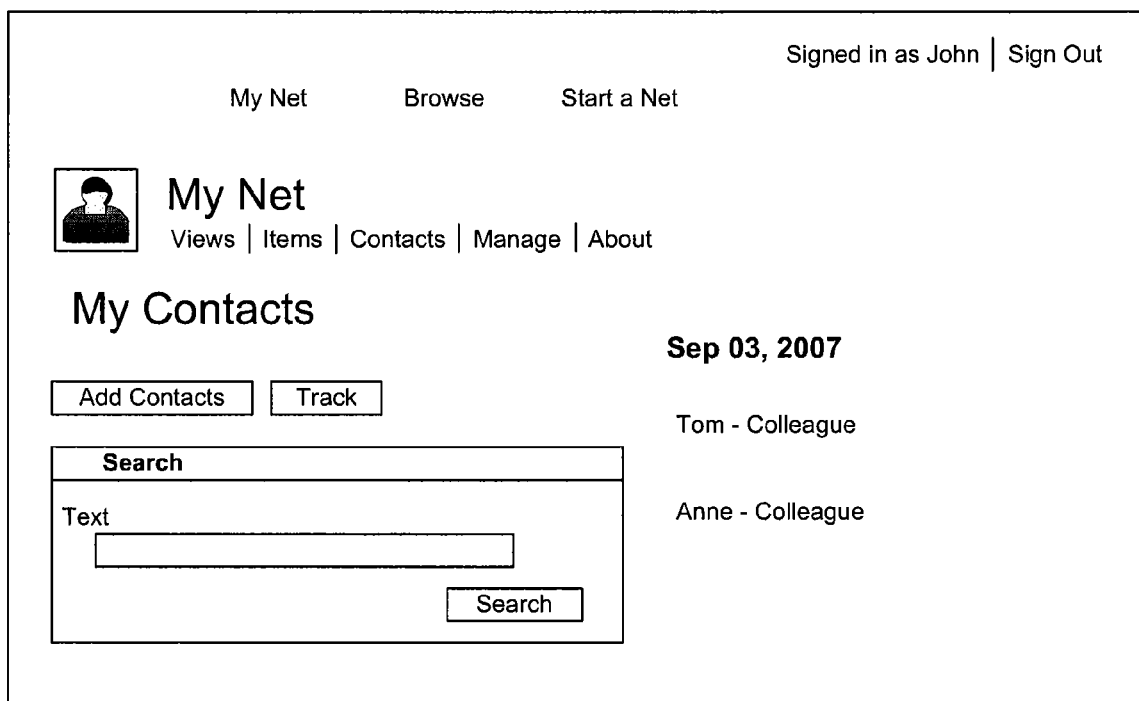
FIG. 5 illustrates an example screenshot of a graphical user interface displaying relationships between a user and contacts of the user in the knowledge management and networking environment, according to one embodiment.

FIG. 5 illustrates an example screenshot 500 of a graphical user interface displaying relationships between a user and contacts of the user in the knowledge networking environment, according to one embodiment.

In the example screenshot 500 of FIG. 5, a web page for the user ("John") to manage and/or to view his contacts is displayed. The user, as shown, has two contacts (e.g., "Tom" and "Anne") designated to have a collegial relationship with the user ("John"). In some embodiments, the user can have different contacts for different nets that the user has created and/or manages. In this example, the list of contacts for the net named ("My Net") is illustrated. Additionally, different relationships between the user and contacts are available, including but not limited to, relatives, immediate family, friends, acquaintances, etc. In one embodiment, the webpage for managing and/or viewing contacts includes a search box where the user can submit text and/or keywords to search for existing users on the user's contact list.

In addition, the user interface of screenshot 500 can enable the user to invite friends and/or acquaintances to join the networking environment or to connect to existing friends and/or acquaintances on the network. In one embodiment of the present disclosure, the search box accepts email addresses of friends/acquaintances that the user would like to send an invitation to join the network or existing friends/acquaintances on the network that they would like to add as a contact and connect to. In some embodiments, the search box provides a basis for the user to search for other users outside of the user's contact list, by submitting text that wholly or partially matches the first and/or last names of the other users. In addition, keywords and/or semantic tags can be submitted via the search box to identify other users whose user profile/information contains the queried keywords and/or semantic tags. Once a user not currently in the user's ("John's") contact list is identified via a search query, the user can be added via the "Add Contacts" button. Depending on the preferences of the user being added, a request can be sent to the user, the user can be automatically added to the contact list or the request may be immediately denied.

Figure 6A:
FIG. 6A illustrates an example screenshot of a graphical user interface for a user to access and manage various services provided by the knowledge management and networking environment, including connections, items, tags, and/or events, according to one embodiment.

FIG. 6A illustrates an example screenshot 600 of a graphical user interface for a user to access and manage various services provided by the networking environment, including connections, items, tags, and/or events, according to one embodiment.

In example screenshot 600, the user's home page where content hosted by the networking environment is displayed. The home page is, in one embodiment, a collective view of different types of information the user has added to the networking environment. The home page also provides access to popular tags and popular content types identified by the networking environment. For example, the home page for user "John" shows, the nets that John belongs to (e.g., "Nets I Belong To"), the user's friends (e.g., "My Friends"), relatives (e.g., "My Relatives"), colleagues (e.g., "My Co-workers"), contacts (e.g., "My Contacts"), types of web content (e.g., "note", "person", "web page"), latest items (e.g., "Beers worth waiting . . . ", "Email item"), some popular tags identified from the user's web contents (e.g., "champagne", "red", "tasting", etc.), events, and/or photos. Additional or less categories can be displayed on the home page. In some embodiments, the layout of the homepage is user modifiable. For example, some categories can be removed from the home page or shifted to a different location on the home page.

Note that the entries and options associated with the category boxes are, in some embodiments, hyperlinks. For example, the text "Photography" under the category "Nets I belong to", when clicked, opens up a user interface of the net "Photography". Similarly, when the text "Email Item" under the category "Latest Items" is clicked, an interface having the "Email Item" is opened up. In addition to accessing existing content in the networking environment via the home page, the home page can include hyperlinks to allow users to add content. For example, a hyperlink for adding contacts is included at the bottom of the category boxes, "My Friends", "My Relatives", "My Co-workers", and "My Contacts". When the "Add Contact" link is clicked, an interface is displayed for example, to allow the interface to invite friends to join the network and/or to connect to a friend/acquaintance already on the network.

In one embodiment, the entries in the "Tags" category box are also hyperlinks. When the hyperlinks in the "Tags" category box (e.g., "champagne") are clicked on, the web contents in the networking environment having the word "champagne" tagged are presented. The web content presented may or may not be content present in the user's net ("My Net"). Depending on the user's setting and privacy settings of other nets, web content in other user nets having the word "champagne" tagged can be displayed as well.

Figure 6B:
FIG. 6B illustrates an example screenshot of a graphical user interface displaying third party web content hosted by the knowledge management and networking environment, according to one embodiment.

FIG. 6B illustrates an example screenshot 610 of a graphical user interface displaying third party web content hosted by the networking environment, according to one embodiment.

The example screenshot of FIG. 6B illustrates an instance of third party web content hosted by the networking environment displayed on a web page. The web content ("Web Page: Company to build solar thermal plant, raises $40M") shown in this example is added by the user ("John") to the user net ("My Net"). The instance of the web content includes a URL of the third party hosting the content for a visitor to view the original document. In addition, a description of the web content can also be shown. In some embodiments, the description is specified by the user that added the content. The description can in some instances, be an excerpt or full text of the web content.

In one embodiment, tags can be identified (e.g., by the system or by the user) from the text in the description of the web content. The tags may be highlighted in the description and, in addition, listed under the tags section (e.g., "Solar" and "Silicon Valley"). Tags can be added by the user and/or visitors of the user's net that views the web content by clicking on the hyperlink "Add Tags" displayed on the web page. In addition, comments about the web content can be added by the user and/or other users that have viewed the web content. In some embodiments, a discussion group about the web content can be facilitated through users and visitors posting comments via this web page. Of course, the visitors that are able to view and/or post comments can be moderated by the creator of the net and/or the user that added the web content.

In one embodiment, web content added to the networking environment can be 'collected' and 'shared' by users that are active in the network. The users may be visitors, trial service subscribers, and/or service subscribers. For example, the user that created the content in "My Net" may wish to share the web content ("Web Page: Company to build solar thermal plant, raises $40M") with another net focused on alternative energy solutions. The web content creator ("John") can share the content with another net by clicking on the button "Collect and Share" 612. The button 612, in one embodiment, allows the user to share the content with another net and/or another user.

Figure 6C:
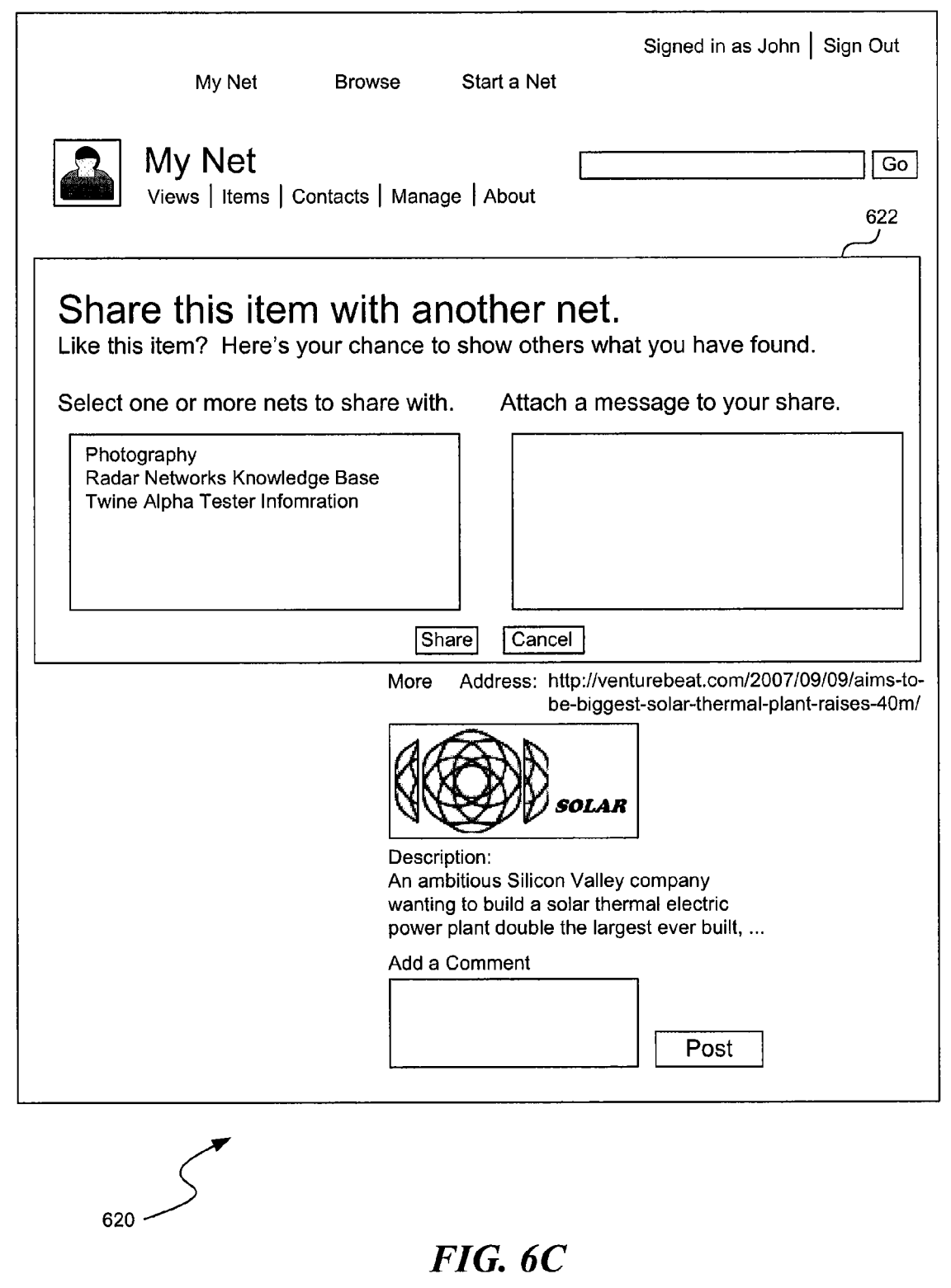

When the user selects to share the content with another net, a user interface screen such as that shown in the example of FIG. 6C is displayed on the screen. FIG. 6C illustrates an example screenshot 620 of a graphical user interface 622 for sharing the web content shown in FIG. 6B with another net, according to one embodiment. On interface screen 622, the user can select one or more nets the user ("John") wishes to share the web content with. In one embodiment, the user can add a comment with the shared web content. Once the user submits the web content to be shared, depending on the privacy and access rights of the selected net(s), the web content may be automatically added to the destination net, or the web content may be added upon approval by one or more authorized moderators of the net.

Figure 6D:
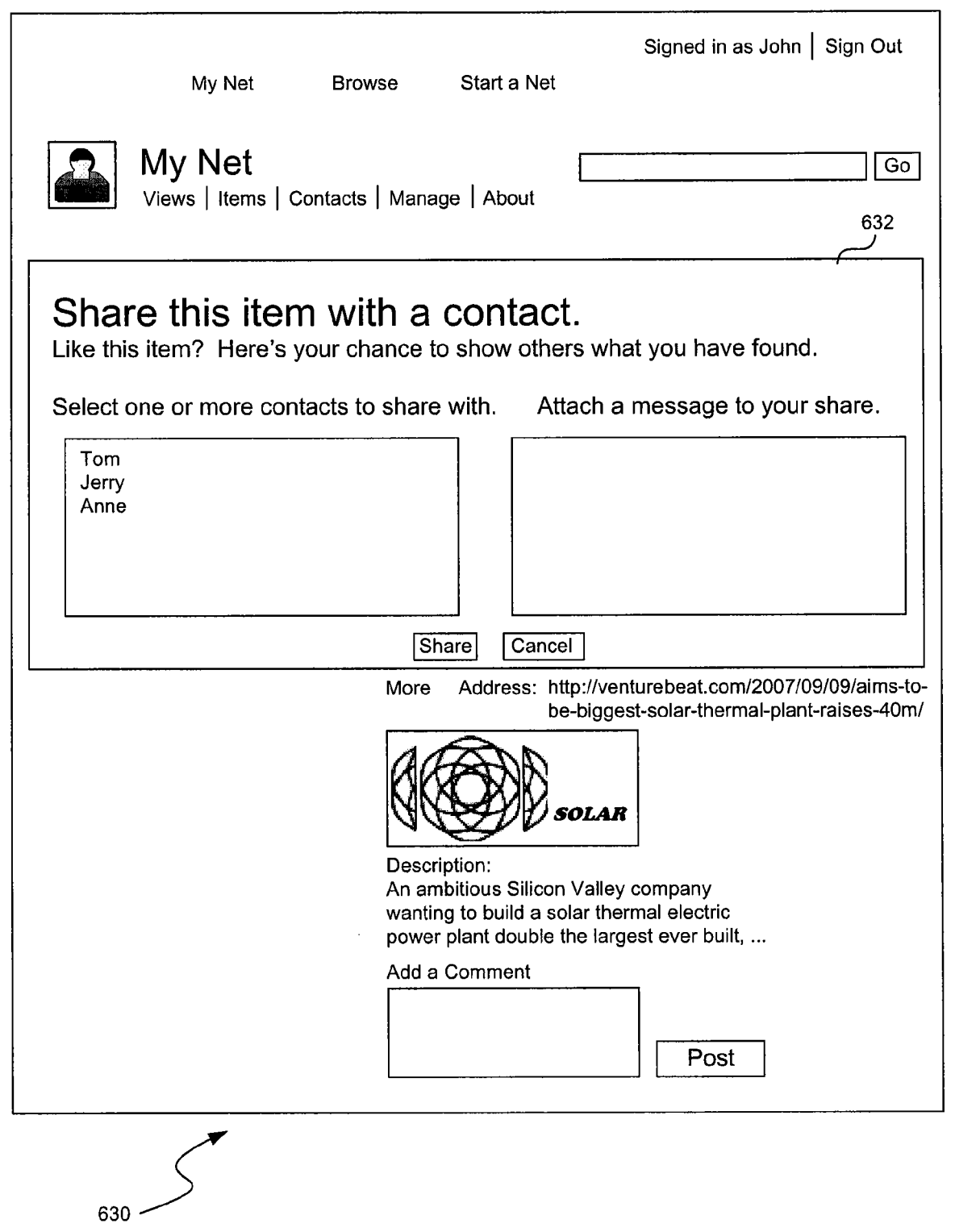

Similarly, when the user selects to share the content with another user, a user interface screen such as that shown in the example of FIG. 6D is displayed on the screen. FIG. 6D illustrates an example screenshot 630 of a graphical user interface 632 for sharing the web content shown in FIG. 6B with another user, according to one embodiment. On interface screen 632, the user can select one or more contacts ("Tom", "Jerry", and "Anne") to share the web content with. In one embodiment, the user can add a comment with the shared web content. Once the user submits the web content to be shared, depending on the privacy and access rights of the selected recipient(s), the web content may be automatically shared with the recipient, or the web content may be shared upon approval by the recipient. After the user hits the "Share" button, the user interface screens 622 and 632 disappear and the web content is visible on the screen again.

In some embodiments, sharing of web content with nets and users are initiated by visitors in addition to the creator of the web content in the net. For example, a visitor, Jimmy, of the John's user net ("My Net"), can share the web content added by John on John's user net with other users and other nets. In addition to sharing web content with another user, a visitor of the creator's ("John") net ("My Net") can collect the web content. The visitor can collect web content, such that, for example, the web content ("Web Page: Company to build solar thermal plant, raises $40M") is added to the visitor's user net.

In one embodiment, the button 612 "Collect and Share" is utilized by visitors to add the web content of interest to the visitor's own user net. In some embodiments, the original content provider and the creator of the web content on the net where the visitor is viewing the content impose limitation as to the degree of sharing and collecting of items. These limitations can be tracked and enforced by the networking environment.

Figure 7A:
FIG. 7A illustrates an example screenshot of a graphical user interface for viewing and managing web content added to the knowledge management and networking environment, according to one embodiment.

FIG. 7A illustrates an example screenshot 700 of a graphical user interface for viewing and managing web content 702, 704, 706 added to the networking environment, according to one embodiment.

In some instances, the web content added to the network by a user includes promotional content. In the example screenshot 700 of a list of web content added by a user in the networking environment includes an online news article 702, web content promoting scuba/snorkeling fins 704, and web content promoting kid's swim mask 706. In the web page for viewing and managing a user's web content, additional items can be added by clicking on the "Add Item" button. A listing of tags identified from the user's web content may also be displayed on the viewing/managing screen 700. The search field shown on the viewing/managing screen can be used to locate web content in the user's one or more nets based on the query. In some embodiments, the search is based on a semantic search. In some instances, relevant web content added by other users (keyword match and/or semantic link) can be identified and listed in the search results in response to a query.

In one embodiment, the promotional content (e.g., content 704, 706) can be collected by other users, shared with nets and/or other users in a manner similar to that illustrated in FIGS. 6C-D. Promotional content can be bookmarked as well, although not explicitly shown in the figures. Since the sharing and distribution of web content, in particular, promotional content occurs in the networking environment, the system has the ability to track the access and distribution by users in the network, and in some embodiments, collect data related to the access and distribution of the web content among one or more users. In addition to identifying and collecting access and distribution data of promotional content, the networking platform can further identify information to determine performance metrics of the promotional content.

For example, indications of performance include, but is not limited to, clicks on the link to view a web site of the third-party content provider, a purchase that results from a user that adds the promotional content to the networking environment, any transaction that results from a user adding the promotional content, transactions resulting from a user sharing the content with other users, number of views of the content via the networking environment and/or via the third-party content provider's website, identified interest in a second promotional content based on its relation to a first promotional content, etc.

Oftentimes, the access and distribution data collected can be valuable market information for the promoters. Thus, entities may wish to sponsor promotional content. The sponsoring entity can be the original host of the promotional content and/or a third-party with vested interest in the promotional content. The sponsorship can be applied to individual instances of web content, or applied to a set of web content (e.g., Dell Computers may wish to sponsor all web content having promotional material that promotes items sold by or made by Dell Computers). Similarly, Microsoft may wish to sponsor web content having promotional material that promotes laptops and desktops made by Dell, in addition to sponsoring web content having promotional content for Microsoft products, since Microsoft may believe that sales of computers typically lead to purchase of the Windows operating system by the same customer. The concept of sponsoring promotional content to further advance a vested interest in the promoted material, further applies to but is not limited to, promotion of services, ideas, concepts, religion, events, in addition to products.

In one embodiment, the one or more sponsors of web content having promotional content elect to pay to receive market data collected by the networking environment deemed valuable. Different fee structures are provided to tailor to the needs of different types of businesses and different types of market needs, for example. The sponsorship fee can enable a sponsor of web content, to access raw data collected related to access and distribution of the web content. Further, the sponsorship fee may allow the sponsor to access statistical data compiled from the raw data. The sponsor may also purchase information related to the performance of the promotional content, as identified by, for example, but not limited to, user interest level in the promotional content, actions (clicks, views, purchases, sales, etc.) generated in response to viewing the promotional content. The performance metrics can be qualitative or quantitative. The sponsor may pay an extra fee for quantitative data, another extra fee for further analysis of the data, such as, but not limited to, statistical analysis.

In one embodiment, sponsors pay for obtaining relational information between the user interest level/performance metrics of the promotional content and user information. Obtaining user information provides market information about the types of attributes, qualities in an individual that are likely to indicate interest in the promotional content. Sponsors can utilize this information to identify a set of users towards which to target promotional content. Sponsors can further utilize this data to determine variations of the promotional content that may be of interest to other groups of users. In some embodiments, sponsors can pay for placement on a search result page when a relevant query is made. Sponsors can also pay to have the promotional content presented to have a likelihood of interest in the promotional material. Both the push and pull advertising models can be used. The pull model may cost the sponsor more. In addition, sponsors can pay for being semantically linked to related and/or similar products.

FIG. 7B illustrates an example screenshot 710 of an applet 712 for adding web content to the networking environment from the original web page 714 hosting the web content, according to one embodiment.

One embodiment of a process of adding web content to the networking environment is to click the "Add Item" button on one or more user interfaces of the networking environment, such as that shown in FIG. 7A. Another example of a method for adding web content to the networking environment occurs on the original web page hosting the web content. As shown, in order to add the web content shown in screenshot 710 to the networking environment, the applet 712 can be initiated on the original web page 714. The applet 712 is, in one embodiment, initiated via a java script having a link that can be bookmarked. Thus, by clicking on the bookmark while browsing the original web page hosting the web content to be added to the networking environment, content can be added without having to logon to the networking environment.

The applet 712 allows the user to identify the type of item being added, the net to be added to, and enter descriptive information (e.g., title, summary, tags, and/or comments) regarding the web content. In some embodiments, the title, summary, and tags are automatically determined by the applet; however, the user can make modifications if so desired. The tags identified by the user and/or the applet can be keyword based and or semantically based.

FIG. 8 depicts a block diagram illustrating components of a system for collecting market-related data through the web-based networking environment, according to one embodiment.

In the example of FIG. 8, the host server 800 is one embodiment of the system. The system includes a tracking module 802, a user module 804, a net management module 806 having an item management module and/or a privacy management module, a search/share module 807, a proximity module 808 having a semantic social linking module, a knowledge management module 810, a knowledge database 814, and/or a tagging module 812 having a classification module. Additional or less modules can be included without deviating from the novel art of this disclosure. In addition, each module in the example of FIG. 8 can include any number and combination of sub-modules, and systems, implemented with any combination of hardware and/or software modules.

The host server 800, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

The tracking module 802 can be any combination of software agents and/or hardware modules able to track user activity related to web content added to the networking environment (e.g., knowledge networking environment). For example, the tracking module 802 records the instances when web content added to the networking environment is viewed, who viewed the web content, and the time and date the content is viewed. The data can be stored in the system for a predetermined amount of time, as suitable. The tracking module may also record the instances when the web content is bookmarked, collected, shared with another user and/or net, and who bookmarks, collects, and/or shares the content. The recipient and the net receiving the web content can also be recorded. In some instances, the tracking module also records different users add the same content to the networking environment, since identical web content added by different users can be an indication of interest.

In one embodiment, the tracking module 802 determines when a user views a third-party web page in response to viewing web content in the networking environment. The tracking module can also record when additional actions (e.g., purchase, sale, lease, rent, bid, ask a questions, post a comment, send a message, send an email, etc.) occur in response to viewing web content, in particular, web content having promotional content. In most instances, the identities of the parties involved in the action are recorded. In some embodiments, the tracking module 802 collects numerical data regarding content access/distribution and performs elementary statistical analysis on the data collected. In some embodiments, elementary statistical analysis and/or additional data analysis methods are performed in a market data module (not shown).

For example, the tracking module 802 can record the number and percentage of visitors that collected the web content, visitors that collected the web content then shared the web content, visitors who made a purchase based on the web content. The tracking module 802 may also record the average number of subsequent shares per user that has viewed the web content, the average number of visits to the web content before collecting it. In one embodiment, the tracking module 802 determines when a user collects web content, the average number of repeat visits to web content per user prior to collecting the web content. The total number of users that the web content has spread to can be determined by the tracking module 802. In addition, the velocity and/or the acceleration of the spread of the web content can be determined and recorded.

In one embodiment, the tracking module 802 determines the total volume of collections, shares, bookmarks, shares, purchases for web content over a predetermined amount of time. For example, the daily volume of the total number of users that collected an advertisement for the iPhone can be determined and stored. In one embodiment, the tracking module 802 can determine which users are the top spreaders of the web content. In some embodiments, the tracking module 802 distinguishes between a visitor who is not a subscriber and a visitor who is a subscriber and records the subscription status of a user who accessed and/or distributed web content.

The user module 804 can be any combination of software agents and/or hardware modules able to identify user metadata from a set of user information. The user information can be supplied by the user and/or identified by the networking environment. For example, the user information can include basic profile information submitted by the user during registration, such as a first and last name, birth date, location, etc. In addition, the user may have the option of submitting additional information including but is not limited to, nationality, religion, ethnicity, interests, hobbies, occupation, education, etc. as described in detail in FIG. 3A. User information can also be identified based on user activity on the networking environment.

For example, general interest can be identified from common topics or themes in the content added by a user to the networking environment. Similarly, general interest can be determined based on commonalities between the user and the user's contacts and/or connections on the networking environment. In one embodiment, user information can be deduced from visits to other users' nets and views of content provided by other users. Additionally, web content collected and/or bookmarked by the user provides additional information about the user. The type of the web content (e.g., a web page, an email, a photograph, etc.) in addition to the intellectual content of the web content (e.g., the subject matter of an online news paper article) can both be utilized to obtain user information.

In some embodiments, the user module 804 communicates or otherwise shares information with the tracking module 802 such that access/distribution data can be associated with user data about the users involved in the access and distribution of web content. For example, demographic, geographic, and/or psychographic analysis can be performed on the data collected in relation to access and distribution of web content, in particular, promotional content. Alternatively, the data identified and stored by the tracking module 802 and the user module 804 can be stored in a common data depository (e.g., on the tracking module, on the user modules, or external to the tracking and user modules) such that data recorded by the tracking and user modules can be retrieved independently or in conjunction, as necessary.

The net management module 806 can be any combination of software agents and/or hardware modules able to provide the services related to management of nets. The management of nets include those related to, but is not limited to, setting up the parameters for net creation, as specified by, for example, a net creator (e.g., administrative user), managing membership requests of the net, and/or privacy rights of various objects (e.g., items) in the net. Generally, nets are created to store intellectual information and/or knowledge in various digital formats for an individual, group, team, and/or community. Web-based items in addition to users, user profiles and/or user contact information can be associated with a net. In most instances, the net is a web-space for an individual or group to manage and organize collective knowledge having dispersed or similar topics, and to share/collect information from other members of the net.

Objects can be added by the net creator to the net. Other users, such as members and/or visitors can, in some situations, be allowed to contribute to the intellectual content of the net. For example, for a particular net, content added may be required by net administrators to be related to one or more specific topics. The net may also limit who can contribute content to the net. Objects can be added to nets in a variety of ways. For example, users can upload existing files from their devices (e.g., cell phone, portable device, computer, desktop, laptop, Blackberry, iPod, iPhone, etc.) to one or more nets. In particular, various types of files, including but are not limited to, documents, .pdfs , text files, video files, email messages, image files, audio files, of varying formats can be uploaded to knowledge networking environment. An URL can be submitted to add web-content hosted by a third-party content provider to the net. In addition, intellectual content can be created in the knowledge networking environment. For example, a note can be composed in an interface provided by the networking environment and submitted to be posted in one or more nets.

In one embodiment, objects (e.g., files, documents, RSS, contact records, video, image, and/or audio files) are added to a particular net via attaching the objects to an email and sending the email to an email address unique to the particular net. In some embodiments, a net be associated with different email addresses to be used when posting objects with different privacy settings. For example, addresses such as "owner.twineDogLovers.com", "members.twineDogLovers.com", and/or "public.twineDogLovers.com" can be used to post objects to the net "DogLovers" but with three different levels of privacy access settings.

Figure 8A:
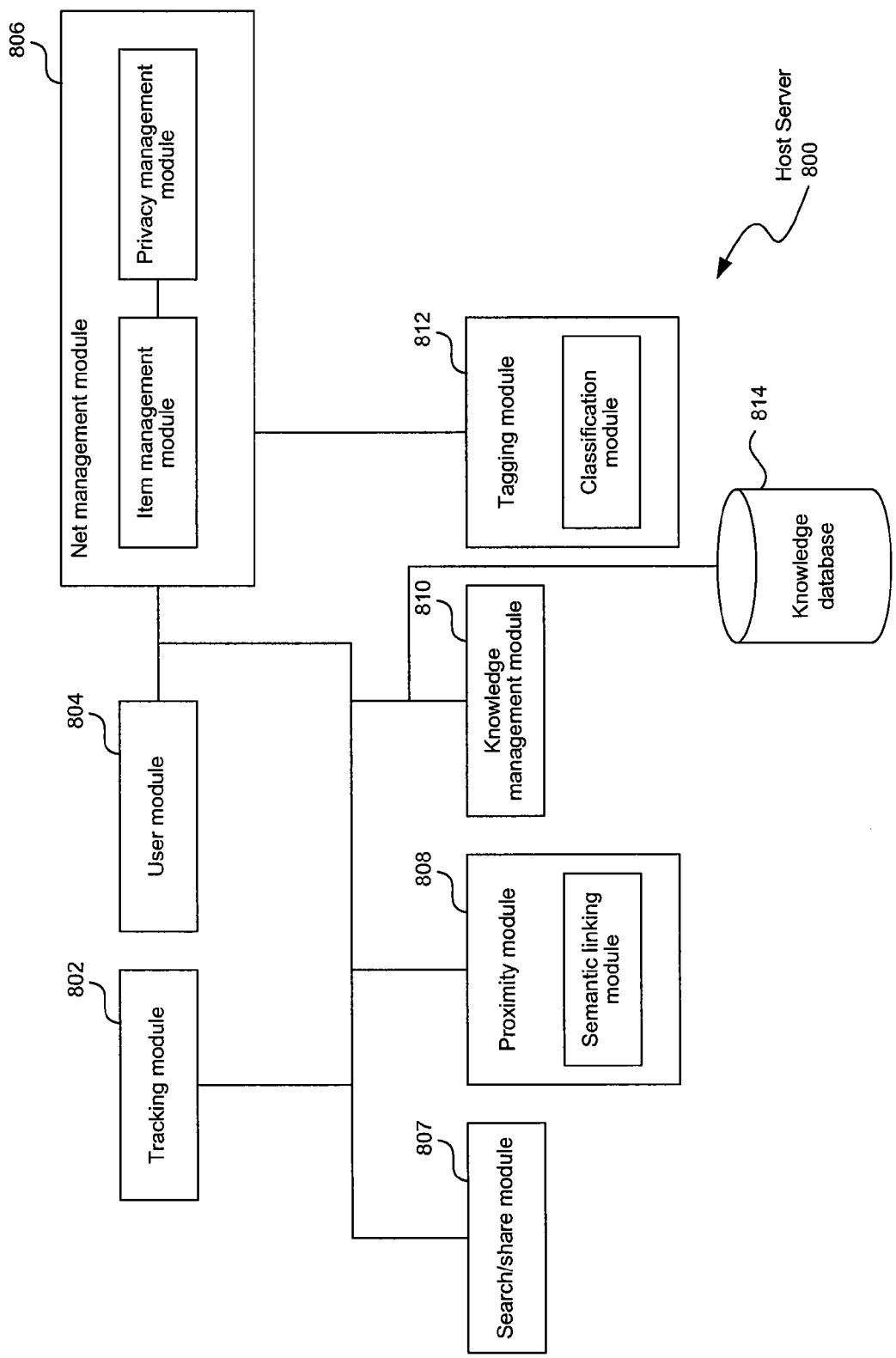
FIG. 8A depicts a block diagram illustrating hardware and/or software components of a system for providing various services offered by the knowledge management and networking environment, according to one embodiment.
Figure 8C:
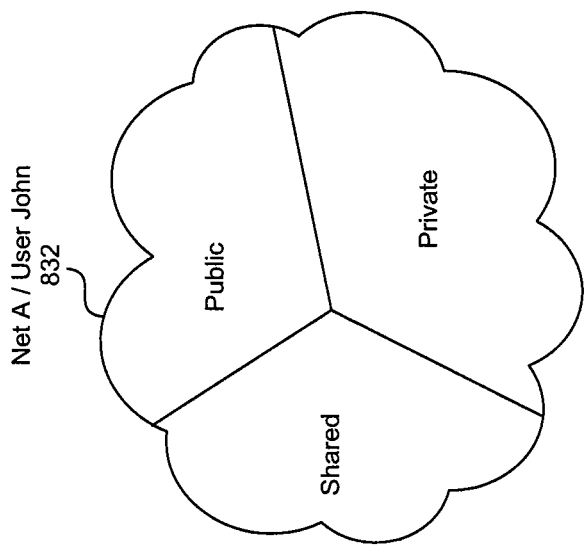
FIG. 8C depicts a diagrammatic representation of sub-portions of a net having different privacy settings, according to one embodiment.
Figure 8B:
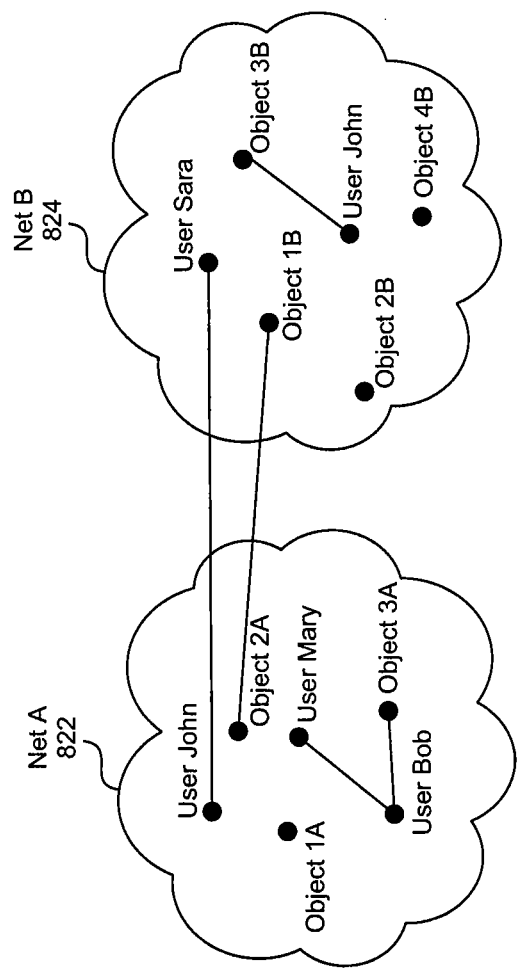
FIG. 8B depicts a diagrammatic representation of nets in a web-space and relationships that can exist between objects within and across nets, according to one embodiment.

A diagrammatic representation of nets in a web-space and objects in a net is shown with further reference to FIGS. 8B. The connections between objects within and across nets represent relationships that are explicit and/or implicit. The tables of FIG. 8E depict example lists of various explicit relationships and implicit relationships that can be specified and/or identified in the knowledge networking environment.

When a net is created, the net management module 806 can query the creator user (e.g., administrative user) whether the net is to be a personal net, a group net, or a public net. Typically, objects added to a net of designated type personal net are private and only visible to the creator user. Of course, this setting is modifiable by the creator to allow certain other users to view a sub-set of content in the net. The creator, in some instances, designates other users/members of the net to have administrative rights. Similarly, objects added to a net that is designed as a group net (or shared net) are typically visible to the members of the net. Objects added to a net that is designed as a public net are typically visible to the public. For example, contents in a public net can, in addition to being visible to members of the net, are visible to visitors of the net, and/or visitors of the knowledge networking environment. In some embodiments, objects in the pubic net are identifiable via a publicly accessible search engine (e.g., Google, Yahoo, and/or MSN, etc.).

Levels of privacy settings related to access and viewing of objects in nets are contemplated beyond that described for private, group, and public. For example, a net can have a customizable privacy level as specified by the net creator and/or other users with administrative rights. In one embodiment, a net can have content with different privacy settings, as depicted diagrammatically with reference to FIG. 8C. For example, the net creator and/or other administrative users can specify the objects that are of a particular privacy access level, based on predetermined criteria. In addition, the user that added the object to the net is typically able to set the privacy settings associated with the added object.

A user and/or a group of users can create multiple nets in the knowledge networking environment. In some situations, multiple nets can be created by a particular user, where the multiple nets have different privacy settings, respectively. In one embodiment, the net management module 806 manages the different nets can be created by a particular user with different privacy settings. In some embodiments, the net management module 806 includes a privacy management module to track the privacy settings of the nets and the privacy settings of individual objects (items) in a net.

In some embodiments, a net in the context of the knowledge networking environment is referred to herein as a "Twine". A "Twine" is considered to be synonymous in meaning with what is referred to herein in this disclosure as a 'net' and is also associated with all and/or additional the functions performed and services offered by a net, in accordance with at least the embodiments described throughout the present disclosure.

The item management module can be any combination of software agents and/or hardware modules able to track any activity or the lack of, related to web content that has been added to the networking environment. The item management module can manage objects (e.g., web content) added to the networking environment and delete objects in response to receiving a request from a user with rights to delete the objects.

In one embodiment, the item management module identifies a number of rules associated with privacy and/or access rights of the object. For example, a user can specify a set of relational attributes when adding content to the networking environment. Relational attributes can include, for example, who can see the content, the users that can see the content, or a particular group of users that can see the content. In some embodiments, a set of users with a predetermined relationship (e.g., family) of the user can view the content. In addition, relational attributes can further include who can edit the content, share the content, collect the content, and/or bookmark the content. Similar to content viewing rights, edit, commenting, asking a question, sharing, collecting, bookmarking rights can be specified by default, on an individual basis, on a relationship basis, or on a group basis (e.g., only users who are subscribers can edit the content).

In one embodiment, the item management module identifies the preferences of a content provider associated with accessibility of the web content when the content provider is a third-party host of the web content. The preferences can be determined from metadata associated with the web content. For example, the third-party host may not permit edits/modifications to be made to the web content. In addition, the third-party host may limit the number of shares that can be made on the networking environment. Thus, in one embodiment, the item management module determines a set of rules governing accessibility of the web content based on the relational attributes specifiable by the user who adds the web content and the preferences of the third-party host of the web content, when applicable. When users share and distribute web content in the networking environment, the item management module enforces the set of rules.

The search/share module 807 can be any combination of software agents and/or hardware modules able to facilitate intelligent searching and sharing of objects, nets, contacts among users in the knowledge networking platform. Since relationships between objects (e.g., users, user profiles, items, contact information, nets) in the web-space associated with the networking platform are known and/or otherwise identifiable, advanced search functionalities can thus be provided in the knowledge networking environment. For example, since content is typically associated with users (e.g., by virtue of the content being added by users, content having commented on by users, and/or content having been edited by users) a search parameter can allow a search user to specify the degree of separation within which to perform the search query. For example, a user may wish to see content related to 'scuba diving' associated with (e.g., posted by, commented by, moderated by, edited by, tagged by, rated by, and/or annotated by, etc.) users and/or contacts that are within three degrees of separation from the user.

In addition, the search parameter may allow the search user to specify the types of relationships within which to conduct the search. For example, a patent attorney may wish to see posted content related to new rules published by the United States Patent and Trademark Office that is associated with colleagues who are patent attorneys from the same law firm as the search user, and/or patent attorneys from a specified set of law firms. Further variations of utilizing identifiable relationships (semantic relationships, keyword relationships, etc.) between objects in the web-space to provide users with the ability to specify a targeted search scope are contemplated and considered to be within the scope of this novel disclosure.

Some search parameters include, by way of example but not limitation, search all available nets, search all content viewable only to me in a net, search all content viewable by members in a net, search content in a particular net, search all available nets, search nets including those I don't belong to, search nets associated with my connections, search nets associated with friends, search nets associated with colleagues, etc. Further, users can specify to search nets having tagged with specific tags (e.g., dogs, scuba, sharks, etc.). In addition, multiple search parameters are typically supported for further refining the search scope to one or more different types of relationship. For example, users can select to search and/or post to nets that are within a specified social distance from the user. In a further example, users can specify to search nets of first degree friends and are members of the DogLover's Net and are friends of Joe.

Similar to searching, when posting and/or otherwise sharing content, users can specify a targeted set of audience (e.g., users and nets). Some post parameters include, by way of example but not limitation, post to the user's net, post to the owner (or administrators) of a net, post to members of a net, post to a net but make viewable by public, post to second degree contacts that are employed by a particular company, post to nets of friends, post to nets of colleagues, post to nets that the user belongs to, post to nets having a predetermined set of tags identified, etc.

In some embodiments, the search/share module 807 is further able to provide educated recommendations to users, for example, users that opt-in to receive recommendations from the system and/or other users. In other words, the search/ share module 807, in some embodiments, provides push-model based sharing. Since the knowledge networking environment, based on a user's profile, history, objects, nets, friends, etc., can deduce types of content and/or subject matter that the user is likely to be interested in, the search/share module 807 can present a list of objects/items likely to be of interest to the user.

In addition to user browsing history, recommendations can be made based on search history and items/web-pages the user is currently viewing. However, depending on the owner of the recommended objects/items, the user may or may not have immediate access. For example, item/object owners can specify to have objects be partially visible (e.g., title, summary, and/or abstract) to other users who do not have default access to the owner's items (e.g., they are not connected, they are not related, they are not friends, their social distance is not within a predetermined degree of separation, etc.).

If the user determines, for example, based on the partial visibility that the item is of interest, the search/share module 807, provides a pathway for the user to request the owner for access to the particular item of interest. Upon receiving an authorization from the owner, the search/share module 807 can present the requested items to the user. In other embodiments, recommended items are immediately available for access to the user if the owner does not have restricted privacy settings. Note that recommendations and sharing need not necessarily occur between users that are connected in any specified manner, if at all. Recommendations can be made by virtue of owners of items allowing their items to be at least partially shared and recipients who opt in to receive recommendations. In addition, sharing between users not initially connected provides an avenue through which to meet other users and/or to become connected in the network, for example.

The proximity module 808 can be any combination of software agents and/or hardware modules able to determine the social distance between objects in the knowledge networking environment. In general, social distance is proportional to the degrees of separation that a user and/or item is from a user of interest. For example, a first degree contact is a user that is directly connected to the user of interest. A second degree contact is a connection of a first degree contact of the user that is not directly connected to the user. Since items in the knowledge networking platform are linked to users (e.g., owners that added (posted) an item, edited an item, commented on an item, tagged an item, etc.), social distances can be determined between items and other users.

Figure 8D:
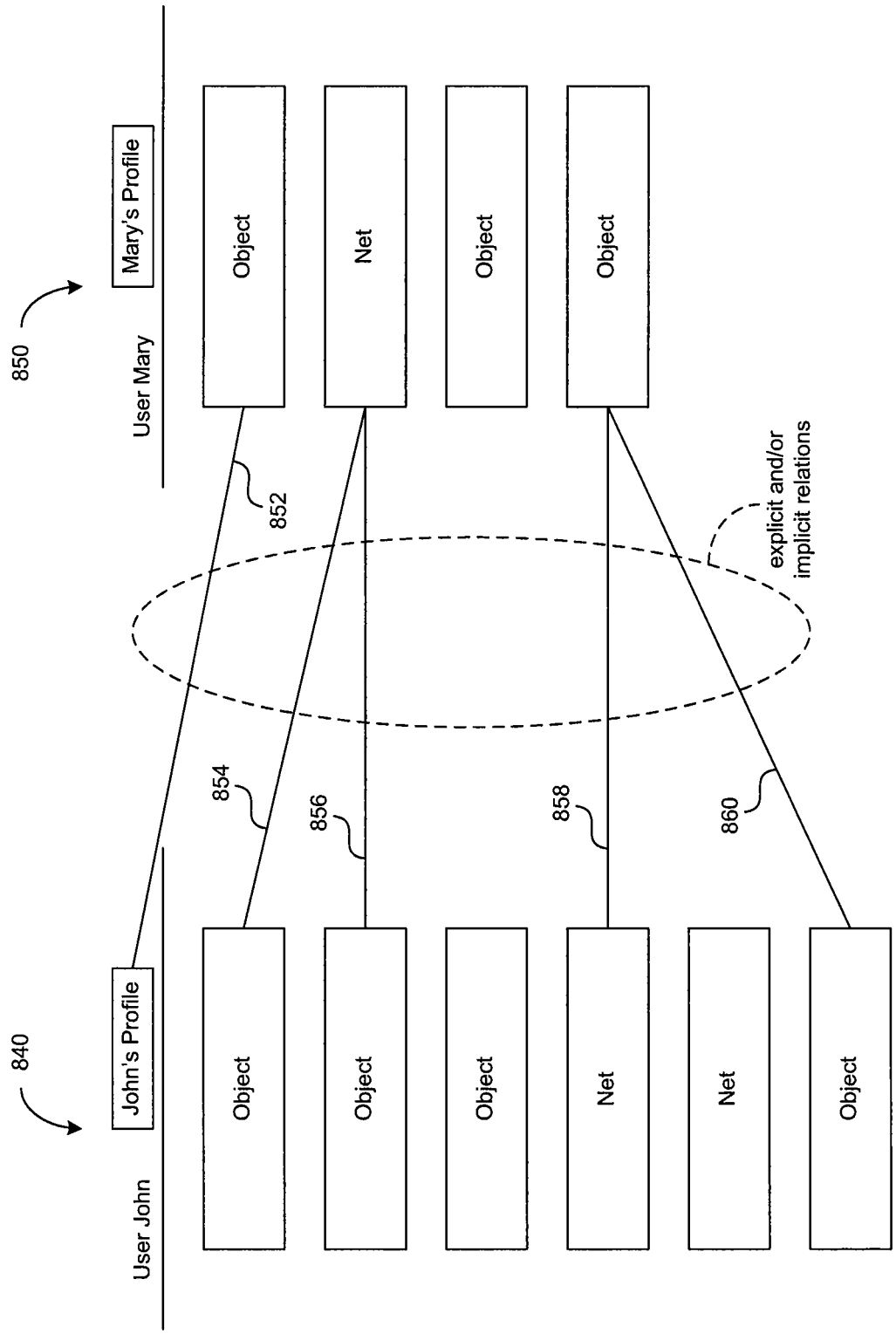
FIG. 8D depicts a diagrammatic representation of types of objects that can have implicit and/or explicit relationships with other objects, according to one embodiment.

Some examples relationships (e.g., social relationships, semantic relationships, and/or social semantic relationships) between objects, nets, and users are illustrated in the diagrammatic representation of types of objects that can have implicit and/or explicit relationships with other objects with reference to FIGS. 8D-E. For example, with further reference to FIG. 8D, users 'John' and 'Mary' can be socially connected by virtue of having a predetermined social relationship with one another (e.g., friends, family, colleagues, etc.), being directly connected, and/or having a social connection within a predetermined degree of separation away.

Further, the proximity module 808 is, in some embodiments, able to track semantic relationships between objects. In one embodiment, the proximity module identifies a semantic relationship between a user profile and another user's object. For example, with reference to FIG. 8D, user 'John's' profile is identified to be related to (link 852) an object of user Mary's. In most instances, the identified relationships can be keyword based and/or semantics based. Similarly, relationships between objects/nets of user 'John's' and objects/nets of user 'Mary's' can be identified by the proximity module 808 based on keyword matches and/or semantic relationships. By identifying such relationships among the set of objects and users in the knowledge networking environment, social distances between objects and users can be determined.

Thus, in one embodiment, the proximity module 808 communicates with the search/share module 807 to facilitate in performing searching and sharing functions to be carried out within a particular social scope. For example, the proximity module 808 can provide a list of users that satisfy a set of search criteria specified by a search user and the search/share module 807 performs a search on nets and items associated with the list of users. The search criteria, as detailed previously, can be a particular social distance, a range of social distances, a particular type of relationship, and/or a combination of any of the above. In some embodiments, the functions represented by the proximity module 808 and the search/share module 807 are partially and/or wholly combined and can be implemented with one or many modules.

In some embodiments, search results are provided to a search user in a format that indicates the social distance of each search result to the user, via a collaborative effort between the search/share module 807 and the proximity module 808. In a further embodiment, search results are ranked based on the degree of separation between the search user and the items in the search results. For example, in addition to keyword relevance and/or semantic relation, ranking of search results can factor in social distance.

In one embodiment, the proximity module includes the semantic social linking module. The semantic social linking module can be any combination of software agents and/or hardware modules able to identify relationships between users based on semantic/keyword relationships between items/nets associated with the users. For example, with further reference to FIG. 8D, connections 854-560 between objects and nets associated with users 'John' and 'Mary' are connections that semantically socially link 'John' and 'Mary', if no prior explicit social connections/relationships exist. FIG. 8E depicts tables illustrating example lists of the types of explicit relationships and implicit relationships that can exist among objects and/or users in the knowledge networking environment, according to one embodiment. In most instances, the explicit relationships are identified based on user-triggered events whereas the implicit relationships are identified based on links (e.g., social, semantic, keyword, semantic social) determined by the knowledge networking environment, as shown in FIG. 8E.

The knowledge management module 810 can be any combination of software agents and/or hardware modules able to organize, compile, assimilate, manage, and/or analyze information/knowledge associated with the networking platform. The information/knowledge can be those provided by users and/or a knowledge database (e.g., knowledge database 814) created by system administrators. For example, the knowledge database can include, by way of example but not limitation, sets of ontologies, taxonomies and/or folksonomies. The knowledge database 814 in some instances, includes, dictionaries, thesauruses, and/or encyclopedias, etc.

In some embodiments, the knowledge management module 810 compiles information gathered from the networking environment and stores the information in the knowledge database 814 for future reference and access. The information compiled can be based on user behavior, information submitted by users, edits provided by users, tags specified by users. For example, the knowledge management module 810 can provide a channel for users to make a collection of their top items considered by the users to be of general facility and/or interest to other users. User's top items can be stored in the knowledge database 814 to be provided to other users via a recommendation or request.

In addition, the knowledge management module 810 can provide a facility for users to post questions and to solicit answers from other users. In some embodiments, a rating system is provided for answers and the users that provide the answers for quality control purposes. The questions and answers collected from users can further enrich the contents of the knowledge database. For example, when the same question is asked by another user, the knowledge management module can retrieve the answers previously stored in the knowledge management module 814. Similarly, other user oriented services such as responses to offers and requests, products/service listings, reviews of services and products, facts/statistical data, FAQ's, How-to's, can be solicited among users and stored as general knowledge in the knowledge database. Therefore, the knowledge database 814 is thus update-able and adaptable, based on, for example, knowledge acquired from user submission and/or from identified user behavior.

The tagging module 812 can be any combination of software agents and/or hardware modules able to identify one or more of keywords, tags, meta-tags, semantic tags from user metadata, user behavior on the networking environment, and/or metadata of web content. Semantic tags can be identified based on one or more of many methods. In one embodiment, tags are identified in content via natural language processing (NLP). The natural language processing method can detect nouns, proper nouns, verbs, subject, predicate, object and/or other parts of speech as well as grammatical expressions such as phrases and other constructions. For example, proper nouns can be turned into tags. When the tags are clicked, a query can be made to locate other web content and/or items with that tag, and/or with any text that matches that tag.

In one embodiment, tags are identified via entity extraction, by, for example, combining NLP and ontologies of concept and rules. The combination of NLP and ontologies can detect classes of concepts in intellectual content and semantically classify the concepts as, one or more of but not limited to, people, companies, places, addresses, phone numbers, general concepts, or finer classifications of the above (e.g., products, events, schools, celebrities, presidential candidates, etc.). New objects against which objects are to be detected via entity extraction can be regularly entered into the system. For example, new objects can be created of types, person, organization, place, and/or product, etc. In addition, new tags can be continuously added based on identified user behavior, such as tags added, edited, commented, connected, and/or annotated by users, etc. Therefore, in one embodiment, content in the knowledge networking environment is re-analyzed by the tagging module 812 to update existing tags and/or to identify new tags.

For example, tags with errors can be updated and tags previously not identified can now be tagged. The re-analyzing can occur at predetermined intervals. In some embodiments, the reanalysis can take place automatically when a predetermined amount of new objects and/or tags have been updated in the system. Further, the re-analysis can be manually triggered. For example, when a user adds a new organization object ("Stanford University") into the knowledge networking environment, existing content that references "Stanford University" is identified and tagged.

In one embodiment, tags are identified via a Bayesian classification process thus enabling identification of one or more subject matter/concepts the web content and/or an item encompasses. In some instances, the subject matter can be identified even when the subject matter is not explicitly mentioned in the web content. For example an article describing process and procedure through which the Declaration of Independence was drafted can be identified as being related to "politics" and "history" and tagged as such, even though neither the words "politics" nor "history" were necessarily explicitly stated in the article. In one embodiment, subject matter can be identified based on Bayesian statistical techniques and performing machine learning to analyze a knowledge (information) database with a predetermined structure (e.g., including for example, encyclopedias, dictionaries, thesaurus, such as, but is not limited to, the Wikipedia, encyclopedia.com, Britannica.com, MSN Encarta, dictionary.com, thesaurus.com, techweb.com, etc.).

For example, the Wikipedia contains approximately 300,000 declared subject categories, which are specially named pages in Wikipedia. Other pages in the Wikipedia that represent the content or articles of Wikipedia are linked to the subject category pages for the subjects they are relevant to. In one embodiment, classified articles in Wikipedia having a particular subject matter (e.g., "history") in the Wikipedia are utilized as "training inputs" for the Bayesian classification process. Machine learning can then be performed on the classified articles of the knowledge (information) database to determine a set of statistical classification rules for identifying content that is an indication of the particular subject matter (e.g., "history"). The amount of "training inputs" can be adjusted, in one embodiment, as suitable to the application.

When a suitable amount of "training data" is provided for a particular subject matter (e.g., "history"), an estimated probability that an object having text is about the subject matter (e.g., "history") can be provided via the Bayesian classification process. In most instances, the accuracy and precision of estimated probability that a set of content is about the particular subject matter, increases with the quantity of "training data" provided during the machine learning process. The same procedure can be applied to additional subject matter and/or concepts.

In one embodiment, the classification process is performed in a hierarchical manner, since, for example, the structure of the original database for which a statistical model is built is also hierarchical. For example, a set of content can initially be analyzed to determine if it is about a particular subject matter ("history"). Then, the content can be analyzed to determine if it is about a child-subject matter ("history of America") of the subject matter ("history"). If the content is about the "history of America", then the content can further be analyzed to determine if subject matter further relates to a child-subject matter (e.g., "Declaration of Independence") of the "history of America", and so on and so forth to further narrow and precisely identify one or more subject matter.

In one embodiment, tags are identified via comparing textual data in the network platform (e.g., text that occurs in emails, notes, added web content, photographs, user profile, user metadata, etc.) to text that occurs in other content on the networking environment. For example, if an article includes one or more references to "Super Solar", and additional content on the network is identified to have one or more references to "Super Solar", then the term "Super Solar" can be an identified tag. When the term "Super Solar" is again detected in other content, the term "Super Solar" can be tagged in the other content. Thus, in one embodiment, significant phrases can be determined via detecting presence of the phrases in one or more contents (e.g., items, objects, web content, notes, photographs, emails, etc.) in the networking environment. In some instances, for example, even when the phrases are not identifiable by NLP, entity extraction, Bayesian classification and/or explicit links, In one embodiment, tags are identified via determining and analyzing distribution of nouns and phrases that occur in the content in the networking environment over time and user metadata. For example, nouns and phrases that are frequently used may be identified as tags when they are mentioned. In some embodiments, additional filters may be necessary to screen out noise expressions to further hone in on the nouns and phrases representative of topics rather than common expressions or words.

In some embodiments, tags can be stored as strings or semantic objects. For example, tags can be created as semantic objects upon detection. Alternatively, in some embodiments, tags are created as text-based objects and converted to a semantic object, on an as-needed basis, for example. In one embodiment, the tagging module 812 converts string-based tags into semantic tags. For example, tags can be converted into semantic objects when a user wishes to edit the tags. Editing can include reporting tags that are incorrect, annotating tags with a comment, linking tags, defining tags, and/or rating tags, etc. In a further example, when a user elects to assign a broader and/or narrower tag to an existing string-based tag, the string-based tag can be converted to a semantic object. In addition, the broader and/or narrower tags can also be converted to semantic objects if they are initially string-based. In one embodiment, records of tag edits and/or tag creations by users are stored and/or analyzed. Records may include who performed the edit and/or when a tag was edited, in addition to the edits made to the tag.

By observing user tagging activities (e.g., editing, adding, commenting, removing, etc.), the knowledge networking environment can refine and, in some instances, adapt its tagging process. For example, new auto-tagging rules may be acquired as the system identifies tags previously not automatically detected but are manually added by a number of users. In addition, the system can learn, from user tags, the categories of tags. For example, if a user adds a tag "TechCrunch40" as a tag in a new type "Conferences" for that tag, the system can create a new category "Conferences" with the term "TechCrunch40" as a conference. In addition, if another user now tags the "Paris Convention" as of a tag category conference, both terms "TechCrunch40" and "Paris Convention" will be identified as tags having a category of type conference when identified in other articles/documents.

In one embodiment, string-based tags are converted to semantic objects when tags are mined from an existing knowledge database with a predetermined structure (e.g., imported ontologies, taxonomies, etc.). Since the imported ontologies and/or taxonomies are structured and cannot be attached to string-based tags, the tags are converted to semantic objects to mirror the structure of the particular ontology or taxonomy. In some embodiments, a tag-prefix indicating the category of the tag is represented as a semantic tag. Alternatively, a tag-prefix indicating the category of a tag can be string-based.

Semantic representations of tags allow tags to be linked to other tags via links identified via taxonomic relationships, including, but is not limited to, "has narrower tag", "has broader tag", "has synonymous tag", "has antonym tag", etc. Therefore, the relations between tags can be search such that, for example, when a user searches for items tagged with "science", items tagged with narrower tags related to science as well, such as things tagged with physics, biology, chemistry, etc. For example, a user may select to see items having the tag "physics". The knowledge networking environment can additionally present the user with options to "view items with broader tags" and/or "view items with narrower tags", for example. Once selected, items with narrow tags or broader tags can be presented to the user. In addition, the user can select to view items with further narrower and/or broader tags.

The host server 800 represents any one or a portion of the functions described for the modules. More or less functions can be included, in whole or in part, without deviating from the novel art of the disclosure.

Figure 9:
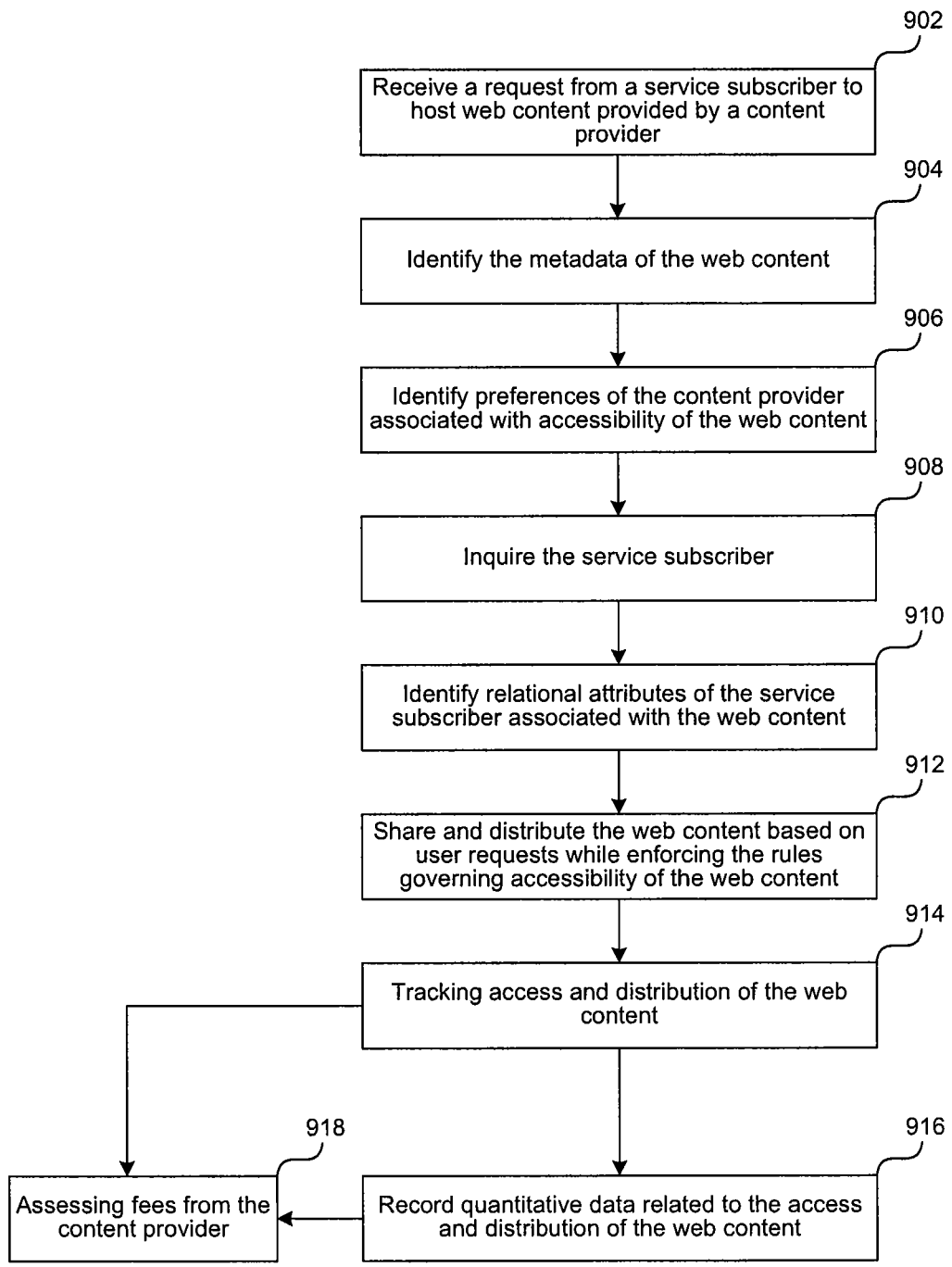
FIG. 9 depicts a flow diagram illustrating a process of hosting web content in the knowledge management and networking environment at the request of a user, according to one embodiment.

FIG. 9 depicts a flow diagram illustrating a process of hosting web content on the knowledge networking environment at the request of a service subscriber, according to one embodiment.

In process 902, a request from a service subscriber to host web content provided by a content provider is received. The request can be received via an upload request placed by the service subscriber through an upload interface of the networking environment. For example, an item (e.g., web content) can be added by clicking the 'Add Item' button of the "Items" of a user net shown in the screenshots of FIGS. 4-7. Lists of basic item types that can be added, in most instances, are displayed on the "Items" page when a request to add an item is received. A few examples of the item types include notes, photography, emails, web pages, contacts, etc. When an item of the "note" type is received, for example, an editable form for adding a new note is to be filled out. Once a completed form is submitted, the content can be analyzed and tagged. The analysis can be based on keyword matching. In one embodiment, semantic tags can be identified based on one or more of many methods, as described in detail in the description of the tagging module in FIG. 8.

In one embodiment, a request to host web content is received via a command initiated from the web page hosting the web content. For example, a java script link can be bookmarked and initiated when a user wishes to add content to the networking environment. When the JavaScript is initiated, an applet appears on the host web page originally hosting the content. The applet allows the user to enter basic information about the web content. For example, as shown in the screenshot of FIG. 7B, the type of the item can be specified, a thumbnail image of the web content can be selected from a set of pre-selected images. The net to which the content can be added is selected in the "Add to" field, for example. In some embodiments, the user has the option of adding the content to a friend or contact's net.

In process 904, the metadata of the web content is identified. The metadata includes information about the web content. The metadata can be machine-readable and/or human-readable, including structural/control metadata that describes the structure of data such as tables, columns, and/or indexes. For example, relational database metadata include tables indicating the names, sizes, and number of rows of the tables in a database. Relational database metadata may further include tables of columns in the database, what tables the columns are used in, and the types of data stored in the columns. Metadata such as, file system metadata, data warehouse metadata, file system metadata, image metadata, program metadata, can be identified. Metadata can also include guide metadata, for example, to assist humans in identifying specific items such as a set of keywords.

In some embodiments, an item of the metadata is described by metadata. For example, metadata of the web content can include but is not limited to, data about the size of the content, date/time the content was created and/or modified, the author/origin of the content, privacy/access attributes of the content, type of objects in the content, and/or a title of the content.

Thus, in process 906, preferences of the content provider associated with accessibility of the web content are identified. For example, the content provider can specify different access attributes related to whom and/or under what circumstances may edit the web content. The content provider can also specify what aspects of the content can be deleted, edited, and/or otherwise modified. In some embodiments, the metadata of the web content indicates the extent to which the web content can be shared. For example, if the content can be bookmarked, collected, shared, and with whom the item is to be shared and to what extent.

In addition, digital library metadata of the web content can include descriptive information about the intellectual content of the web content, including semantic metadata. Thus, in one embodiment, the applet through which web content can be added to the networking environment without leaving the original web site hosting the web content, determines a suitable title for the web content based on its identified contents. In some instances, the user can specify the title for which the web content is to be given on the networking environment via the applet. The applet can also identify a suitable summary for the web content based on its identified content. Alternatively, the summary can be user specifiable. As shown in the example screenshot of FIG. 7B, the applet can identify tags associated with the web content. Tags and comments can also be specified by users on the applet to be made available on the networking environment.

In process 908, the service subscriber is inquired. The service subscriber can be presented with a set of questions when the service subscriber requests to add web content to the networking environment. The questions asked can be a default set of questions presented to every service subscriber who wishes to add content. The questions asked is, in some embodiments, specific to the type of item added, and/or specific to the intellectual content of the item added. In some embodiments, a sponsor of the item can specify a set of questions to be presented to the subscribers that add the item to the networking environment. Thus, in process 910, the relational attributes of the service subscriber associated with the web content are identified, for example, based on the responses to the inquiries made to the subscribers.

The relational attributes of the service subscriber include privacy and access settings of the web content. For example, the service subscriber can indicate for web content added to the networking environment, whether the web content is visible to other users or not. In addition to visibility, the subscriber can indicate whether other users can collect, bookmark, share, and/or edit the web content. The subscriber can assign privacy attributes on an individual basis, and/or on a group basis. For example, the subscriber can allow the contacts who are friends of the subscriber full access while allowing contacts who are colleagues, partial access. The subscriber can also assign different privacy settings and access rights to users who are subscribers versus visitors. The subscriber may have a default set of privacy settings and/or access rights for all items added unless otherwise noted.

In process 912, the web content is shared and distributed based on user requests while enforcing the rules governing accessibility of the web content. In addition to privacy rules of the user that added the web content, the accessibility rules specified by the content provider are also enforced. Actions constituting sharing and/or distribution of the web content include but are not limited to collecting, sending, sharing, adding to a net, bookmarking, viewing, writing a comment regarding the web content, asking a question regarding the web content, and/or participating in a discussion about the web content, etc. In process 914, the access and distribution of the web content are tracked. The access and distribution is identified when one or more of the above actions and/or other actions indicating user interest in the web content are detected. In process 916, quantitative data related to the access and distribution of the web content is determined and recorded. In process 918, fees are assessed from the content provider. In some embodiments, the content provider is a sponsor (direct or third-party) who wishes to promote the material in the web content, utilizing one or more of the special features offered by the networking environment.

Figure 10A:
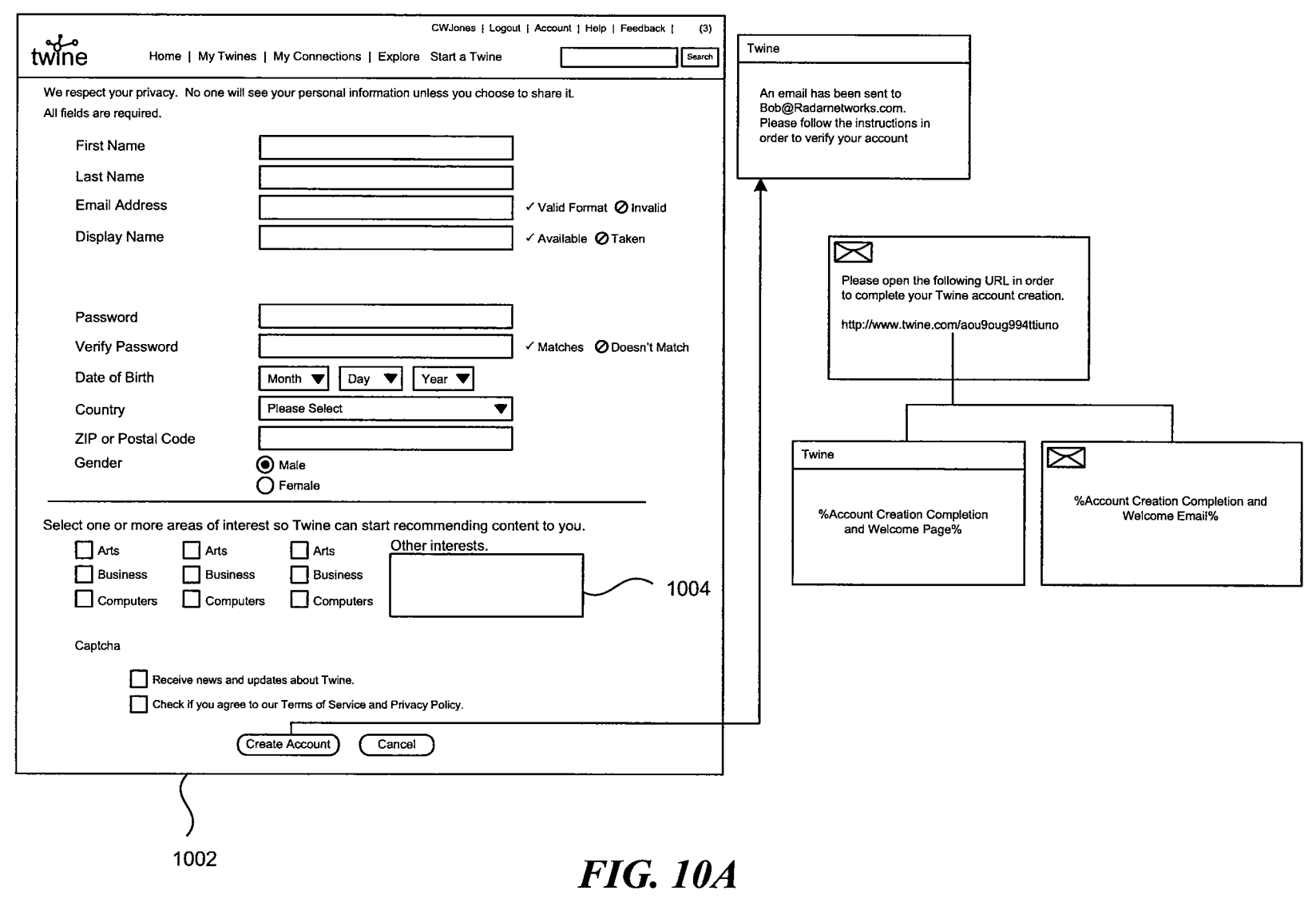
Figure 10B:
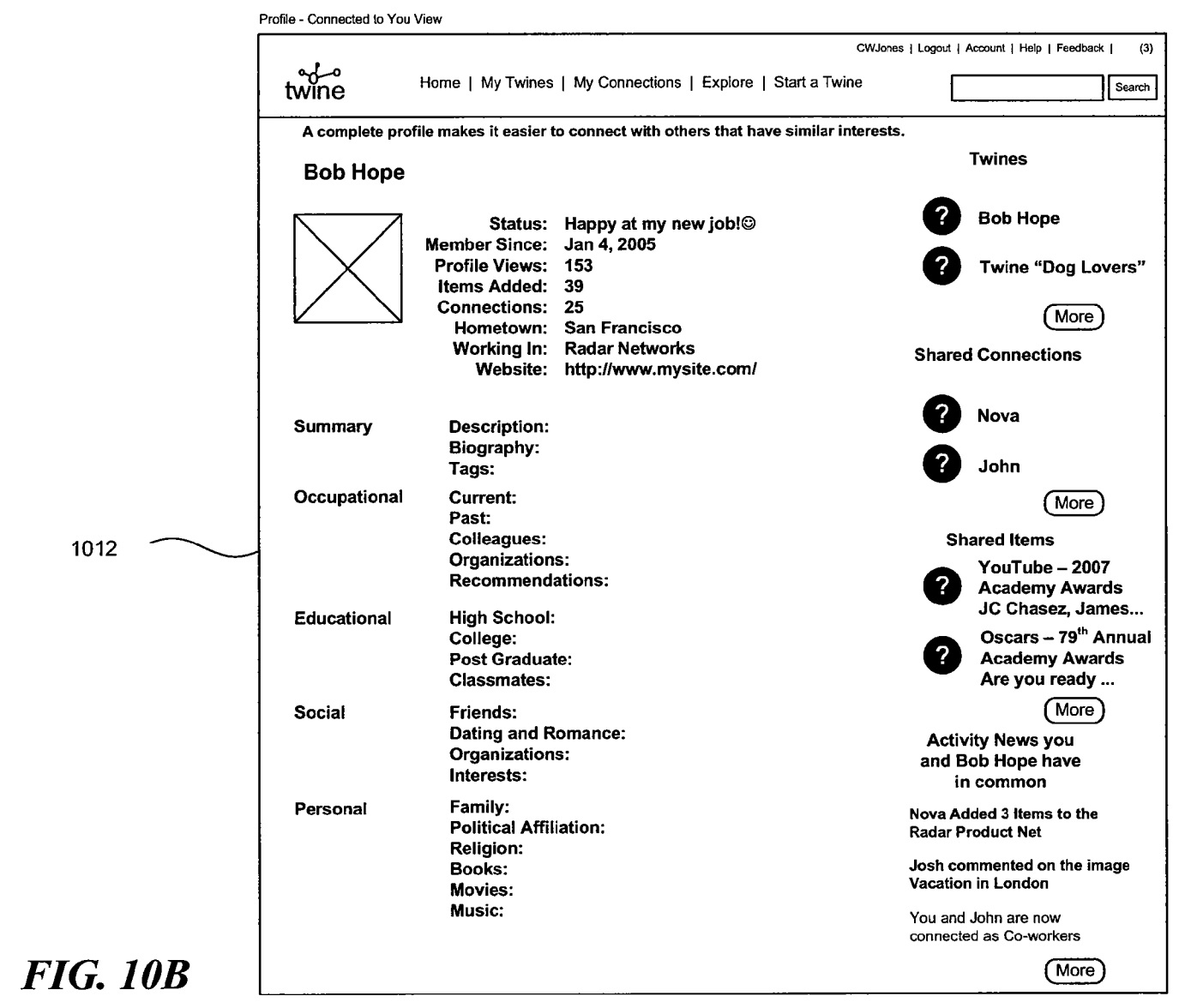

FIG. 10 illustrates an example user interface for signing up for the knowledge networking environment 1002 and an example user interface for viewing and/or editing the user's profile 1012, according to one embodiment.

Once a user has created an account with the knowledge networking environment by submitting the sign-up form, an email is sent to verify the user identity and the validity of the email. Note that the user can select a number of areas of interest in the sign-up form such that networking environment can recommend content to the user. In addition, the user can manually specify any other interests not listed as a check-box entry. In one embodiment, the networking environment generates a semantic profile based on the information submitted by the user. For example, the text submitted by the user as 'other interests' can be analyzed for tags. Therefore, based on information in the user's profile, the relationship between the user and other objects in the networking environment can initially be identified and tracked. The user profile 1012 is typically generated after successfully signing up for the networking environment and is provided upon user logon. The user profile is typically editable by the user.

Figure 11A:
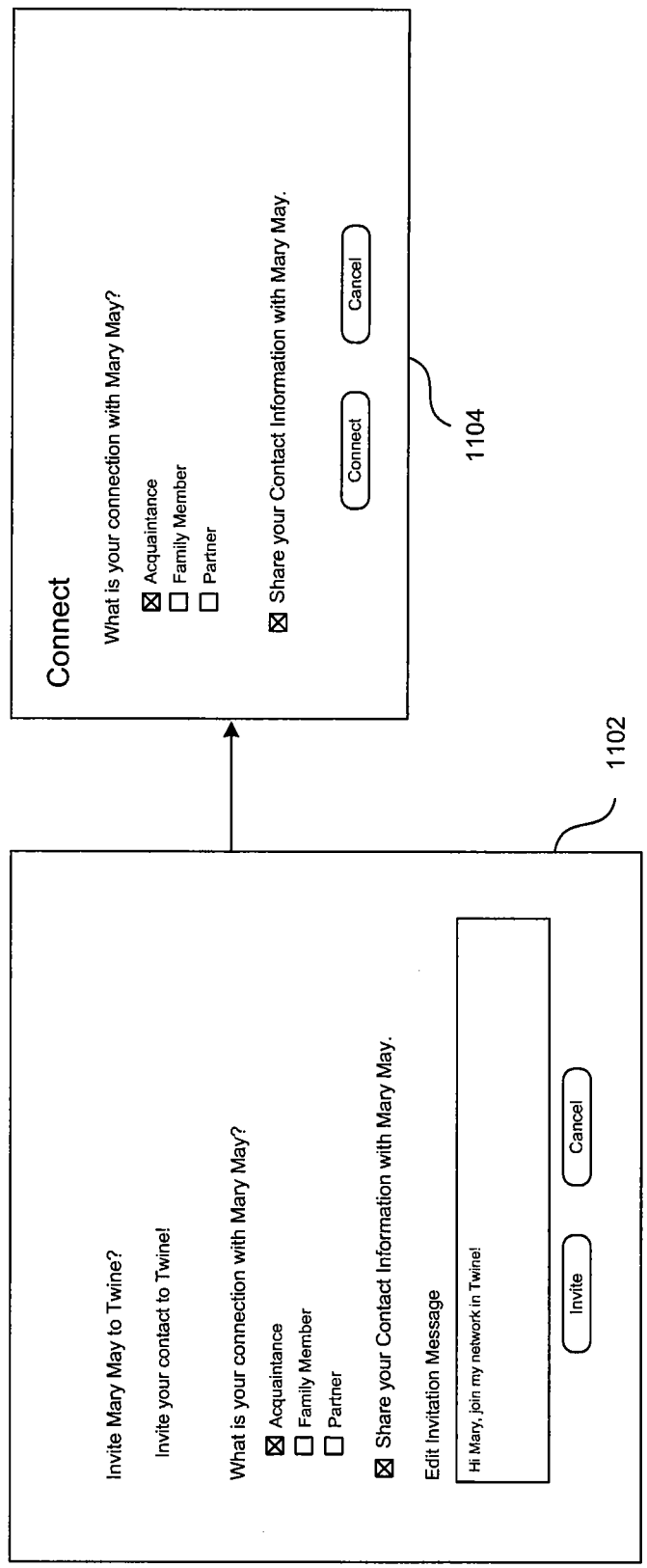
FIGS. 11A-11B illustrate an example sequence of user interfaces for inviting a user to join the knowledge networking environment and an example sequence of user interfaces for inviting another user to connect, according to one embodiment.

FIG. 11A illustrates an example sequence 1102-1104 of user interfaces for inviting a user to join the knowledge networking environment and an example sequence 1106-1108 of user interfaces for inviting another user to connect, according to one embodiment.

An existing user of the knowledge networking environment can invite someone who is currently not a member to join the network. In the example of FIG. 11A, the existing user invites "Mary May" to join the network. A custom invitation message can also be added to be sent to the user "Mary May", for example, via email or other delivery means. In addition, the existing user can add other users as a connection in the network. For example, in FIG. 11A, user interfaces 1106-1110, the user 'ChrisJonesRulezOrz' wishes to add an existing user 'Mary May' as a connection in the network. In some embodiments, the user can also elect to share their contact information when inviting others to connect and/or when accepting a request for a connection.

Figure 11B:
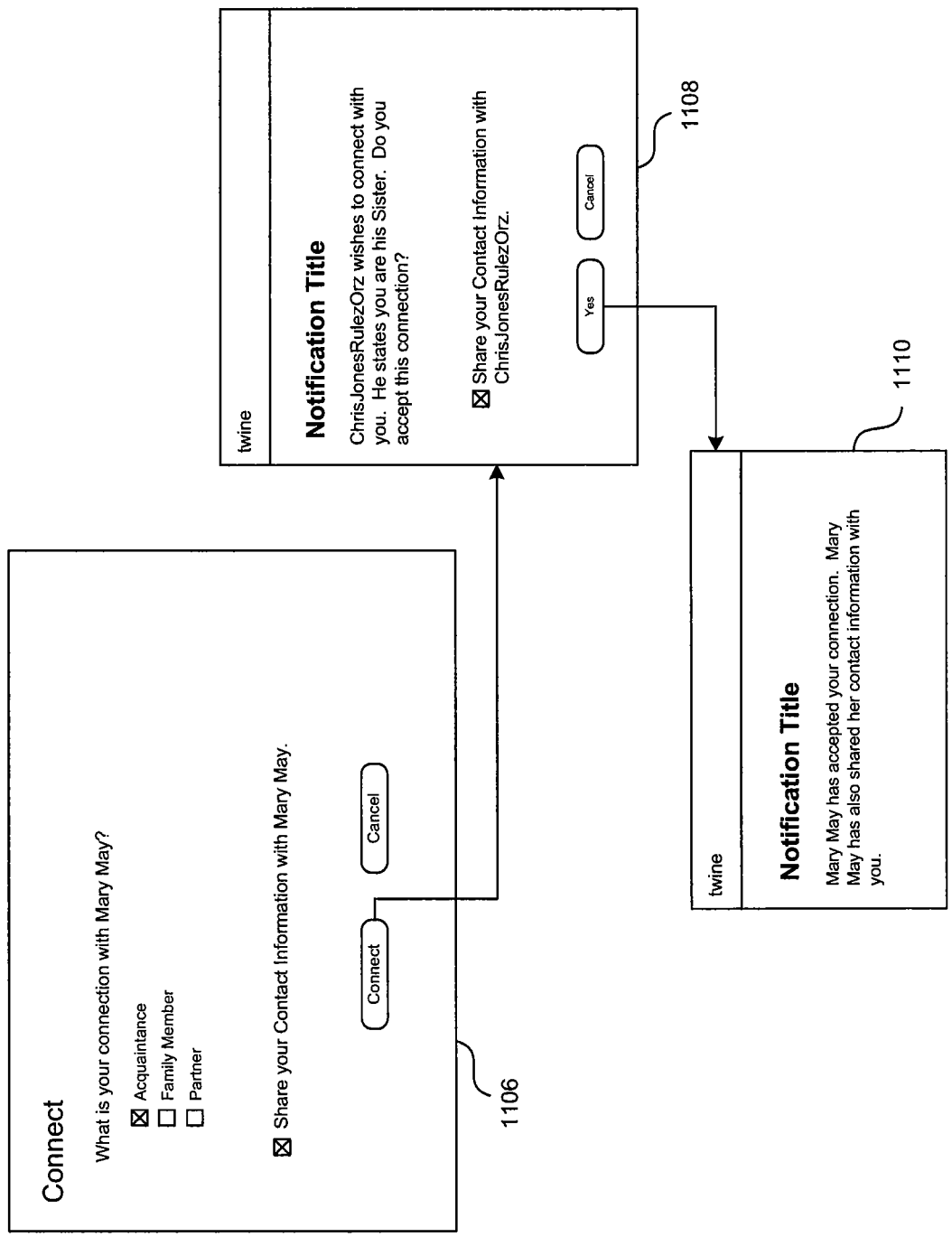

FIG. 11B illustrates an example sequence of user interfaces for removing and/or updating a connection, according to one embodiment.

Users can update connections and/or remove connections. In most instances, the connection is notified when updated and/or removed by another user. When information about a connection is updated by another user, typically, the information change is sent to the connection for approval prior to updates in the system. In the example of FIG. 11B, the user 'Mary May' wishes to change the relationship type with user 'ChrisJonesRulezOrz' as sister. A request for verification is initially sent to the user 'ChrisJonesRulezOrz' and then updated in the system upon approval. In some embodiments, a notification is sent to the user when the operation has completed and/or failed.

Figure 11C:
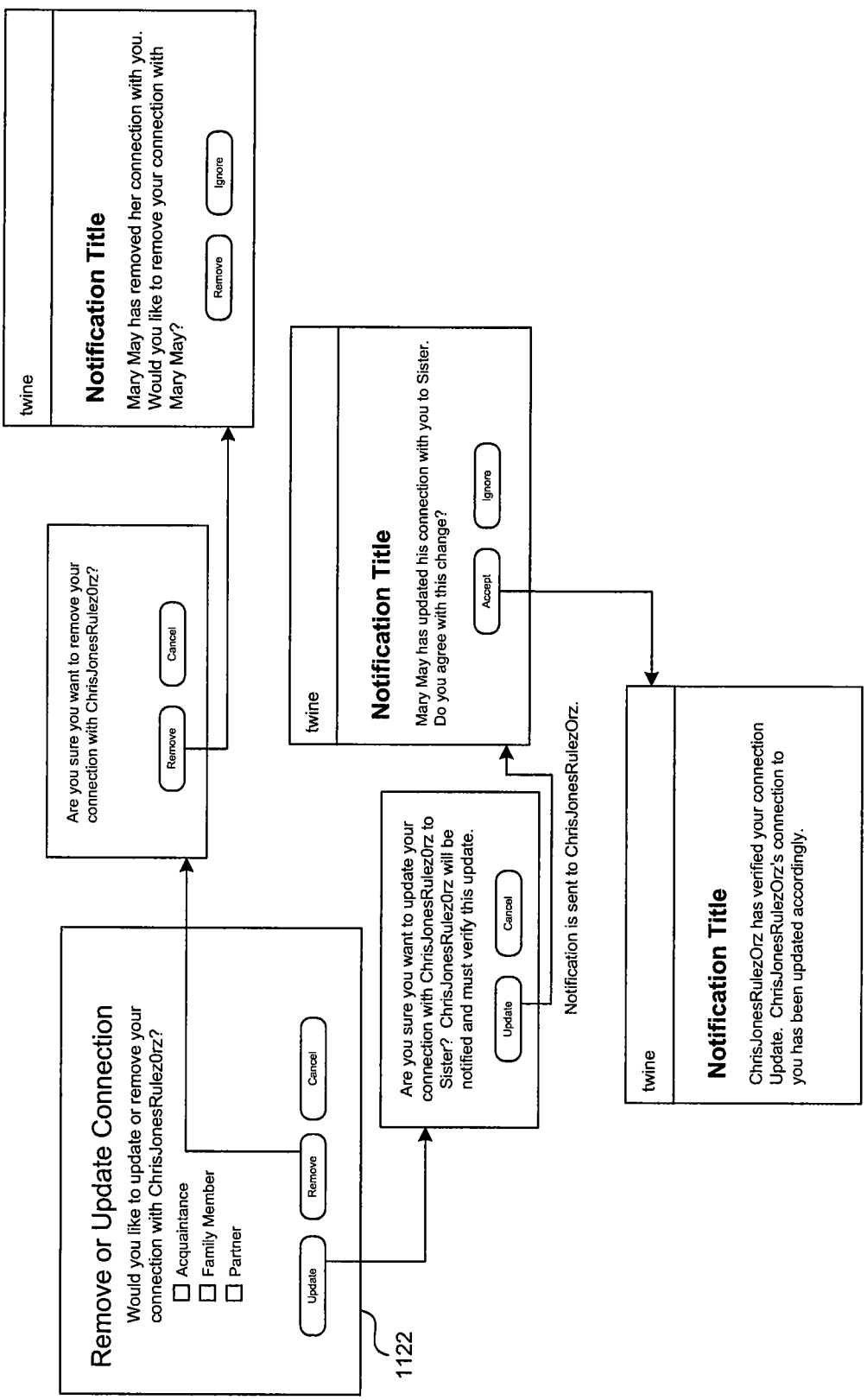
FIG. 11C illustrates an example sequence of user interfaces for removing and/or updating a connection, according to one embodiment.
Figure 11D:
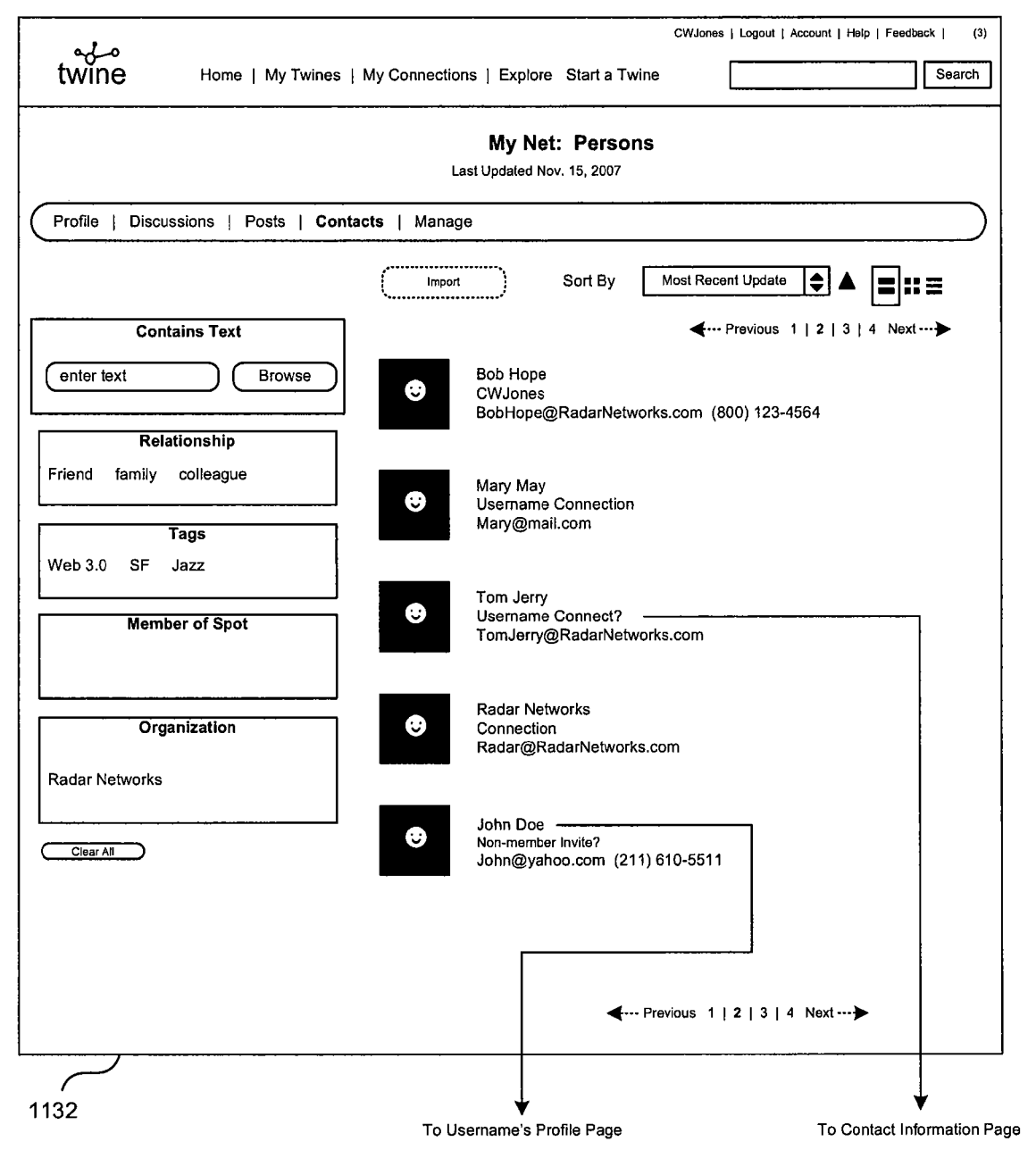
Figure 11E:
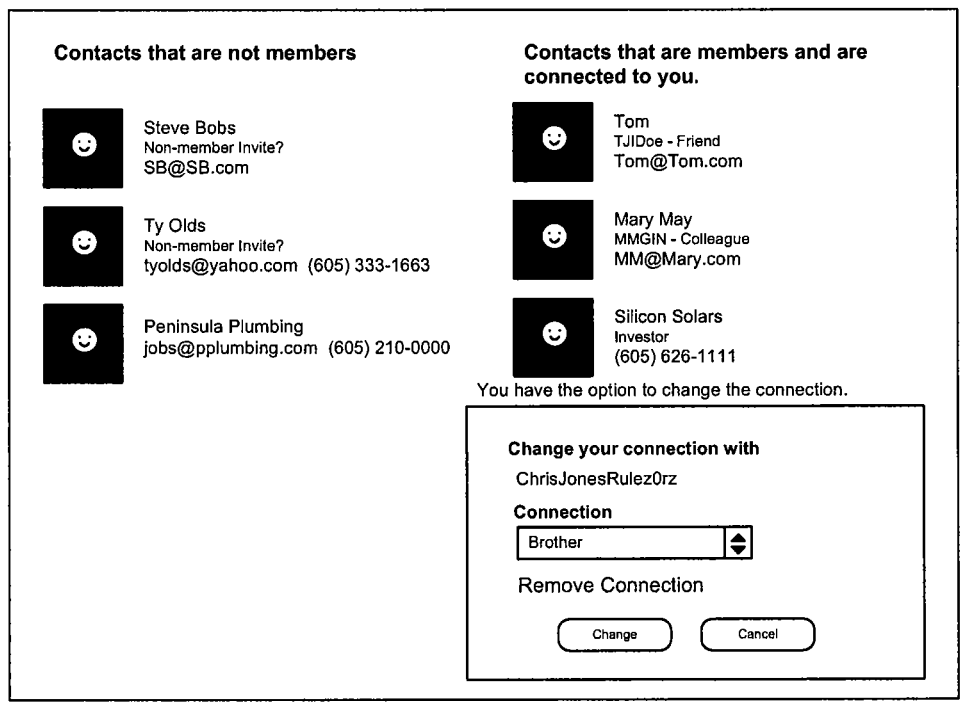

FIG. 11C illustrates an example user interface 1132 showing a list of users associated with a net, according to one embodiment.

As shown, contacts of a user can be categorized by the type of relationship a contact has with the user, the tags associated with the contact, groups the contacts are members of, and/or organizations the contacts belong to. Contacts can be automatically and/or manually placed into these and/or additional categories in which to associate contacts with. Additional categories such as, including but is not limited to, 'Is between the age group of', 'Went to college at', are contemplated and do not deviate from the novel art of this disclosure. In addition, users can manually remove contacts from categories if deemed unsuitable and so-desired.

Contacts can be automatically categorized by the knowledge networking environment based on their semantic profiles and their identified relationships (social, semantic, keyword match, and/or social semantic) with the user. Further classification can be achieved based on semantic relationships between the user's profile and the contacts' profiles. The example user interface 1132 further displays a partial list of the user's contacts on the first user contacts' page. For example, the list shows each contact's name and/or their user name, if they are members of the network. In some embodiments, if a contact is a user of the network, the user interface provides a hyperlink for the user to request to connect with the contact in the knowledge networking environment. Further, in some embodiments, the username of the contact provides a hyperlink to the contact's profile that the user can view provided allowed by the contact's privacy settings. Similarly, if a contact is not a user of the network, the interface provides a hyperlink to allow the user to invite the contact to the network.

FIG. 12A illustrates an example user interface 1202 showing a user welcome screen, according to one embodiment.

The user welcome screen can be displayed when a user logs on to the knowledge networking environment. In the example shown, the user is able to view notifications indicating recent activities, including, but not limited to, other users that responded to a request made by the user. Requests placed to other users include invitations to join the network, invitation to join a group, and/or invitation to connect, etc. In addition, the home page, in most instances, displays request that the user has received from other users and/or groups. In one embodiment, the home page lists a log of the recent activities of the user. For example, the home page can display a list of pages recently visited, nets recently visited, recent comments, new connections made, new posts to nets, and/or new nets created by the user, etc.

In one embodiment, the user can create a net via the home page. For example, the user can initiate a net ("Twine") via selecting the 'Start a Twine' button 1204. In addition, via the home page, the user can add content to the knowledge networking environment via selecting the button 'Get the Bookmarklet' 1206. In addition, buttons 1208 and 1210 enable users to import content and post to nets (or "Twine") via email.

The welcome page 1202 can also display a shortcut for nets of interest to the user. For example, the user's nets can be displayed in box 1212. In addition, nets that the user is a member of can also be displayed. In most instances, the user can specify the nets to be displayed in the shortcut box and/or the criteria for the system to determine the nets to be displayed. The knowledge networking environment can, in one embodiment, automatically generate tag clouds that can be displayed on the home page, for example, in box 1216 on the home page 1202. For example the tag cloud 'People' can be populated with tags that are people's names. Similarly, the tag cloud 'Places' can be populated with tags that are names of locations, street names, cities, countries, and/or sights, etc. Note that the tags displayed can be those identified in the user's nets, in the users connections' nets, and/or in the entire knowledge networking platform. In some embodiments, sources from which the tags to be displayed on the home page are identified, are user specifiable.

In one embodiment, tag cloud categories are customizable. Users can add an additional tag cloud categories and add tags to the particular tag cloud category. Users can also delete categories or modify the scope of existing categories. For example, instead of having a tag cloud 'People', the user may specify a tag cloud of 'Celebrities'. In a further example, a user may add a category of 'Products' and associate items with tags of 'iPhone' with the tag cloud 'Products'.

FIG. 12B illustrates an example user interface showing view of objects (items) in a net 1220 and an example user interface for exploring nets 1222, according to one embodiment.

The user interface 1220 illustrates a set of items associated with one of user's ("Bob Hope") nets. In this example, a list of events is displayed. Note that items that can be included in a net include, in addition to events, but are not limited to, contacts, web pages, videos, images, and/or articles, etc. In addition, a list of tags that are detected in the particular net is displayed in the object view of the net. The number of tags to be displayed may be user specifiable. In addition, the visualization of the tags (e.g., the relative sizes, relative positions, colors, font, etc.) may also be user specifiable.

The user interface 1222 provides to the user, an overview of a list of nets ("Twines") associated with the user. For example, the nets can be displayed as results of a search query. The nets can also be displayed based on identified social proximity between the net and the user. The exploration view of various nets, also, in some embodiments, enables the user to join a net. In addition, the net exploration view can also enable a user to request membership in a net where membership is restricted and/or where approval is required. The user, in some instances, also manage the nets created by the user and/or the nets that the user is an administrator of. For example, the user can select to invite members and/or manage the net. In most instances, the net exploration view also provides general information about the net, including the name of the net, a summary of the net, if applicable, and/or some membership related information.

FIG. 13A illustrates an example user interface showing the home page 1302 of a net, according to one embodiment.

A net home page can display recent updates in the net, including, but not limited to, new members, newly posted items, and/or newly posted/edited comments, for example. The home page can also display general information about the net, including, but not limited to, number of members, when the net was created, number of posts, etc. as shown in box 1304. In addition, in box 1306, a list of tags identified from objects (items) in the net can be displayed. In some embodiments, the list of tags can be categorized into tag clouds, as previously described. Screenshot 1310 illustrates an applet interface for adding an item to nets. In the applet, the title can be specified along with additional comments and/or any manual tags that the user wishes to specify. In addition, the user can select the nets to which the item is to be posted to.

Figure 13B:
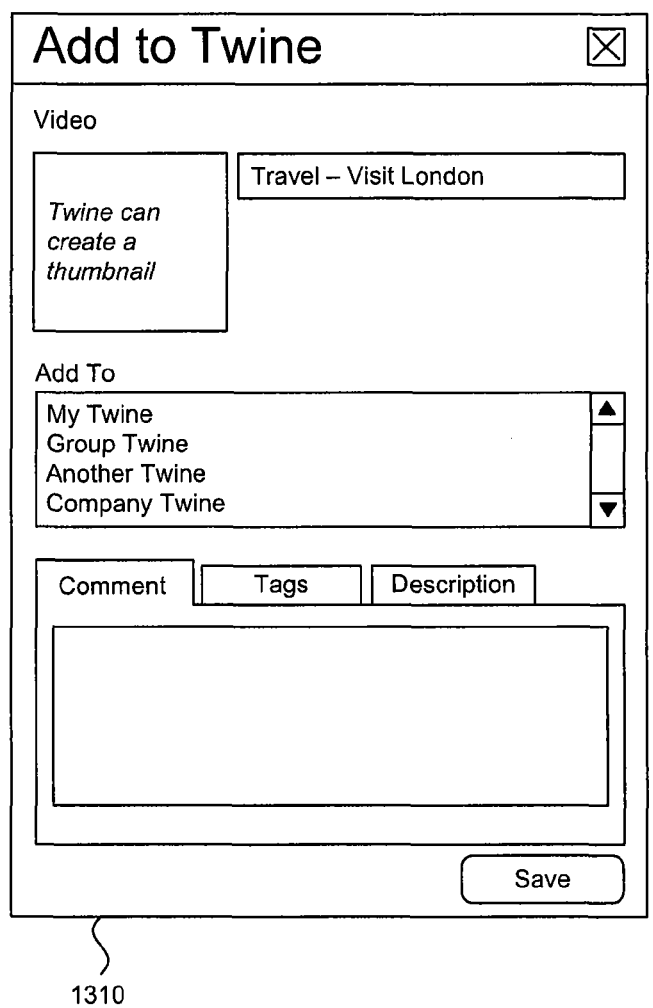
Figure 13C:
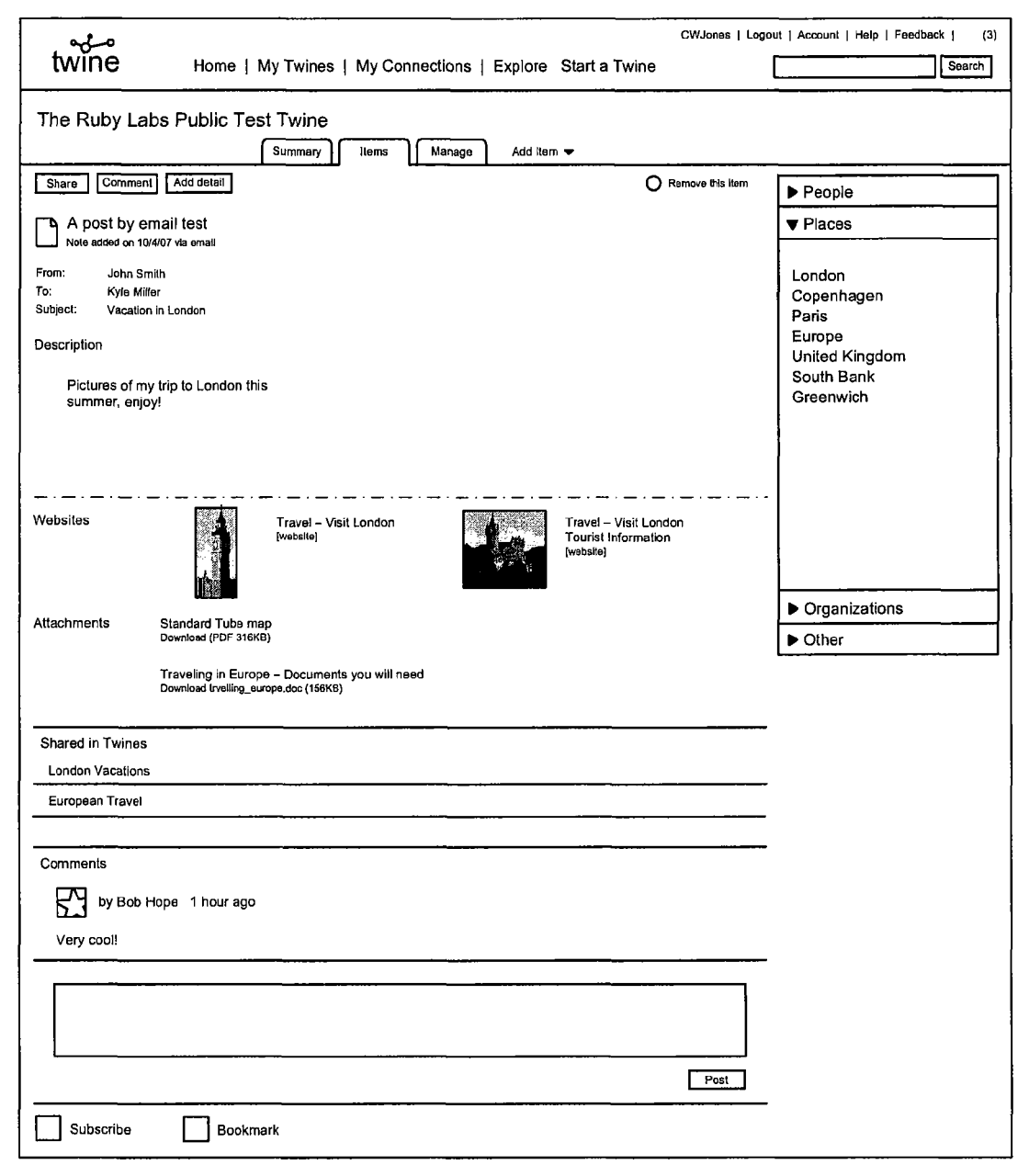

FIG. 13B illustrates an example user interface 1312 showing an object (item) posted to a net via email, according to one embodiment.

The user interface illustrates a view of an item in the net ("The Ruby Labs Public Test Twine") that was posted by email. The email posting typically further includes who the posting was made by and to whom the post was addressed to in the net. In addition, the item view includes comments by visitors of the net and/or other members of the net.

Figure 14A:
FIG. 14A illustrates an example user interface for exploring nets in the knowledge networking environment, according to one embodiment.

FIG. 14A illustrates an example user interface 1402 for exploring nets in the knowledge networking environment, according to one embodiment.

In the net exploration view, a directory of nets can be listed. In addition, a list of featured nets, for example, popular nets are displayed on the net exploration page. Popular tags identified in content may also be displayed. The displayed tags are typically hyperlinks that when clicked, a search query is automatically performed for content having the tag that was clicked on. In addition, a list of featured users can also be displayed. The list of featured users can be selected randomly by the system. In some embodiments, the list of featured users are identified and displayed based on user specified criteria. For example, the user may indicate a preference for ("new users that are interested in entrepreneurship") to be featured on the net exploration page.

Figure 14B:
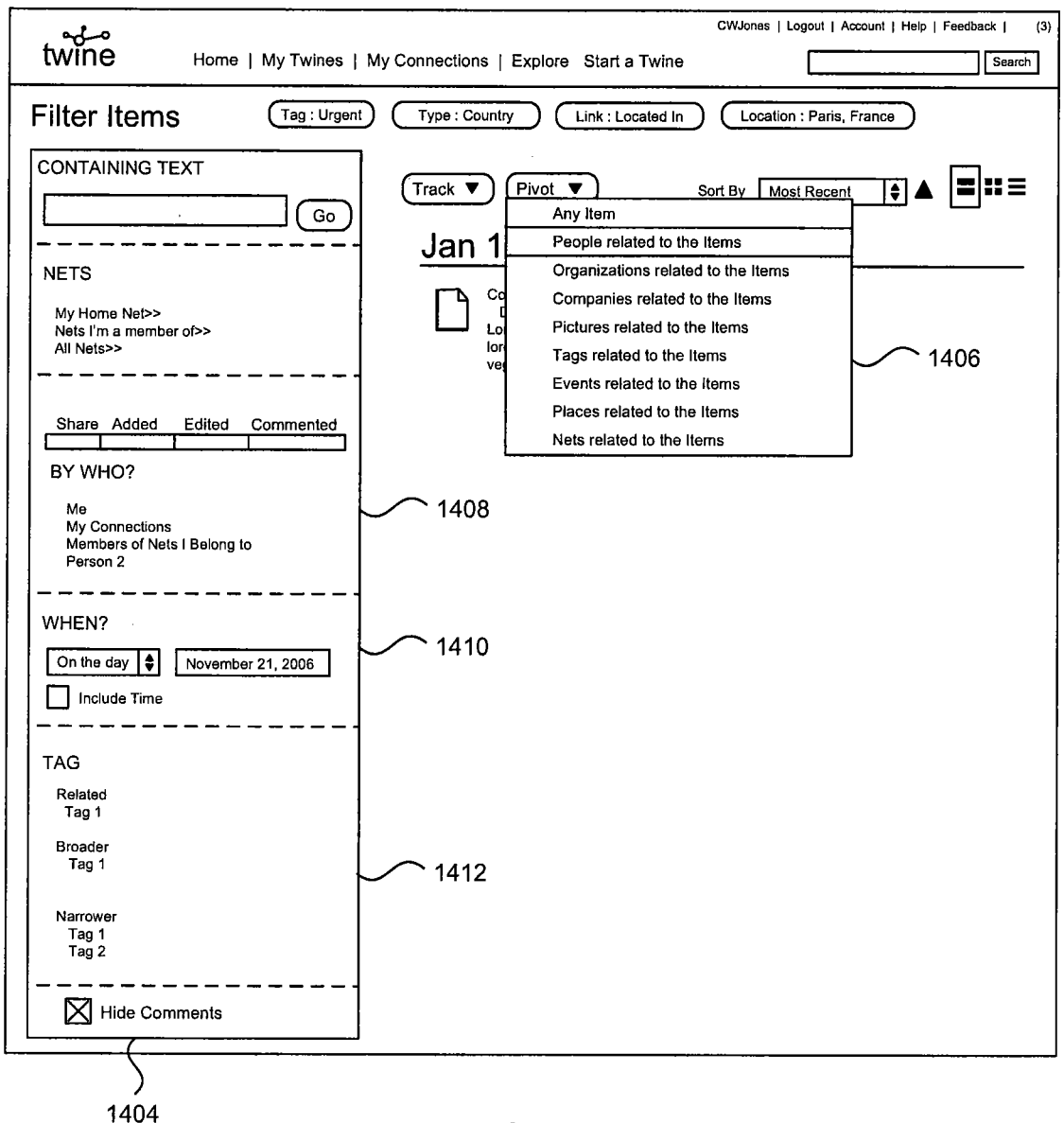
FIGS. 14B-14C illustrate an example user interface for searching for an additional set of search results having a specified type of relationship with a first set of search results, according to one embodiment.
Figure 14C:
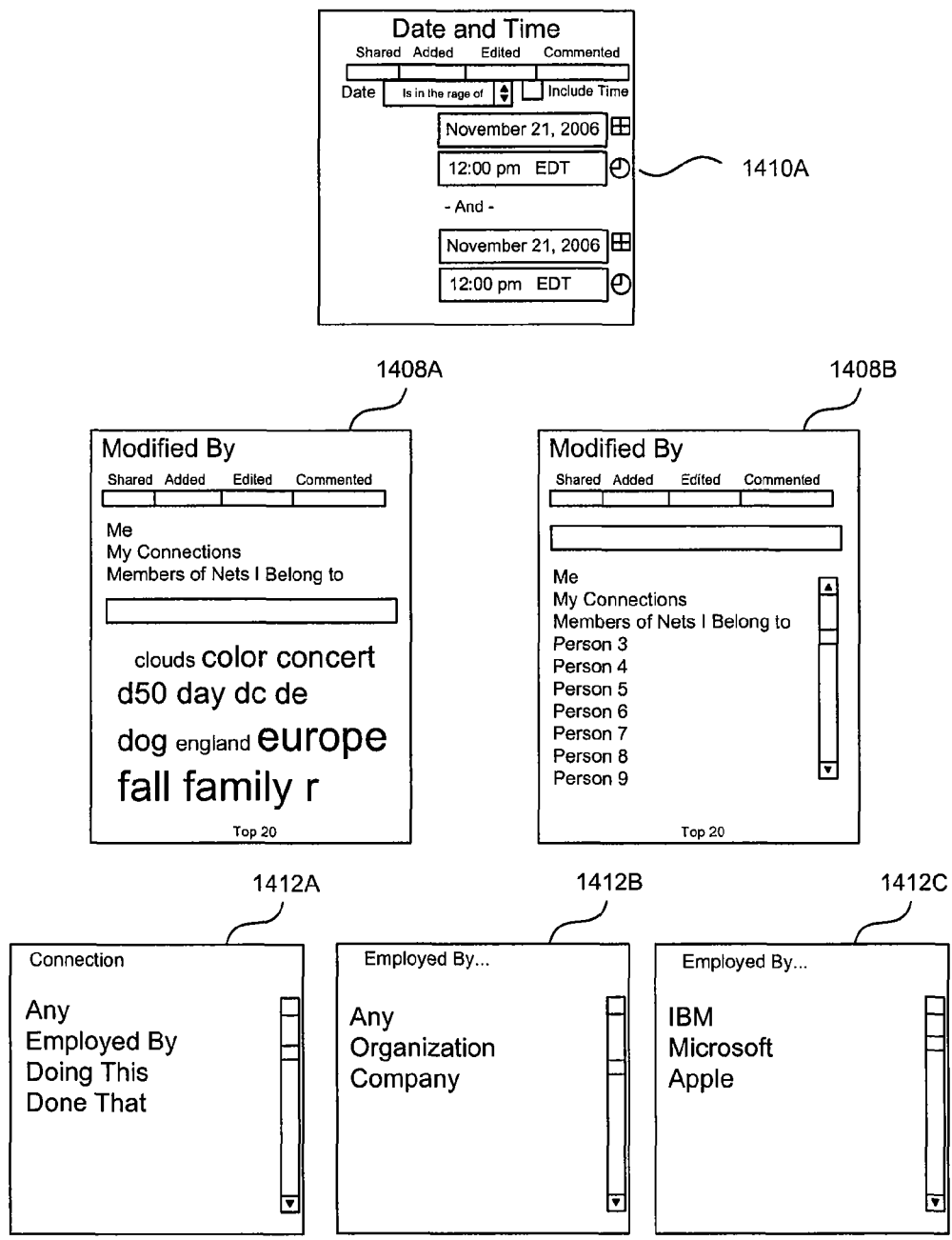

FIG. 14B illustrates an example user interface for searching for an additional set of search results having a specified type of relationship with a first set of search results, according to one embodiment.

A text based filter/search can be performed via submitting a search query to identify/filter a set of nets and/or objects of potential interest. In addition, the filter/search parameters specify items associated with specific users. For example, in box 1408, the user can select to filter search results to items that are shared by, added by, edited by, and/or commented by a specified set of users. In the example shown in box 1408, the user can select to filter search results that are related to the user himself, the user's connections, and/or members of nets that the user belongs to. With further reference to boxes 1408A and 1408B, the user can limit the search to items related to specific users, for example.

In addition, the user can select to filter search results based on temporal properties of the items. For example, in box 1410 and with further reference to box 1410A, the user can elect the date and/or time the specific actions were performed on the item (e.g., shared, added, edited, and/or commented). As shown, a range of dates/time within which the search is to be conducted can be specified.

In one embodiment, search results are further filtered based on identified tags in the search results. For example, as shown in box 1412, users can elect to see content with related tags, broader tags, and/or narrower tags. The concept of hierarchical browsing via utilization of narrower and broader tags can be visualized with further reference to boxes 1412A-C. The user can search within a set of contacts, having different types of semantic relationships. When the user selects to see contacts having a semantic relationship of being employed by a company, the user is routed to 1412B and then to 1412C, where the user can see a list of companies that his/her contacts work at.

Figure 15A:
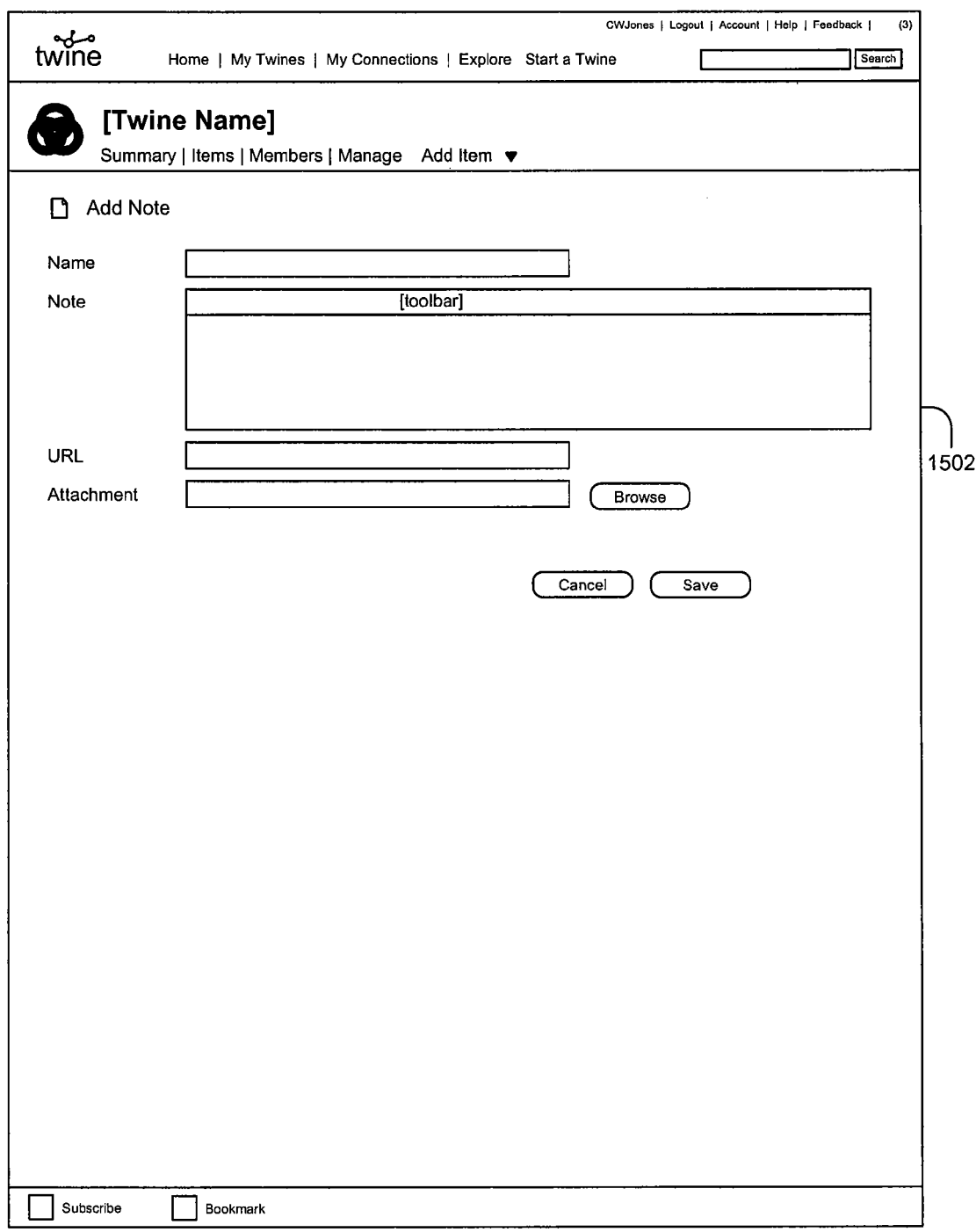
FIGS. 15A-15B illustrate an example user interface for creating a note object in a net and an example user interface showing a note object in a net, according to one embodiment.

FIG. 15A illustrates an example user interface 1502 for creating a note object in a net and an example user interface 1504 showing a note object in a net, according to one embodiment.

Figure 15B:
Figure 15C:
FIGS. 15C-15D illustrate an example user interface for adding a video object to a net and an example user interface for adding a photo object to a net, according to one embodiment.
Figure 15D:
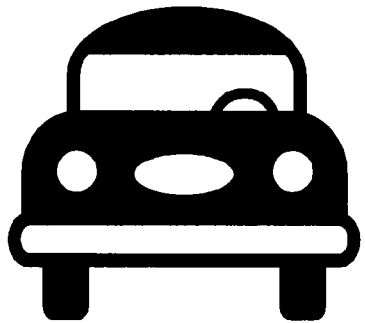
Figure 15E:
FIGS. 15E-15G illustrate example user interfaces for adding a book object, a document, and a bookmark to a net, according to one embodiment.
Figure 15F:
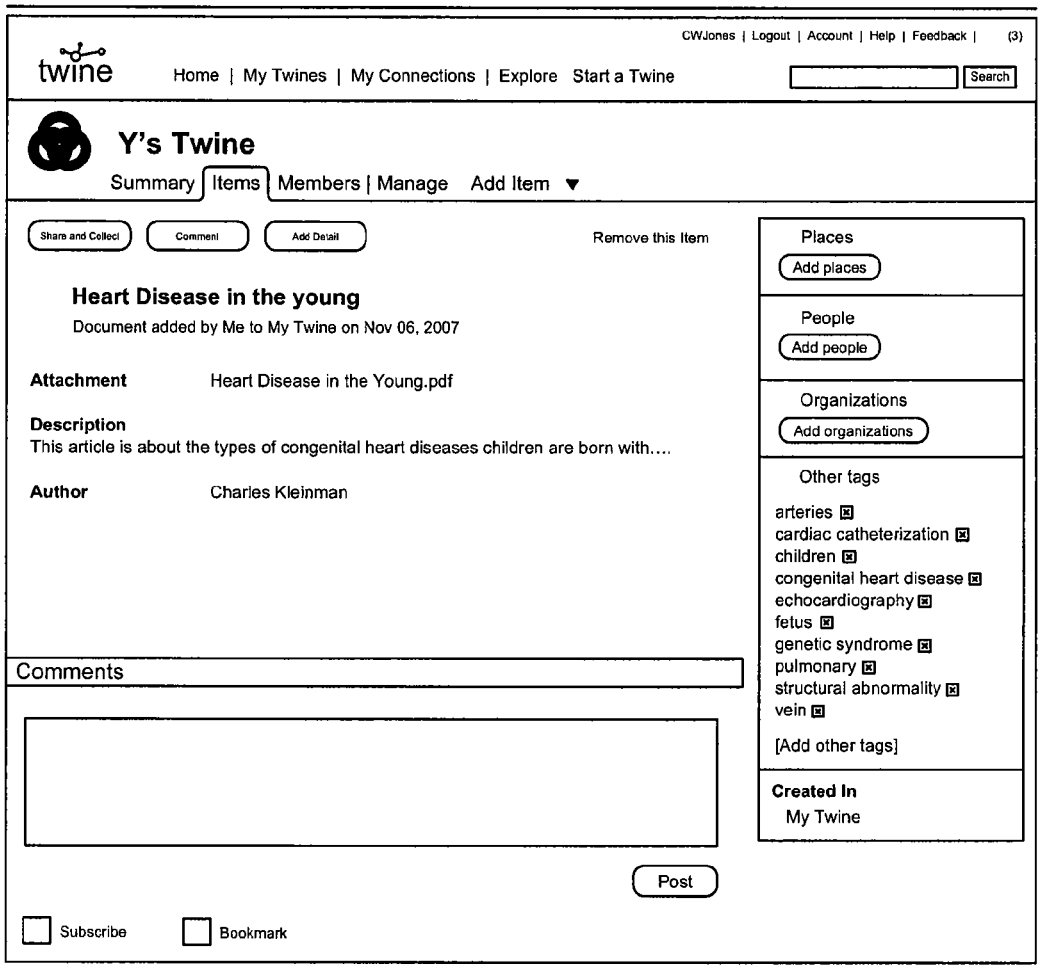
Figure 15G:

When adding a note to a net, the name of the note can be specified in the form. The interface also includes a field to add the note itself, a field to add an URL, and a field to add an attachment. The note item, after submission to one or more nets, can be displayed in the net as shown in the user interface 1504. The note item view can include comments posted by members and/or visitors related to the note item. The note item view may also include a list of the nets that the note is shared with. In one embodiment, a list of tags identified in the note item is displayed in the note item view as well. In some embodiments, a list of tags identified in the net associated with the note item can be displayed. FIG. 15B illustrates an example user interface 1512 for adding a video object to a net and an example user interface 1514 for adding a photo object to a net, according to one embodiment. FIG. 15C illustrates example user interfaces for adding a book object 1522, a document 1524, and a bookmark 1526 to a net, according to one embodiment. Note that objects can be added from a third-party content host, including but not limited to, Youtube, Flickr, Facebook, Digg, and/or other content-rich websites via entering the URL of the content to be added as shown in the respective user interface above for adding, images, videos, notes, documents, web pages, and/or books.

In some embodiments, content stored locally on a user device is added to the knowledge networking platform and/or a specific net. For example, a user may wish to upload pictures taken from a vacation in Hawaii to the user's vacation net ("Vacation in Hawaii"). Thus, a similar user interface can be used where the user specifies the directory pathway where the pictures are located. Various user interfaces can be used for different types of content, for example, but not limited to, document files, contacts, bookmarks, image files, video files, audio files, recordings, notes, calendar events, tasks, system files, applications, and/or other types of executables, etc. Note that files with various formats are typically compatible and can be properly recognized when uploaded to the networking environment, for example files associated with Microsoft Outlook, Google Calendar, iCalendar, vCalendar, Yahoo! Calendar, by way of example but not limitation, .csv files, .ics files, .vcf files, vCards, etc.) can be otherwise recognized, identified, and properly categorized and organized in the network.

In some instances, previews are available for the user to inspect how the content will appear when presented. For example, users may be able to view the results of a video and/or audio cropping when adding the files to the knowledge networking environment. If unsatisfactory, the user may readjust the crop settings, for example, and re-upload the files. In other embodiments, other types of edits to files added to the network are performed, including but not limited to, redacting a document, adjusting the color/sharpness of an image, and/or audio mixing, are additionally contemplated and considered to be within the novel art of this disclosure. Alternatively, the same user interface can, in some instances, be used for content of different formats.

In some embodiments, content is automatically identified from a user device, or any digital device with data storage capabilities (e.g., volatile memory, non-volatile memory such as flash memory, hard disk drive, SD cards, and/or removable media such as CDs, DVDs, BluRay, HD-DVD, etc.), by way of example but not limitation, portable device, laptop, desktop computer, cell phone, iPhone, Blackberry, digital cameras, Treo, camcorders, etc. For example, the knowledge networking environment can launch an applet for searching for content on a user device. In addition, the networking environment can prompt the user to install an application (e.g., host or third-party) on their local device to perform the content search. For example, the applet and/or application may allow the user to specify to search for all multimedia content or to search for documents edited in the last month. The applet may further enable the user to search by content, such as all files that are related to "India" or pictures taken in 2005 in India, for example.

The user may further specify the networking environment to search for all contact information or search for contact information of colleagues to be imported to the network. In addition, files such as web-browser bookmarks can be automatically identified for various browsers on different operating systems and provided to the user for optional sharing in the networking environment. In some situations, the user can, via enable the networking environment to search for new content periodically on one or more user devices. For example, the user may set the parameters to search for new contacts every two months, search for new documents every week, etc.

In some embodiments, the applet searches through content without user specified parameters. Once files have been automatically located by the networking environment, a list of the results is, in some embodiments, presented to the user to select the ones that are to be added to the network. In addition, the user can specify that the files are to be automatically added to the network after they have been identified on a local device, without further confirmation from the user.

FIG. 16 illustrates screenshots of example user interfaces for sharing objects (items) with nets ("Twines") 1602 and connections 1604, according to one embodiment.

In the user interface 1602, the nets with which a user wishes to share an item with can be selected. In addition, the user can attach an optional message with the shared item. In the user interface 1604, the users with whom a user wishes to share an item with can be selected. Similarly, an optional note can be attached with the shared item.

Figure 17D:
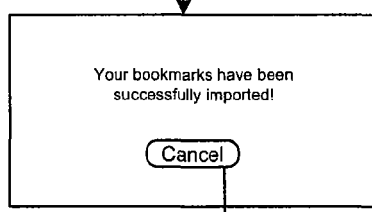

FIG. 17A illustrates example user interfaces 1702 and 1706 for importing bookmarks, according to one embodiment.

User interface 1702 allows a user to submit the directory path where their bookmark file is stored. The user interface 1702 may further display a set of instructions for users to locate bookmark files on local hard drives. In some embodiments, instructions are provided for various web browsers and operating systems, including, but are not limited to, Internet Explorer, Firefox, and/or Safari. Once a bookmark file has been uploaded, the bookmarks can be displayed in a list, in one embodiment, as shown in user interface 1706. The user can go through the list to select the ones to be imported, for example. Once the user hits the 'Import' button, a confirmation message is optionally displayed. In one embodiment, the screenshot 1704 illustrates a user interface for importing items, for example, from a user's hard disk drive to a net.

FIG. 17B illustrates example user interfaces 1712 and 1716 for importing contacts, according to one embodiment.

User interface 1712 allows the user to submit the directory path where a contact list (e.g., a contact list in CSV format) is locally stored. Contact lists stored in additional formats can also be submitted. Once a contact list has been submitted, the list can be displayed as shown in screenshot 1716, where a user can select the contacts in the list to be imported. With reference to boxes 1714A and 1714B, the user can select, from the drop down menu to import bookmarks or contacts.

Figure 18:
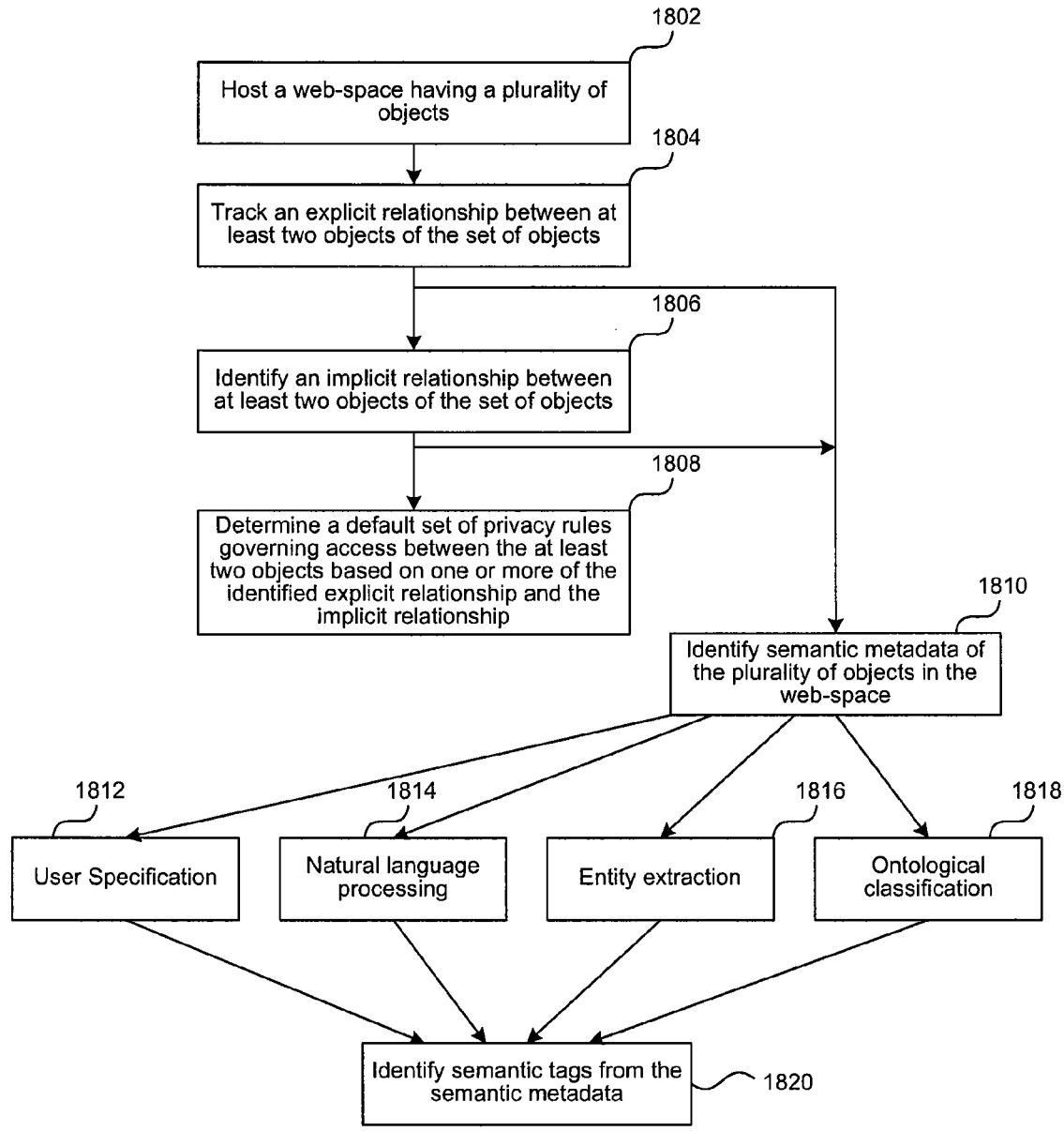
FIG. 18 depicts a flow diagram illustrating a process of identifying semantic metadata of objects in a web-space, according to one embodiment.

FIG. 18 depicts a flow diagram illustrating a process of identifying semantic metadata of objects in a web-space, according to one embodiment.

In process 1802, a web-space having a plurality of objects is hosted. Objects can include, but is not limited to, web-based items, users, contacts, user information, and/or nets. Web-based items can include, by way of example, but not limitation, documents, files, image files, text files, video files and/or audio files. In process 1804, an explicit relationship between at least two objects of the set of objects is tracked. In process 1806, an implicit relationship between at least two objects is tracked. An example list of types of relationships identified in the knowledge networking platform is illustrated with further reference to the tables shown in FIG. 8E.

In process 1808, a default set of privacy rules governing access between the at least two objects based on one or more of the identified explicit relationship and the implicit relationship is determined. In process 1810, semantic metadata of the plurality of objects in the web-space is identified, based on at least one of the process 1812 (user specification), process 1814 (natural language processing), entity extraction (1816), and/or ontological classification (1818). In process 1820, semantic tags are identified from the semantic metadata.

Figure 19:
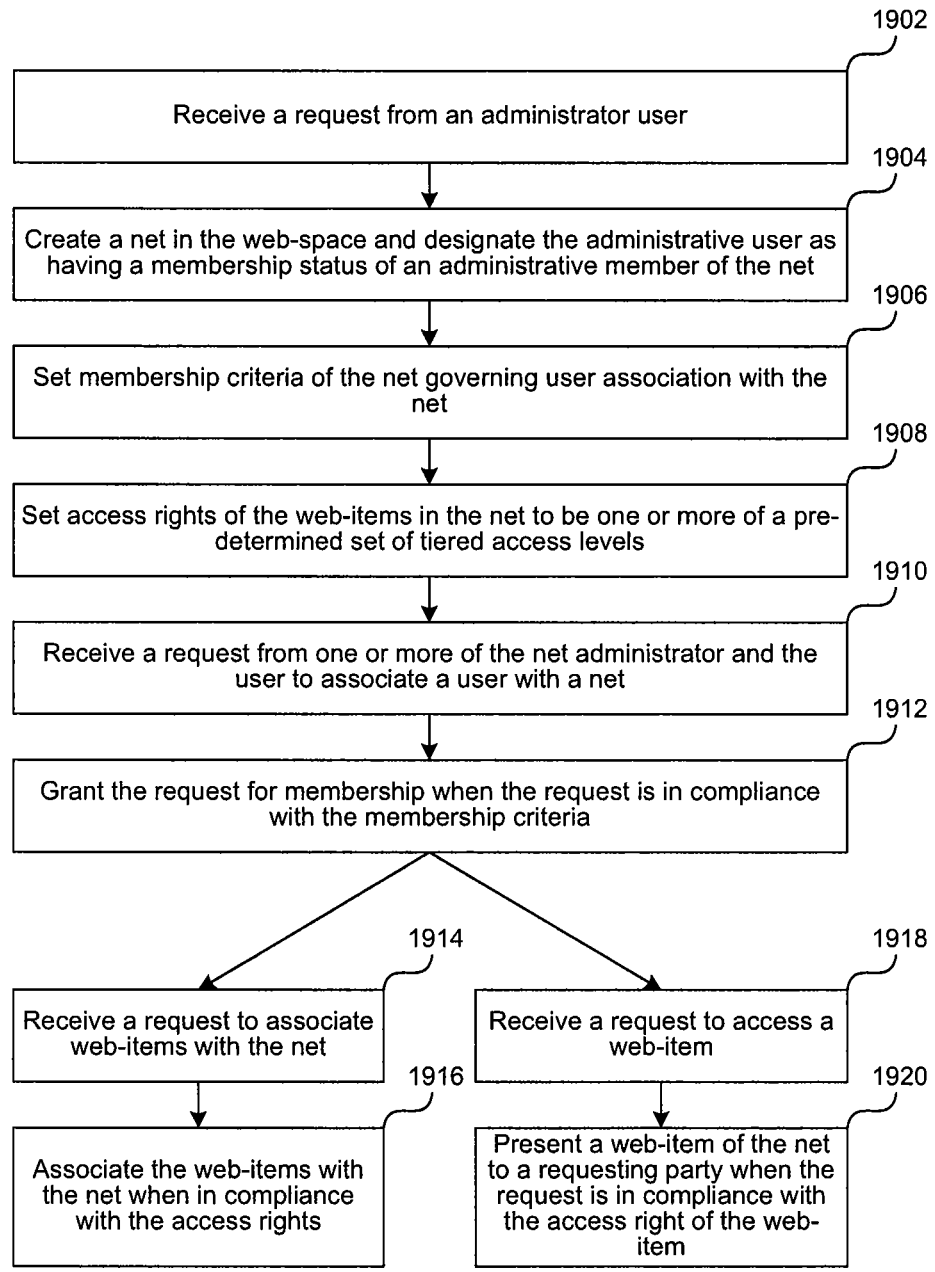
FIG. 19 depicts a flow diagram illustrating a process of managing a net in the knowledge networking environment, according to one embodiment.

FIG. 19 depicts a flow diagram illustrating a process of managing a net in the knowledge networking environment, according to one embodiment.

In process 1902, a request is received from an administrator user to create a net. In process 1904, a net is created in the web-space and the administrative user is designated as having a membership status of an administrative member of the net. In process 1906, membership criteria of the net governing user association with the net is set. In process 1908, access rights of the web-items in the net to be one or more of a predetermined set of tiered access levels is set. In process 1910, a request is received from one or more of the net administrator and the user to associate a user with a net. In process 1912, the request for membership is granted when the request is in compliance with the membership criteria. In process 1914, a request to associate web-items with the net is received. In process 1916, the web-items are associated with the net when in compliance with the access rights. In process 1918, a request to access a web-item is received. In process 1920, a web-item of the net is presented to a requesting party when the request is in compliance with the access right of the web-item.

Figure 20:
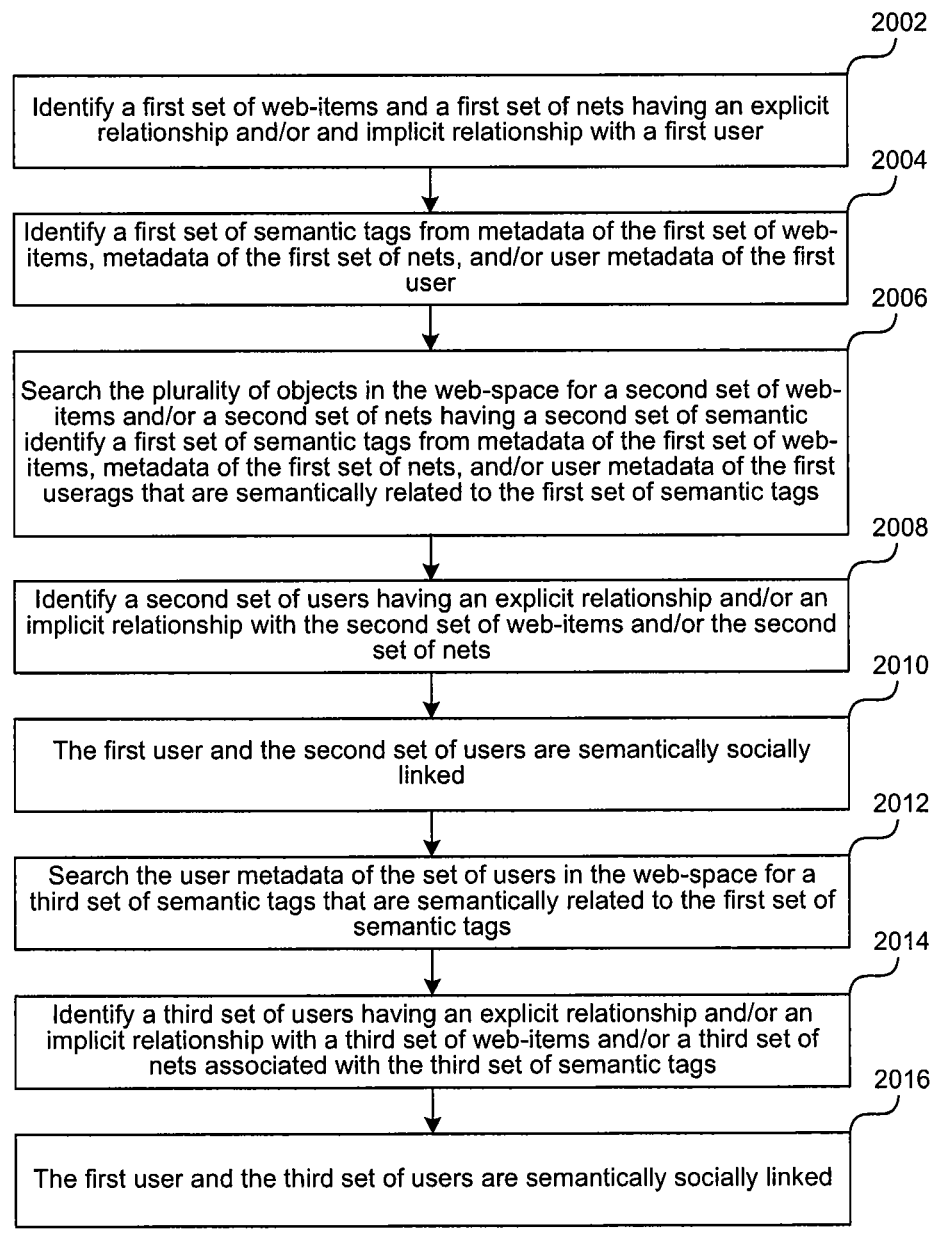
FIG. 20 depicts a flow diagram illustrating a process of identifying semantic social links in the knowledge networking environment, according to one embodiment.

FIG. 20 depicts a flow diagram illustrating a process of identifying semantic social links in the knowledge networking environment, according to one embodiment.

In process 2002, a first set of web-items and a first set of nets having an explicit relationship and/or and implicit relationship with a first user is identified. In process 2004, a first set of semantic tags is identified from metadata of the first set of web-items, metadata of the first set of nets, and/or user metadata of the first user. In process 2006, the plurality of objects in the web-space is searched for a second set of web-items and/or a second set of nets having a second set of semantic tags that are semantically related to the first set of semantic tags. In process 2008, a second set of users having an explicit relationship and/or an implicit relationship with the second set of web-items and/or the second set of nets is identified. In process 2010, the first user and the second set of users are semantically socially linked. In process 2012, the user metadata of the set of users in the web-space is searched for a third set of semantic tags that are semantically related to the first set of semantic tags. In process 2014, a third set of users having an explicit relationship and/or an implicit relationship with a third set of web-items and/or a third set of nets associated with the third set of semantic tags is identified. In process 2016, the first user and the third set of users are semantically socially linked.

Figure 21:
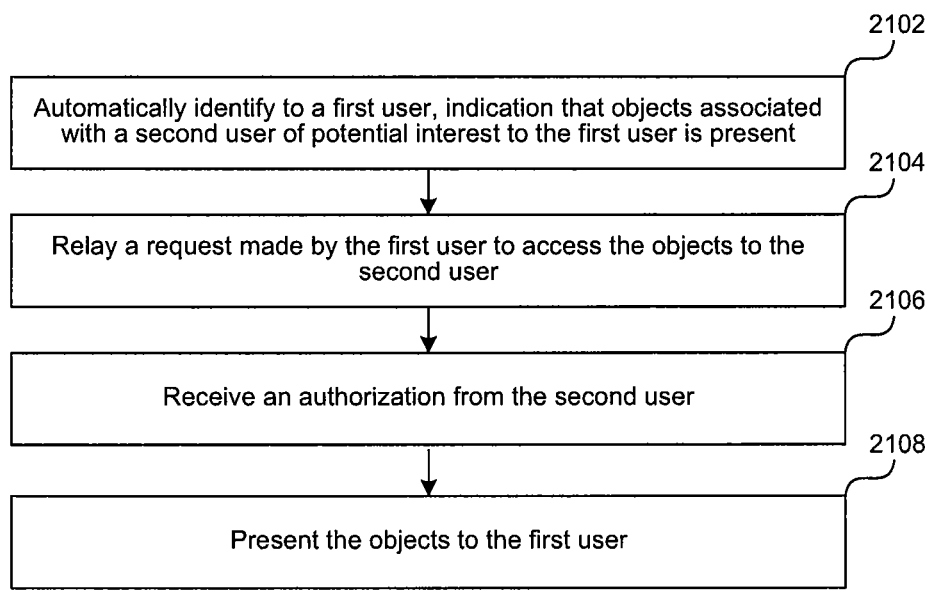
FIG. 21 depicts a flow diagram illustrating a process of making intelligent recommendations to users of the knowledge networking environment, according to one embodiment.

FIG. 21 depicts a flow diagram illustrating a process of making intelligent recommendations to users of the knowledge networking environment, according to one embodiment.

In process 2102, indication that objects associated with a second user of potential interest to the first user are present is automatically identified to the first user. In process 2104, a request made by the first user to access the objects is relayed to the second user. In process 2106, an authorization is received from the second user. In process 2108, the objects are presented to the first user.

Figure 22:
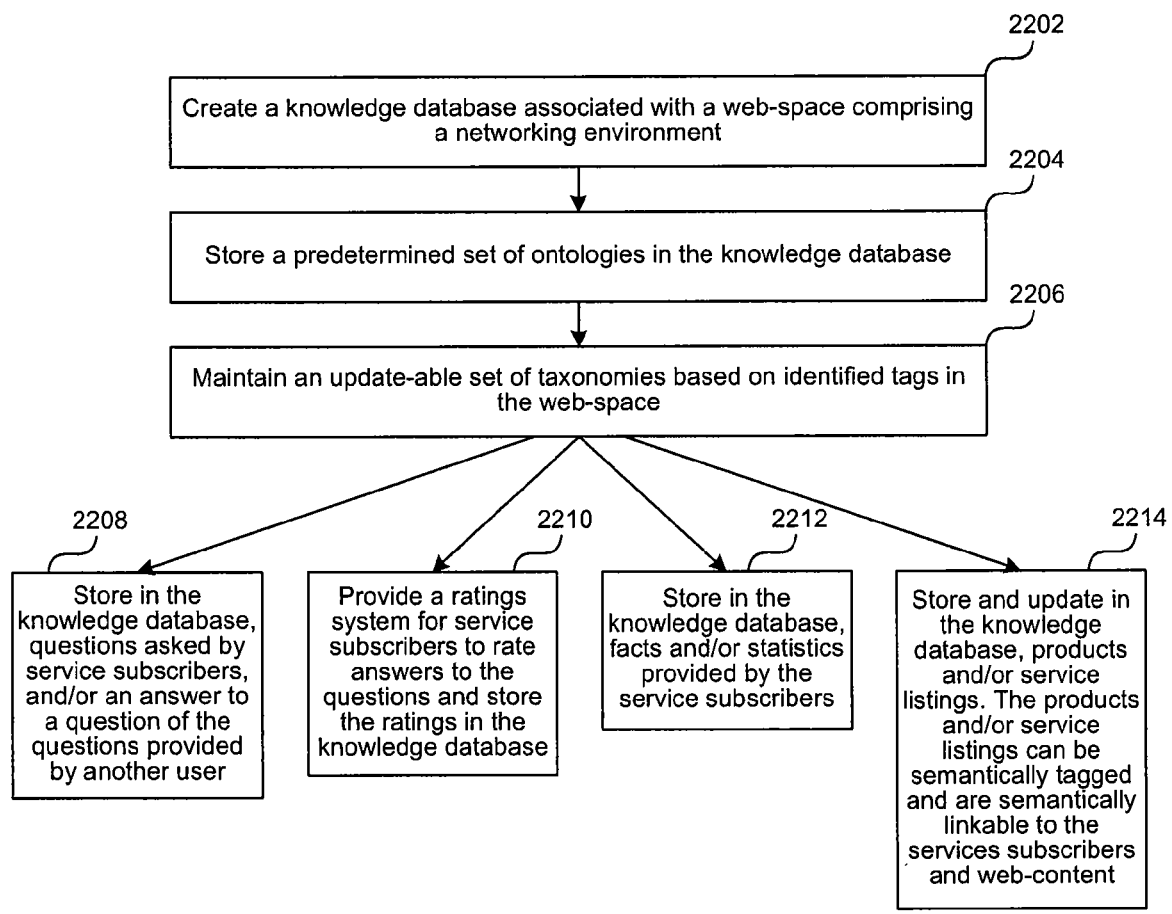
FIG. 22 depicts a flow diagram illustrating a process of creating and updating a knowledge database in the knowledge networking environment, according to one embodiment.

FIG. 22 depicts a flow diagram illustrating a process of creating and updating a knowledge database in the knowledge networking environment, according to one embodiment. In process 2202, a knowledge database associated with a web-space comprising a networking environment is created. In process 2204, a predetermined set of ontologies is stored in the knowledge database. In process 2206, an update-able set of taxonomies is maintained based on identified tags in the web-space. In process 2208, questions asked by service subscribers, and/or an answer to a question of the questions provided by another user are stored in the knowledge database. In process 2210, a ratings system for service subscribers to rate answers to the questions is provided and stored in the knowledge database. In process 2212, facts and/or statistics provided by the service subscribers are stored in the knowledge database. In process 2214, products and/or service listings are stored and updated in the knowledge database. The products and/or service listings can be semantically tagged and are semantically linkable to the services subscribers and web-content.

Figure 23:
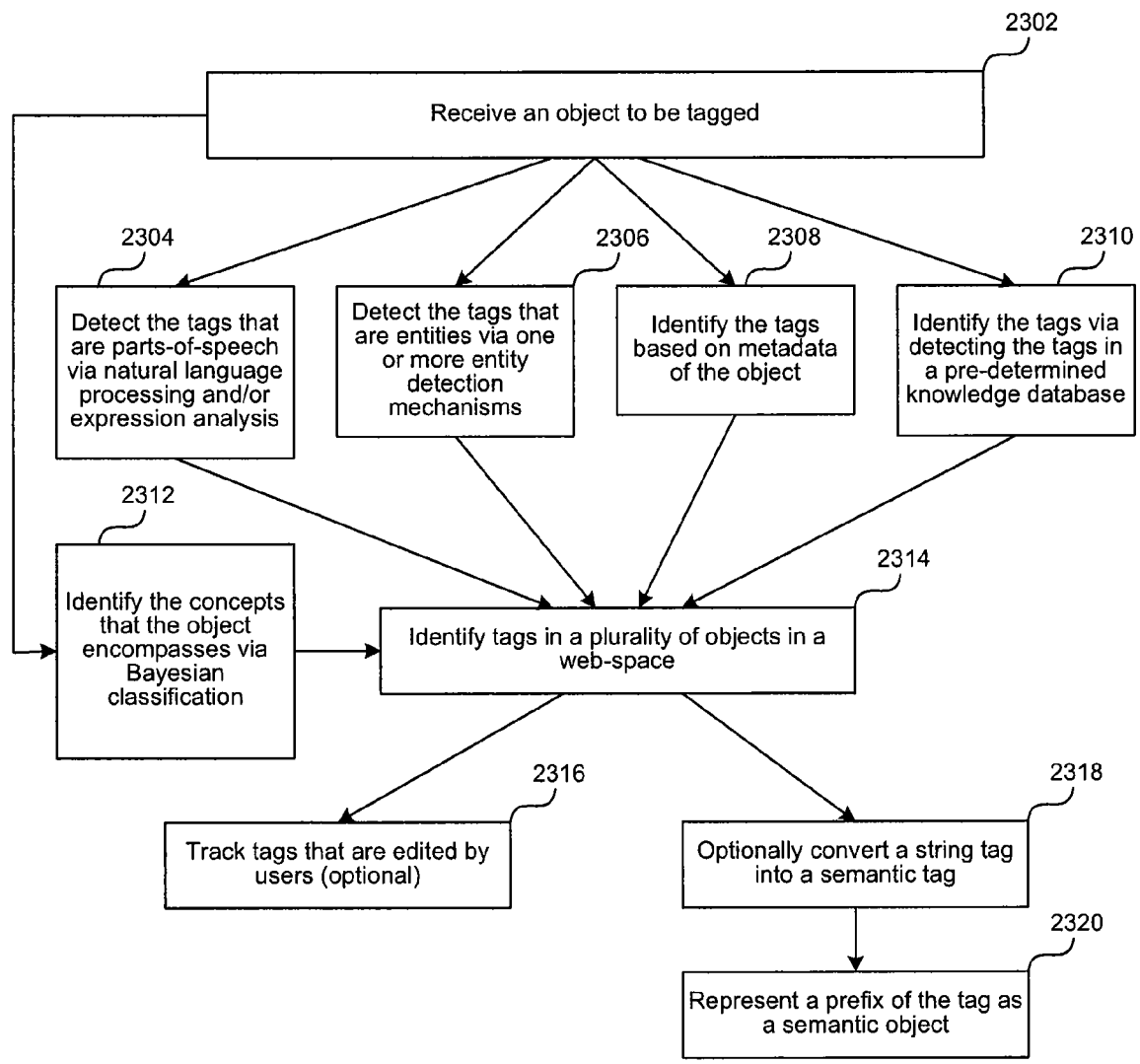
FIG. 23 depicts a flow diagram illustrating a process of creating and updating a knowledge database in the knowledge networking environment, according to one embodiment.

FIG. 23 depicts a flow diagram illustrating a process of creating and updating a knowledge database in the knowledge networking environment, according to one embodiment.

In process 2302, an object to be tagged is received. In process 2304, the tags that are parts-of-speech are detected via natural language processing and/or expression analysis. In process 2306, the tags that are entities are detected via one or more entity detection mechanisms. In process 2308, the tags are identified based on metadata of the object. In process 2310, the tags are identified via detecting the tags in a pre-determined knowledge database. In process 2312, the concepts that the object encompasses are identified via Bayesian classification. In process 2314, tags in a plurality of objects in a web-space are identified. In process 2316, tags that are edited by users are optionally tracked and recorded. In process 2318, a string tag is optionally converted into a semantic tag. In process 2320, a prefix of the tag is optionally represented as a semantic object.

Figure 24:
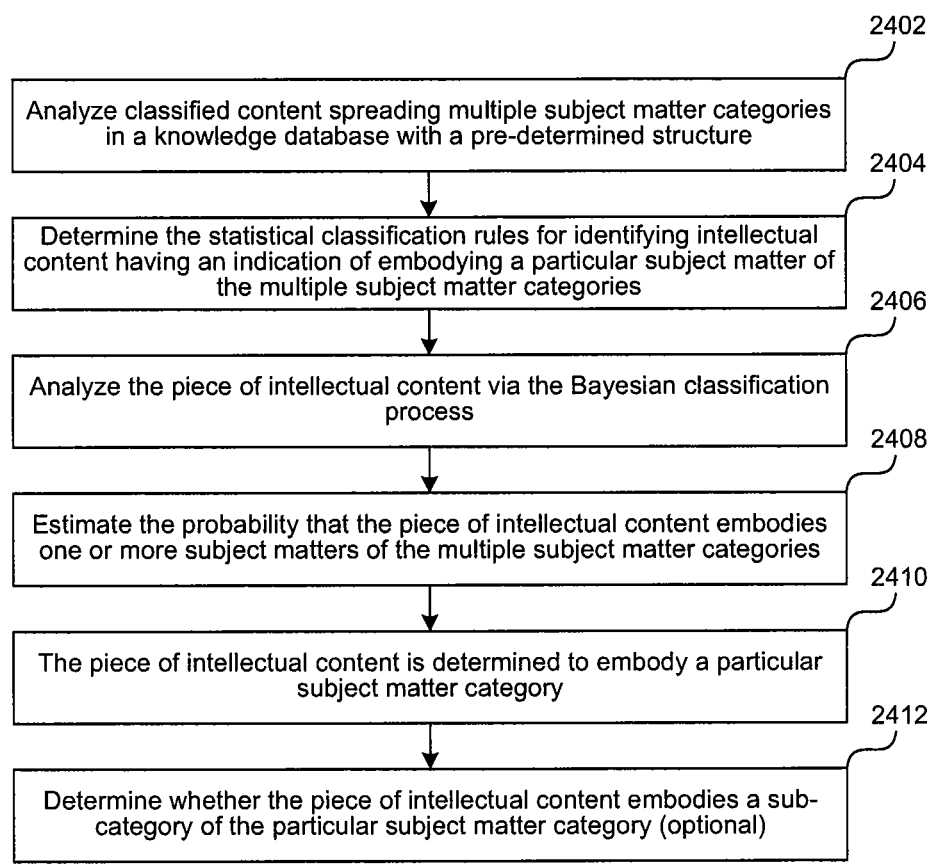
FIG. 24 depicts a flow diagram illustrating a process of determining the category of the subject matter of a piece of intellectual content, according to one embodiment.

FIG. 24 depicts a flow diagram illustrating a process of determining the category of the subject matter of a piece of intellectual content, according to one embodiment.

In process 2402, classified content is analyzed. The classified content can spread multiple subject matter categories in a knowledge database with a pre-determined structure. In process 2404, the statistical classification rules for identifying intellectual content having an indication of embodying a particular subject matter of the multiple subject matter categories are determined. In process 2406, the piece of intellectual content is analyzed via the Bayesian classification process. In process 2408, the probability that the piece of intellectual content embodies one or more subject matters of the multiple subject matter categories is estimated. In process 2410, the piece of intellectual content is determined to embody a particular subject matter category. In process 2412, the piece of intellectual content is optionally analyzed to determine whether the intellectual content embodies a sub-category of the particular subject matter category.

Figure 25:
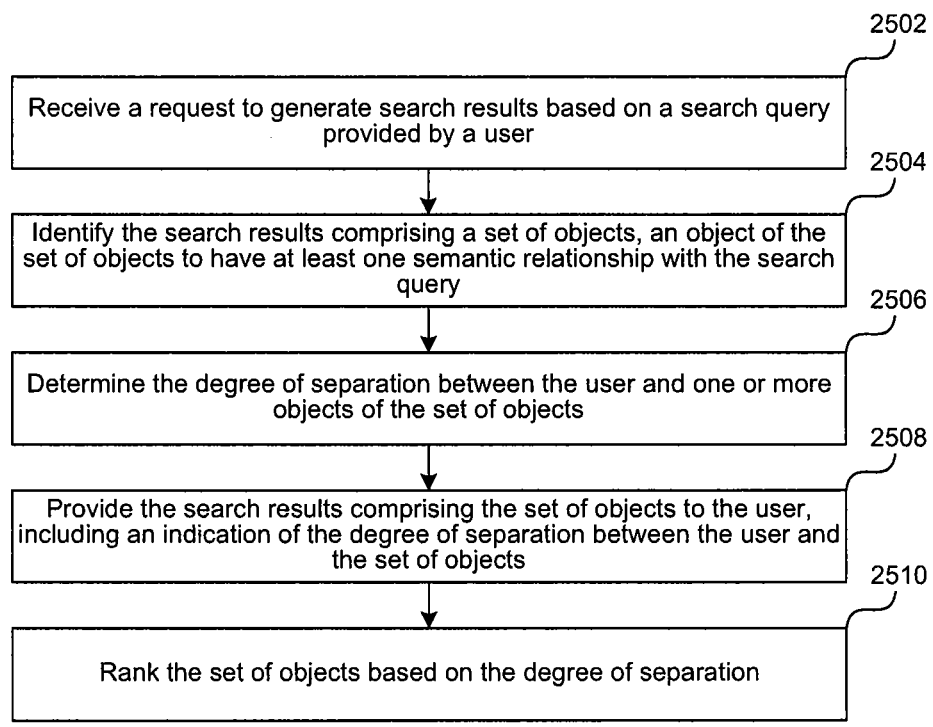
FIG. 25 depicts a flow diagram illustrating a process of ranking search results based on the degree of separation, according to one embodiment.

FIG. 25 depicts a flow diagram illustrating a process of ranking search results based on the degree of separation, according to one embodiment.

In process 2502, a request to generate search results based on a search query provided by a user is received. In process 2504, the search results comprising a set of objects are identified. In one embodiment, an object of the set of objects has at least one semantic relationship with the search query. In process 2506, the degree of separation between the user and one or more objects of the set of objects is determined. In process 2508, the search results comprising the set of objects are provided to the user. In some embodiments, the search results include an indication of the degree of separation between the user and the set of objects. In process 2510, the set of objects is ranked based on the degree of separation.

Although embodiments have been described with reference to specific example embodiments, it will be evident that the various modification and changes can be made to these embodiments. Accordingly, the specification and drawings are to be regarded in an illustrative sense rather than in a restrictive sense. The foregoing specification provides a description with reference to specific exemplary embodiments. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method of responding to a search query, comprising:
receiving a request to generate search results based on the search query provided by a user;
identifying the search results comprising objects based on semantic relationships with the search query,
wherein the objects include web-based content added by users to a web-based networking environment to be shared with other users in the networking environment;
wherein, relational attributes of the objects are specified by the users when added to the web-based networking environment, the relational attributes identifying users with permission to share, collect, or book mark the objects;
determining a degree of separation between the user and one or more of the objects; and
providing the search results comprising the objects to the user,
the providing of the objects to include an indication of the degree of separation between the user and the one or more of the objects;
automatically recommending additional objects to the user in the networking environment;
wherein, the relational attributes further identifies users with permission to ask a question regarding the object.

2. The method of claim 1, further comprising ranking the one or more of the objects based on the degree of separation between the one or more objects and the user.

3. The method of claim 1, wherein an object is one or more of a given user, a net, and an item in the networking environment.

4. The method of claim 3, further comprising tracking relational attributes between the objects.

5. The method of claim 4, wherein the net comprises a subset of the objects in the networking environment, wherein each of the subset of objects has an explicit relational attribute with one other object in the subset.

6. The method of claim 5, wherein the explicit relational attribute comprises one or more of an item added by a specific user, a given user who is a contact of another user, and a specific item that is associated with a specific net.

7. The method of claim 3, further comprising identifying metadata of one of the objects; wherein the metadata of the one of the objects is identifiable via meta-tags provided by the given user.

8. The method of claim 7, wherein the metadata comprises information associated with one or more of a type, property, intellectual content, a set of keywords, a set of tags, attributes, timing data, version data, and access rights of the object.

9. The method of claim 7, wherein the metadata of the objects provide data associated with multimedia composition of the web content, wherein the multimedia composition comprises one or more of textual, graphics, video, interactive, and animation content.

10. The method of claim 1, further comprising identifying one of the search results based on a textual relevance with the search query.

11. The method of claim 1, wherein, the relational attributes further identifies users with permission to comment on the object.

12. The method of claim 1, wherein, the relational attributes are defined on an individual user basis.

13. A memory unit having stored thereon a set of instructions which when executed causes a method of responding to a search query to be performed, the method comprising:
identifying the set of search results comprising a set of objects based on semantic relationships with the search query, the set of objects to be identified from a least a portion of a plurality of objects in a web-space, a specific object of the set of objects to have at least one semantic relationship with the search query,
wherein the objects include web-based content added by users to a web-based networking environment to be shared with other users in the web-based networking environment;
wherein, relational attributes of the objects are specified by the users when added to the web-base networking environment, the relational attributes identifying users with permission to share and bookmark the objects;
wherein the specific object of the set of objects to be within a predetermined degree of separation from the user;
determining a degree of separation between the user and one or more objects of the set of the objects; and
providing the set of search results comprising the set of objects to the user,
the providing of the one or more objects of the set of objects to include an indication of the degree of separation between the user and the one or more objects of the set of the objects;
automatically recommending additional objects to the user in the web-based networking environment;
wherein, the additional objects are identified for recommendation based on degrees of separation of the user with the additional objects, in the web content in the web-based networking environment.

14. The method of claim 13, further comprising identifying metadata of one of the objects; wherein the metadata of the one of the objects is identifiable via meta-tags provided by the given user.

15. The method of claim 14, wherein the metadata of an object in the objects comprises information associated with one or more of a type, property, or attributes of the object.

16. The method of claim 14, wherein the metadata of an object in the objects comprises information associated with keywords or tags of the object.

17. The method of claim 14, wherein the metadata of an object in the objects comprises information indicating subject matter of the intellectual content of the object.

18. The method of claim 14, wherein the metadata of an object in the objects comprises information indicating access rights.

19. The method of claim 14, wherein the metadata of an object in the objects comprises information indicating timing data or version data of the object.

20. A system for content recommendation in an online network, the system comprising:
means for, determining a degree of separation between the user and objects including web-based content added by users to the online network to be shared with other users in the online network;
wherein, relational attributes of the objects are specified by the users when added to the web-based networking environment, the relational attributes identifying users with permission to share and bookmark the objects;
means for, tracking browsing history of the user;
means for, automatically recommending select content from the objects in the online network to the user, without a search request of the user;
wherein, the select content is identified for recommendation based on degrees of separation determined between the user and the objects in the online network;
means for, providing the select content to the user, wherein, the providing of the select content includes an indication of the degree of separation between the user and the select content.

21. The system of claim 20, further comprising:
means for, tracking search history of the user;
means for, identifying additional content to be recommended to the user based on the search history.

22. The system of claim 20, means for, identifying additional content to be recommended to the user; wherein: the additional content is identified using search queries associated with the search history, and identified using semantic relationships between the additional content with the search queries.

23. A method of responding to a search query, comprising:
receiving a request to generate search results based on the search query provided by a user;
identifying the search results comprising objects based on semantic relationships with the search query,
wherein the objects include web-based content added by users to a web-based networking environment to be shared with other users in the networking environment;
wherein, relational attributes of the objects are specified by the users when added to the web-based networking environment, the relational attributes identifying users with permission to share, collect, or book mark the objects;
determining a degree of separation between the user and one or more of the objects; and
providing the search results comprising the objects to the user,
the providing of the objects to include an indication of the degree of separation between the user and the one or more of the objects;
automatically recommending additional objects to the user in the networking environment;
wherein, the relational attributes are defined on a relationship basis.

24. A method of responding to a search query, comprising:
receiving a request to generate search results based on the search query provided by a user;
identifying the search results comprising objects based on semantic relationships with the search query,
wherein the objects include web-based content added by users to a web-based networking environment to be shared with other users in the networking environment;
wherein, relational attributes of the objects are specified by the users when added to the web-based networking environment, the relational attributes identifying users with permission to share, collect, or book mark the objects;
determining a degree of separation between the user and one or more of the objects; and
providing the search results comprising the objects to the user,
the providing of the objects to include an indication of the degree of separation between the user and the one or more of the objects;
automatically recommending additional objects to the user in the networking environment;
wherein, the relational attributes are defined on a group basis.

* * * * *

UNITED STATES PATENT AND TRADEMARK OFFICE
CERTIFICATE OF CORRECTION

PATENT NO. : 8,438,124 B2  
APPLICATION NO. : 11/874882  
DATED : May 7, 2013  
INVENTOR(S) : Nova Spivack et al.

Page 1 of 1

It is certified that error appears in the above-identified patent and that said Letters Patent is hereby corrected as shown below:

In the Claims

In column 49, line 19, claim 13, delete "web-base" and insert -- web-based --, therefor.

Signed and Sealed this  
Seventh Day of January, 2014

Margaret A. Focarino  
*Commissioner for Patents of the United States Patent and Trademark Office*